(12) United States Patent
Brutoco et al.

(10) Patent No.: US 12,066,152 B2
(45) Date of Patent: Aug. 20, 2024

(54) METHOD AND APPARATUS FOR DELIVERING HYDROGEN

(71) Applicant: H2 Clipper, Inc., Santa Barbara, CA (US)

(72) Inventors: Rinaldo S. Brutoco, Santa Barbara, CA (US); Robert H. Shelton, Santa Barbara, CA (US)

(73) Assignee: H2 Clipper, Inc., Santa Barbara, CA (US)

( * ) Notice: Subject to any disclaimer, the term of this patent is extended or adjusted under 35 U.S.C. 154(b) by 0 days.

(21) Appl. No.: 18/312,215

(22) Filed: May 4, 2023

(65) Prior Publication Data

US 2023/0272883 A1 Aug. 31, 2023

Related U.S. Application Data

(60) Continuation-in-part of application No. 17/830,486, filed on Jun. 2, 2022, which is a continuation of
(Continued)

(51) Int. Cl.
*F17C 11/00* (2006.01)
*C25B 1/04* (2021.01)
(Continued)

(52) U.S. Cl.
CPC .............. *F17C 11/005* (2013.01); *C25B 1/04* (2013.01); *F16L 9/12* (2013.01); *F17C 5/06* (2013.01);
(Continued)

(58) Field of Classification Search
CPC .... F17C 11/005; F17C 5/06; F17C 2221/012; F17C 2221/033; F17C 2223/0123;
(Continued)

(56) References Cited

U.S. PATENT DOCUMENTS 4,066,095 A 1/1978 Massa
4,213,476 A 7/1980 Bresie et al.
(Continued)

FOREIGN PATENT DOCUMENTS

DE 102010009796 A1 9/2011
EP 1524108 B1 4/2005
(Continued)

OTHER PUBLICATIONS

Extended European Search Report in corresponding EP application No. 20960190.5 dated Sep. 22, 2023.
(Continued)

*Primary Examiner* — Minh Q Le
(74) *Attorney, Agent, or Firm* — Withers Bergman LLP; John C. Serio

(57) ABSTRACT

A system and method for transporting and distributing hydrogen, reducing the risk of hydrogen leakage, maintaining a record of provenance, and measuring and recording its purity level as it flows from source to destination to assure it complies with a predetermined range of values. The system includes a hydrogen delivery line made from metallic or non-metallic pipe that may be placed inside a safety pipe such that a channel is formed between an exterior of the hydrogen delivery line and an interior of the safety pipe. A sweeper gas or liquid may be injected into the channel to purge any hydrogen that might escape from the hydrogen delivery line, and one or more sensors may be used to detect and avoid the presence of an unacceptable level of hydrogen, or to stop the flow of hydrogen and remediate the problem well before a safety or environmental risk can occur.

45 Claims, 19 Drawing Sheets

Related U.S. Application Data application No. 17/529,801, filed on Nov. 18, 2021, now Pat. No. 11,441,737, which is a division of application No. 17/093,771, filed on Nov. 10, 2020, now Pat. No. 11,236,864.

(60) Provisional application No. 63/106,148, filed on Oct. 27, 2020.

(51) Int. Cl.
| | |
|---|---|
| F16L 9/12 | (2006.01) |
| F17C 5/06 | (2006.01) |
| F17D 3/01 | (2006.01) |
| F17D 3/18 | (2006.01) |
| B64B 1/00 | (2006.01) |
| F17D 1/04 | (2006.01) |

(52) U.S. Cl.
CPC .............. *F17D 3/01* (2013.01); *F17D 3/18* (2013.01); *B64B 1/00* (2013.01); *F17C 2221/012* (2013.01); *F17C 2221/033* (2013.01); *F17C 2223/0123* (2013.01); *F17C 2223/0161* (2013.01); *F17C 2270/0184* (2013.01); *F17D 1/04* (2013.01)

(58) Field of Classification Search
CPC ...... F17C 2223/0161; F17C 2270/0184; F17C 7/00; C25B 1/04; C25B 15/00; F16L 9/12; F17D 3/01; F17D 3/18; F17D 1/04; B64B 1/00
USPC .......................................................... 137/1
See application file for complete search history.

(56) References Cited

U.S. PATENT DOCUMENTS

| | | | |
|---|---|---|---|
| 4,272,042 A | 6/1981 | Slater | |
| 5,375,457 A | 12/1994 | Trapp | |
| 5,639,394 A | 6/1997 | Conley | |
| 6,004,639 A | 12/1999 | Quigley | |
| 6,032,699 A | 3/2000 | Cochran | |
| 6,108,967 A | 8/2000 | Erikson | |
| 6,361,299 B1 | 3/2002 | Quigley | |
| 6,896,222 B2 | 5/2005 | Dossas et al. | |
| 7,870,874 B2 | 1/2011 | Quigley | |
| 8,336,810 B2 | 12/2012 | Brutoco | |
| 8,820,621 B2 | 9/2014 | Burke et al. | |
| 8,836,810 B2 | 9/2014 | Schechner et al. | |
| 8,932,184 B2 | 1/2015 | Redmond | |
| 9,102,391 B2 | 8/2015 | Brutoco | |
| 9,278,807 B2 | 3/2016 | Drenvich | |
| 9,316,228 B2 | 4/2016 | Becker et al. | |
| 9,493,223 B2 | 11/2016 | Brutoco | |
| 10,288,207 B2 | 5/2019 | Littlestar et al. | |
| 10,436,667 B2 | 10/2019 | Littlestar et al. | |
| 10,589,969 B2 | 3/2020 | Brutoco | |
| 2003/0209282 A1* | 11/2003 | Satou | F17C 5/00 141/97 |
| 2004/0003856 A1 | 1/2004 | Quigley | |
| 2004/0084083 A1 | 5/2004 | Pearson | |
| 2004/0112427 A1 | 6/2004 | Klassen | |
| 2004/0126888 A1 | 7/2004 | Puri | |
| 2006/0180237 A1* | 8/2006 | Hoke | F17C 5/06 141/94 |
| 2007/0012362 A1* | 1/2007 | Thyroff | F17C 7/00 137/255 |
| 2008/0121643 A1 | 5/2008 | Blencoe et al. | |
| 2009/0313896 A1 | 12/2009 | Glidewell | |
| 2010/0059528 A1 | 3/2010 | Zhevago et al. | |
| 2010/0193045 A1* | 8/2010 | Xu | F17C 13/025 137/255 |
| 2013/0213491 A1 | 8/2013 | Adler et al. | |
| 2014/0311622 A1* | 10/2014 | Cohen | F17C 7/00 141/94 |
| 2018/0274731 A1 | 9/2018 | Ethridge | |
| 2019/0330033 A1 | 10/2019 | Brutoco | |
| 2020/0171945 A1* | 6/2020 | McNicholas | B60K 28/10 |
| 2020/0208771 A1 | 7/2020 | Kim | |
| 2021/0293385 A1* | 9/2021 | Francois | G01F 15/002 |
| 2022/0146048 A1* | 5/2022 | Ewan | F17D 3/01 |
| 2022/0161183 A1* | 5/2022 | Maehara | F17C 5/06 |
| 2022/0205591 A1* | 6/2022 | Li | F17C 5/007 |
| 2022/0364680 A1* | 11/2022 | Sinding | F17C 5/06 |
| 2023/0073632 A1 | 3/2023 | Liberkowski | |
| 2023/0119413 A1* | 4/2023 | Handa | F17C 5/06 700/282 |

FOREIGN PATENT DOCUMENTS

| | | |
|---|---|---|
| EP | 2569571 B1 | 7/2017 |
| FR | 2955642 A1 | 7/2011 |
| JP | 102010009796 | 12/2005 |
| JP | 2006138351 A | 6/2006 |
| JP | 4584675 B2 | 11/2010 |
| RU | 2140605 C1 | 10/1999 |
| WO | 2012052125 A1 | 4/2012 |

OTHER PUBLICATIONS

Rawls et al. Lowering Costs of Hydrogen Pipelines through Use of Fiber Reinforced Polymers and Modern Steels. US Department of Energy, Office of Energy Efficiency and Renewable Energy. Sep. 27, 2017.

G.B. Rawls, et al. "Hydrogen production and containment," Gaseous hydrogen embrittlement of materials in energy technologies, Chapter 1, R. Gangloff and B. Somerday (Editors), Cambridge, UK, 2012, pp. 3-50.

Elizabeth Corner, "Novel plastic pipe prevents diffusion," World Pipelines (online), Jul. 15, 2021.

NTT Anode Energy Corporation, "NTT to study hydrogen transportation through existing pipelines," Businesswire (online), Jul. 25, 2022.

Pluvinage, Guy and Capelle Julien, "Risks associated with the use of hydrogen as an energy carrier or source," Journal of Energy and Power Technology, vol. 4, Issue 3, Sep. 1, 2022.

Julia Streets, Sophia Rodiger, Jesse Morris, Sabine Brink, "The Energy Podcast from Shell: How blockchain is changing energy," Sep. 22, 2022.

Sabine Brink, "Decentralized Blockchain: Key Enabler in the Emerging Diverse Energy Market," Shell Global Energy and Innovation, Jun. 28, 2022.

Shell PLC, "Shell, Accenture and Amex GBT launch one of the world's first blockchain powered digital book-and-claim solutions for scaling sustainable aviation fuel (SAF)," Shell Global Energy and Innovation, Jun. 20, 2022.

Certifhy, "CertifHy—The first European Guarantee of Origin for Green & Low Carbon Hydrogen," Oct. 2021.

CertifHy, "CertifHy—Developing a European Framework for the generation of guarantees of origin for green hydrogen," CertifHy Event (Brussels), Oct. 19, 2016.

CertifHy, "CertifHy Scheme, Subsidiary Document, Procedure 1.1 GO Issuing," 2019-0311.

Jeff St. John, "Green Hydrogen in Natural Gas Pipelines," Green Tech Media, Nov. 30, 2020 (https://tinyurl.com/y3ela2nf).

National Grid, "Our Plan: National Grid Net Zero by 2050," Sep. 2020 (https://tinyurl.com/y36jaxc6).

Christopher Findlay, "What's your purpose? Reusing gas infrastructure for hydrogen transportation," Sep. 11, 2020 (https://tinyurl.com/y5nmmgp7).

Peter Adam, et. al., "Hydrogen infrastructure—the pillar of energy transition," Seimens Energy, Gascade Gastransport, Nowega, 2020, pp. 4,7-21 (https://tinyurl.com/yyejnnpf).

Per S. Heggem, "Storage and transport of compressed hydrogen," International Workshop on Renewable Energy and Hydrogen Export, Mar. 23, 2015 (https://tinyurl.com/y4cxhlke).

(56) References Cited

OTHER PUBLICATIONS

Fiber Glass Systems, "Fiberspar Engineering Guide: Spoolable LinePipe," National Oilwell Varco brochure, Sep. 2020 (https://tinyurl.com/y69l8h6l).
Fiber Glass Systems, "Fiberspar LinePipe: Corrosion-resistant, cost-efficient fiberglass pipe," National Oilwell Varco brochure, 2017 (https://tinyurl.com/y4b6gtk2).
Barton Smith, et. al., "New Materials for Hydrogen Pipelines," 2005 DOE Hydrogen Program Review Report, May 23, 2005 (https://tinyurl.com/y26r8xnm).
Hydrogen and Fuel Cell Technologies Office, "Hydrogen Pipelines," DOE Office of Energy Efficiency & Renewable Energy, Viewed on line Dec. 2, 2020 (https://tinyurl.com/y8x8oo).
Dr. Thad Adams, "Evaluation of Natural Gas Pipeline Materials for Hydrogen Service," Savannah River National Laboratory, Jan. 5, 2005, pp. 15-19 (https://tinyurl.com/9wxfmvzt.
J.L. Gillette and R.L. Kolpa, "Overview of Interstate Hydrogen Pipeline Systems," Argonne National Laboratory, Nov. 2007 (https://tinyurl.com/y2shsxkp).
Thad Adams, et. al., "Evaluation of Natural Gas Pipeline Materials for Hydrogen/Mixed Hydrogen-Natural Gas Service," DOE Review Report, Nov. 2005 (https://tinyurl.com/y56qvh2y).
R. Davis Smith, et. al., "Interfacial Stability of Thin Film Fiber-Optic Hydrogen Sensors," 2002 U.S. DOE Hydrogen Program Review (https://tinyurl.com/yyrd3euw).
U.S. Department of Energy, "Department of Energy Hydrogen Program Plan," DOE/EE-2128, Nov. 2020, pp. 18-24, 44 (https://tinyurl.com/y64d2x4r).
U.S. Department of Energy, "DOE Technical Targets for Hydrogen Delivery," Accessed Dec. 2, 2020 (https://tinyurl.com/y49p5nf7).
U.S. Department of Energy, "Hydrogen and Fuel Cells Technologies Office Multi-Year RD&D Plan: Section 3.2 Hydrogen Delivery," Aug. 2015 (https://tinyurl.com/y4mt6nqa).
U.S. Department of Energy, "Hydrogen and Fuel Cells Technologies Office Multi-Year RD&D Plan: Section 3.3 Hydrogen Storage," May 2015 (https://tinyurl.com/y21bgg4z).
D.S. Mallapragada, et. al., "Can Industrial-Scale Hydrogen from Commodity Technologies Be Cost Competitive by 2030?," Cell Reports, Sep. 23, 2020 (https://tinyurl.com/y2ehgcqy).
SGN Natural Gas, "We're preparing to deliver the world's first 100% green hydrogen network," May 18, 2020 (https://tinyurl.com/y4pasjw2).
SGN Natural Gas, "H100 Fife: Proposed hydrogen production, storage and demonstration facilities" (Illustration and Flex pipe image), Nov. 2020 (https://tinyurl.com/y6mt93zy).
SGN Natural (https://tinyurl.com/Gas, "SGN y3mr957f; H100 Fife Virtual https://tinyurl.com/y6f4enyp Exhibition Boards and 1-3," https://tinyurl1-2020 I.com/y6on3a3j).
Energy Network Association, "Gas Goes Green: Delivering the Pathway to Net Zero," Mar. 2020 (https://tinyurl.com/y5efgqip).

National Grid Group PLC, "Ofgem green-lights funding for net zero projects," Nov. 30, 2020 (https://tinyurl.com/y3dlbek6).
Cadent Gas Ltd., "HyMotion: Network-supplied hydrogen unlocks low carbon transport opportunities," Jun. 2019 (https:/tinyurl.com/y25jx91w).
Sarah Deasley, et. al., "Hydrogen Blending and the Gas Commercial Framework," Frontier Economics Ltd., Sep. 2020 (https://tinyurl.com/y6rvbwev).
S. Bruce, et. al., "National Hydrogen Roadmap," CSIRO (Australia), 2018, pp. xv-xvii, 26-34 and 88 (https://tinyurl.com/y2c7wb6z).
Mike Watson, Existing gas pipeline infrastructure could be key to future hydrogen refueling stations, Stuff (NZ Website) Nov. 17, 2020.
Michael Ball, et. al., "Large-Scale Hydrogen Delivery Infrastructure: Task 28 Final Report," Intl Energy Agency, Aug. 2015, pp. 32-36, 45-48, 52, 74.
International Energy Agency, "The Future of Hydrogen, IEA G20 Hydrogen report: Assumptions annex," Jun. 14, 2019, pp. 7-8 (https://tinyurl.com/y6oxtb 7b).
Joakim Andersson, "Large-scale storage of hydrogen," Intl Journal of Hydrogen Energy, May 3, 2019, pp. 11902-11904 (https://tinyurl.com/y6gehbqu).
A. Gandolfi, et al., "Green Hydrogen: The next transformational driver of the Utilities industry," Golden sachs, 100-30-2020, pp. 34-37, 55-56.
Fuel Cell Works, "Tenaris Partners with Nel Hydrogen for CA Hydrogen Truck Refueling Network," Nov. 25, 2020.
The Hydrogen Strategy for Canada, Dec. 2020, pp. 39-42.
R.K. Ahluwalia, et al., "System Level Analysis of Hydrogen Storage Options," US DOE Hydrogen and Fuel Cells Program, May 19, 2020, pp. 6, 13 & 25.
R.K. Ahluwalia, et al., "System Level Analysis of Hydrogen Storage Options," US DOE Hydrogen and Fuel Cells Program, Apr. 29, 2019, pp. 6-7 & 12-21.
W.J. Brown, et al. "Safety Standard for Hydrogen and Hydrogen Systems," NASA, Feb. 12, 1997, pp. 2-5; 2-6; 5-8, 5-10; 5-39 to 5-41; & 6-1 to 6-5.
S. Woods, et al. "Guide to Safety of Hydrogen and Hydrogen Systems," ANSI/AIAA, Dec. 11, 2017, pp. 51-52; 56-57;83, 102;106-107;124-130;138-139;166-170.
Congressional Research Service, "Pipeline transportation of Hydrogen: Regulation, Research, and policy," Mar. 2, 2021, pp. 5-7, 12-17 &22-23.
Barton, Smith, et al., "Composites Technology for Hydrogen Pipelines," Oak Ridge and Savannah River National Labs, Sep. 25, 2007, pp. 3-7 & 10-17.
Nexant, "Final Report: Hydrogen Delivery Infrastructure Options Analysis" Mar. 2014, pp. 3-8, 15-29, 53-59, 64-67, 93-103, 134-139, 195-207 & 319-348.

* cited by examiner

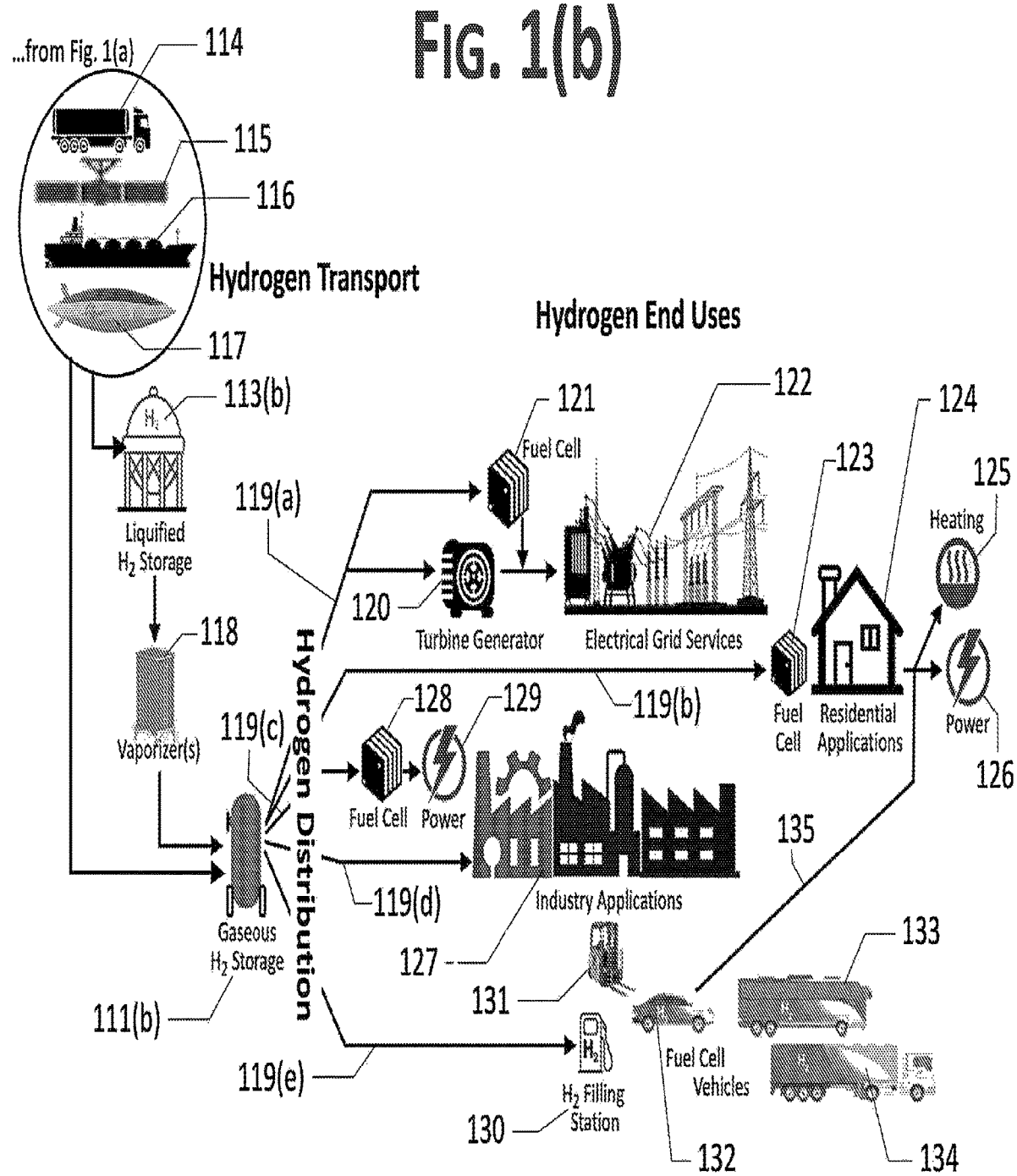

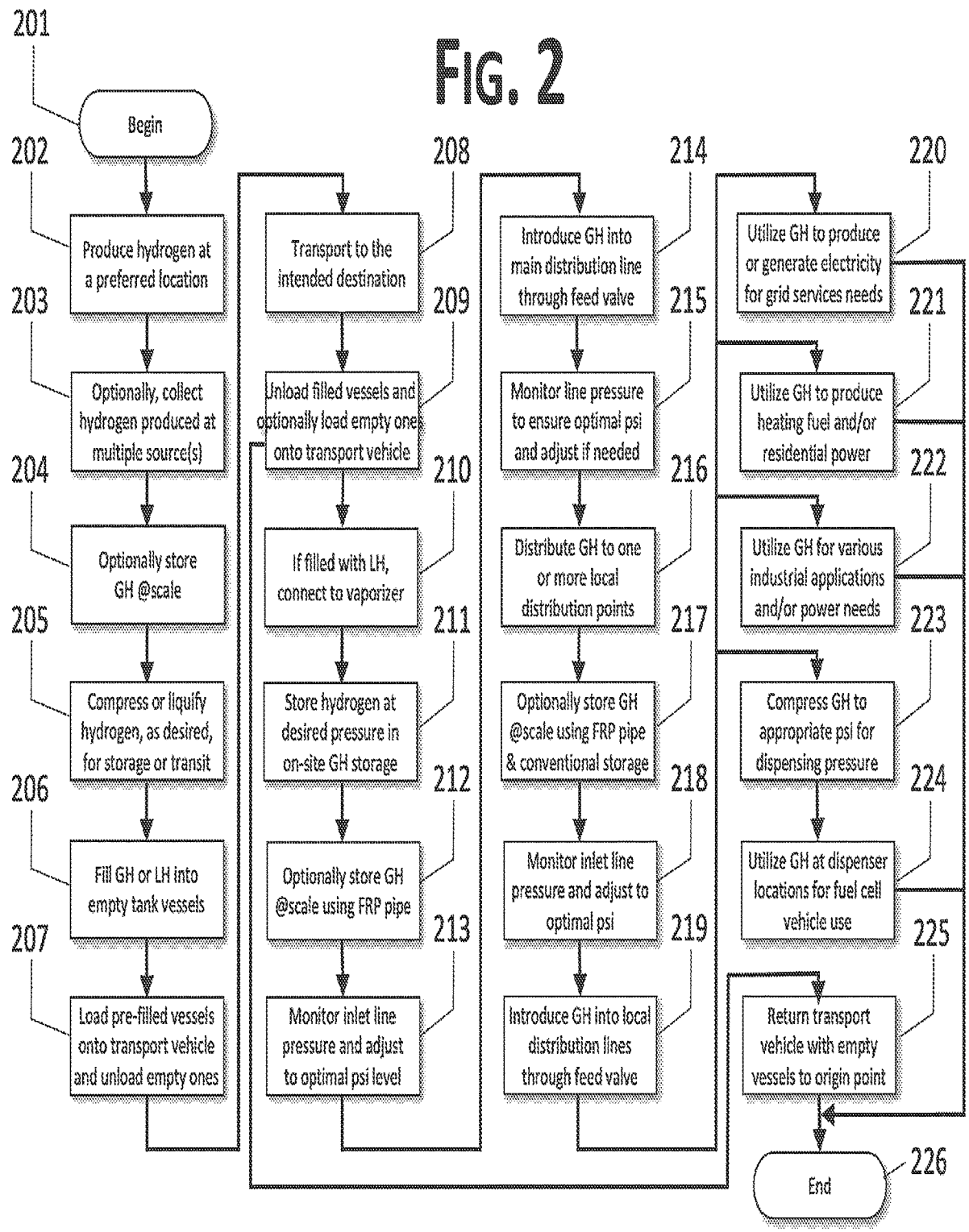

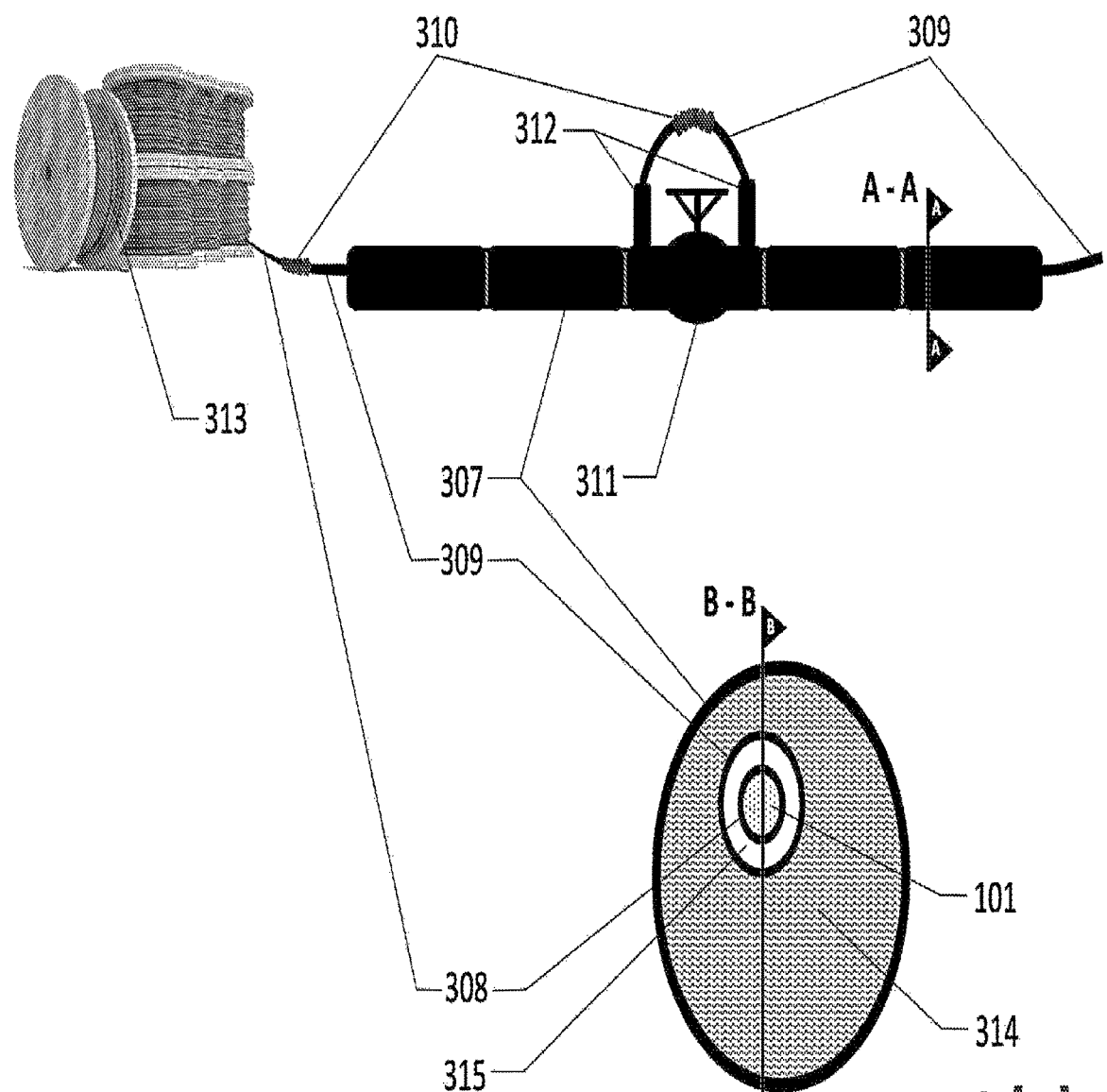

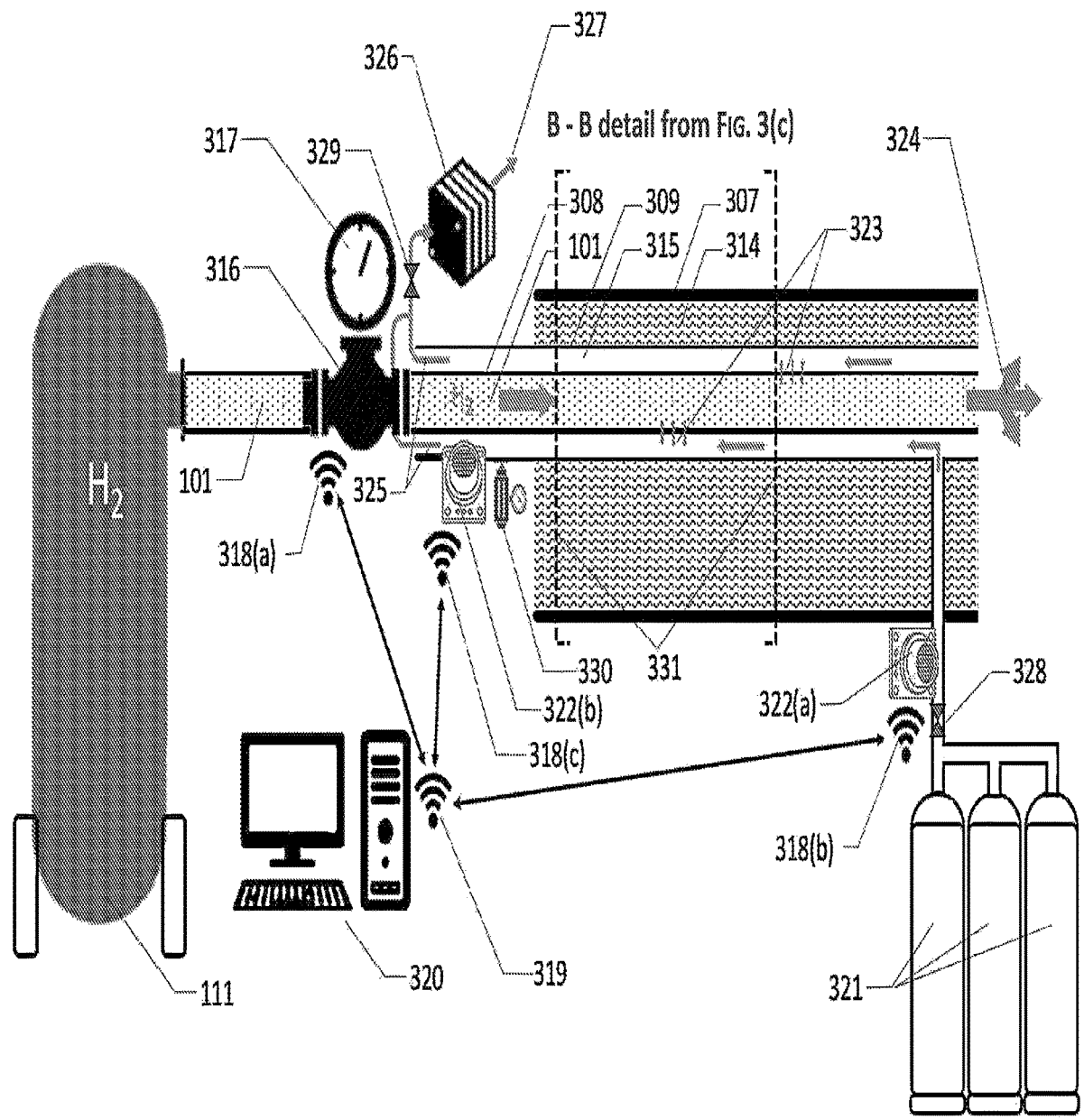

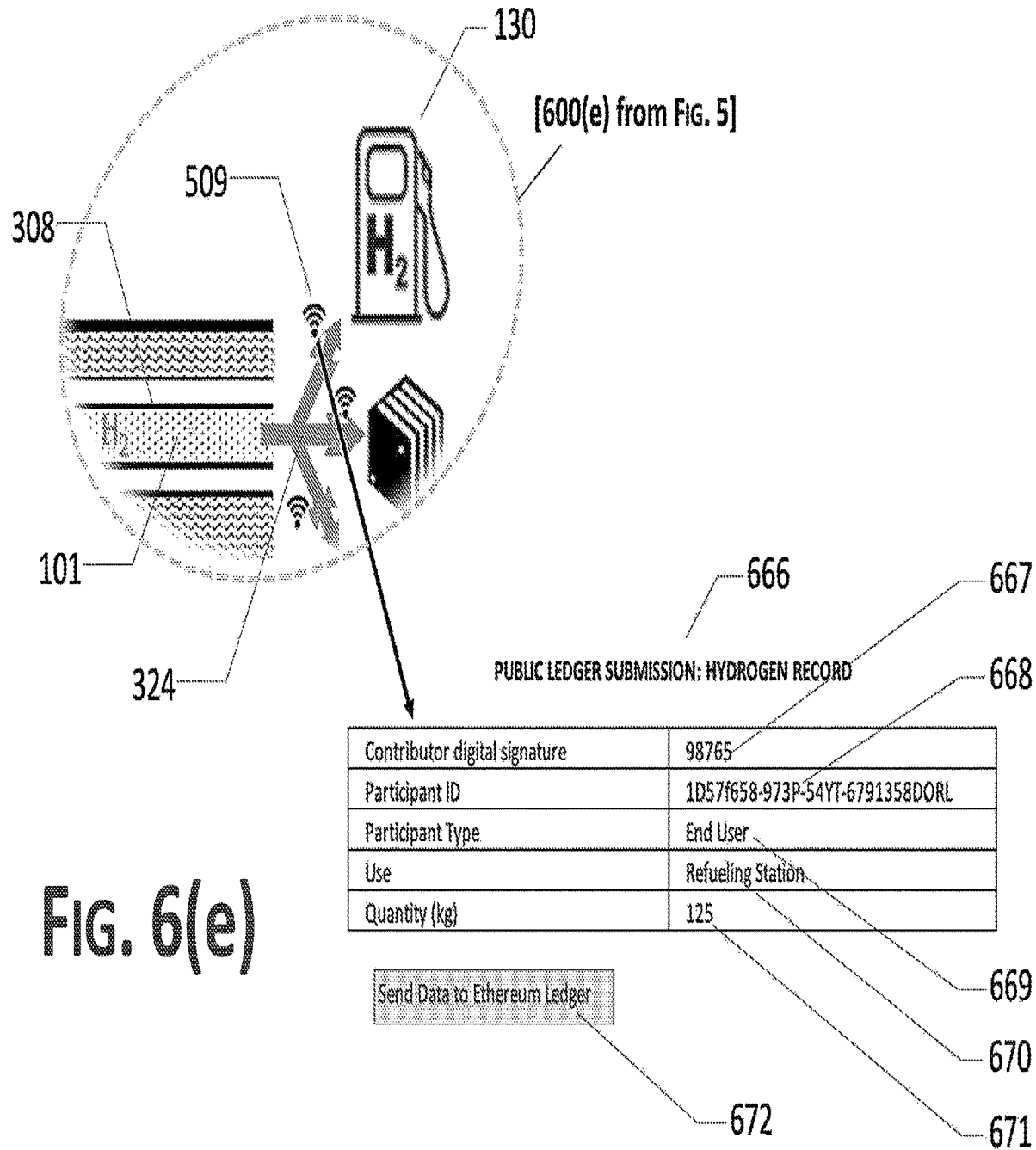

METHOD AND APPARATUS FOR DELIVERING HYDROGEN

CROSS REFERENCE TO RELATED APPLICATIONS

This application is a Continuation-In-Part of U.S. patent application Ser. No. 17/830,486, filed Jun. 2, 2022, which is a continuation of U.S. patent application Ser. No. 17/529,801, now U.S. Pat. No. 11,441,737, filed Nov. 18, 2021, which is a divisional of U.S. patent application Ser. No. 17/093,771, now U.S. Pat. No. 11,236,864, filed Nov. 10, 2020, which claims priority to U.S. Provisional Patent Application No. 63/106,148, filed Oct. 27, 2020. The entire teachings of the above application are incorporated by reference.

BACKGROUND

Field of the Invention

The subject technology generally relates to the storage of energy at scale and the transport of hydrogen from wherever it is produced, to the locations where it is needed by end users and/or from which it can be distributed to such end users. While the subject technology may be used for transporting hydrogen produced from any source, it is particularly useful for reducing the length of time, capital investment and complexity involved in securing requisite approvals, acquiring rights of way, installing, transporting, and distributing "green" hydrogen from the locations where it can be produced most advantageously to a plurality of individual end use locations such as electric utility substations, commercial and industrial facilities, filling stations, and homes of consumers wishing to employ hydrogen as a clean, renewable energy source in lieu of fossil fuel.

The subject technology also provides a method of storing energy that is lower in cost and has significantly greater energy retention compared to battery technology, and that affords a more cost-effective, more readily scaled, and lower maintenance option for new hydrogen at scale infrastructure than storing hydrogen in traditional hydrogen storage tanks. In addition, the subject technology provides for testing, data collection and monitoring both to assure that hydrogen leaks are contained and do not create a safety or environmental risk, and to provide assure that the purity levels of the hydrogen will be acceptable to end users and that its providence is known.

Background of the Invention

According to a report from Bank of America Global Research, because the point of economically producing hydrogen from renewable energy sources is being reached, hydrogen is at a tipping point, with the potential to generate $2.5 trillion of direct revenues and $11 trillion of indirect infrastructure by 2050. Although the technology to produce hydrogen from water through a process known as "electrolysis" has been used for decades, broad systemic use of hydrogen as a replacement for fossil fuels or for electrical energy storage at scale has yet to reach an inflection point and achieve mainstream use. As the Bank of America report states, this situation is now changing due to: (1) the falling cost of renewable energy from wind and solar radiation; (2) the declining cost and improved efficiency of electrolyzer systems that can use such renewable energy to produce hydrogen from water, with pure oxygen as the only by-product; (3) improvements in the efficiency, durability, cost and flexibility of fuel cells that convert hydrogen back to electricity with clean water as the only by-product; (4) the expansion of potential end-markets for green hydrogen as a result of the global focus on decarbonization and sustainability; and (5) a legislated market for hydrogen as governments adopt increasingly aggressive clean energy policies and impose regulatory requirements to decarbonize the energy system including the electrical grid and transportation market sectors.

According to the report, "green" hydrogen (e.g., a term referring to hydrogen that is produced from renewable resources) could be a critical component in the fight against global warming, providing up to 24% of global energy requirements by 2050, and in the process cutting harmful emissions by up to 30%. Bank of America reasons that because it is the only clean molecule able to simultaneously satisfy our energy needs for transportation and generating electrical power, hydrogen will play a major role for the increasing number of countries and companies signing legally binding pledges to achieve net zero carbon emissions by 2050. Accordingly, a number of governments, notably including countries within the European Union, United Kingdom, Canada, China, Japan, Korea, and Australia, are starting to provide strong policy support including increased carbon prices and funding to develop hydrogen production capacity and associated infrastructure. Through its "H2@Scale" initiative and Energy Efficiency and Renewable Energy (EERE) Office, the U.S. Department of Energy (DOE) has also sought to accelerate hydrogen research, development, demonstration and implementation activities.

Effecting a worldwide transition to a "hydrogen economy" faces a number of practical technical, financial, and logistic challenges. One of the longstanding challenges that has received relatively little attention involves developing new and improved approaches for transporting and distributing hydrogen from places where it is produced, to the locations where it is needed by the end user. Existing pipelines are ill-suited to being converted to hydrogen for a number of technical reasons including embrittlement of the pipe and valve materials. Ulf Bossel, Baldur Eliasson and Gordon Taylor stated in their 2004 paper entitled, "The Future of the Hydrogen Economy: Bright or Bleak?", that "most attention has been given to the apparent benefits of hydrogen in use, while the upstream aspects of a hydrogen economy are rarely addressed." These authors argue that upon adding the energy required to package, handle, store and transport hydrogen to the energy required to make it, the future energy economy "is unlikely to be based on elemental hydrogen."

The challenge stems from the fact that hydrogen's relatively low volumetric energy density makes its transport, storage and dispensing highly inefficient; and presently constitutes one of the most significant cost and energy inefficiencies to its broad adoption and use as an energy carrier. This problem is exacerbated by the fact that the locations where low-cost renewable energy sources naturally exist from which green hydrogen can be produced most economically frequently are remote and sparsely populated; and as a result, tend to be inversely correlated with locations that have the highest demand for clean-burning fuel.

Electricity prices comprise between 60% and 75% of the cost of green hydrogen. Accordingly, locations that have a natural source of high volumes of low-cost renewable energy capacity from solar radiation (such as equatorial desert regions), wind energy (such as mountain passes and island inlets), hydropower (such as near large bodies of water with significant elevation changes) and/or geothermal heat (such as near active volcanos or vents), enable hydrogen to be produced at a significantly lower cost per kilogram. However, these locations where high volume, low-cost renewable energy sources exist in nature are generally not proximate to industrial centers and/or large population density, making costs a much more significant factor.

Hydrogen transportation and distribution costs can be minimized by locating production at or very close to the point of use, and this approach is being aggressively pursued through the EU and UK, where so called "hydrogen hubs" or "hydrogen valleys" are being developed, as well as here in the U.S. However, distributing production to the point of use results in higher production costs because economies of scale are lost; and dense population centers and areas with high commercial and industrial activity also commonly have higher power and land costs. Attempting to strike a balance between these extremes is also challenging. If hydrogen is produced centrally to take advantage of economies of scale, the longer transport distances can significantly increase delivery costs. And attempting to produce industrial quantities of hydrogen semi-centrally (closer to the location of large off-takers and point of use) to reduce transportation distances is frequently constrained by space limitations, high land costs, higher energy costs, and very little excess renewable energy capacity. Irrespective of where hydrogen is produced, there exist heightened challenges and costs to create "middle-mile" and "last mile" distribution, as well as concerns about public safety given the widely held and deeply engrained perception that hydrogen is more dangerous than fossil fuels.

For these reasons, delivery costs are significant in all cases and must be minimized. Currently, hydrogen transport trailers and pipelines are the most commonly used options for delivering hydrogen from the point of production to where hydrogen is used. Under the former option, gaseous hydrogen is compressed from the relatively low pressure of 20-30 bar (290-435 psi) at which it is commonly produced by an electrolyzer, to 180 bar (~2,600 psi) or higher; and transported in long cylinders that are stacked on a trailer that a tractor, train, or ship hauls. Hexagon is a global leader in the manufacture of Type 4-rated carbon fiber cylinders that are 70% lighter than steel and produced in lengths up to its 40' long Titan® tanks that hold hydrogen at up to 950 bar (approximately 13,750 psi). Referred to by the company as a Mobile Pipeline®, such cylinders provide a ready solution for storing and transporting hydrogen to locations that are not on a grid, or where it is economically or logistically infeasible to build a pipeline. While practical in the short term, transporting hydrogen this way is labor-intensive, expensive from a per-kilogram-delivered basis, and generally not extensible as a long-term replacement for the existing fossil fuel transmission and distribution infrastructure.

Although it is well known that gaseous hydrogen can be transported through pipelines much like natural gas is today, experts acknowledge that the high initial capital costs of new pipeline construction constitute a major barrier to dramatically expanding the hydrogen pipeline delivery infrastructure. For this reason, researchers have focused on overcoming technical concerns including (1) the potential for hydrogen to embrittle the steel and welds used to fabricate existing steel pipelines; (2) the need to control hydrogen permeation and leaks; and (3) the need for lower cost, more reliable, and more durable hydrogen compression, liquification, and storage technologies. The US Department of Energy's H2@Scale program and similar research efforts in other countries have focused on two potential solutions.

The first of these, which has been advanced by Oak Ridge National Laboratory (ORNL) and Savannah River National Laboratory (SRNL), involves the use of fiber reinforced polymer (FRP) pipelines such as Fiberspar LinePipe™, a spoolable product consisting of an inner thermoplastic pressure barrier reinforced by high-strength glass fibers embedded in an epoxy matrix that is manufactured by National Oilwell Varco (NOV). Other composite pipe manufacturers including SoluForce BV (Pipelife/Wienerberger); Thermoflex/Baker-Hughes (formerly Polyflow); Stohm (formerly Airborne Oil & Gas); Shawcor; FlexStream; SmartPipe; FlexSteel Pipeline Technologies; and Future Pipe Industries produce or could produce similar pipe (such products, collectively "FRP spooled pipe"). FRP spooled pipe has the advantages of being available commercially through NOV and its competitors; and having been used extensively for many years in the oil and gas industry.

NOV estimates that over 80 million feet (more than 15,000 miles) of its Fiberspar LinePipe is used in oilfield service in a wide range of temperature and terrain-specific installations including laid on surface, buried in conventional open ditch, and installed inside of failing steel pipeline for remediation purposes. Its FRP spooled pipe is available in diameters of between 2" and 6", in continuous lengths up to 9,000 ft (2740 m) on reels for rapid installation. Based on testing that has been done by SRNL and ORNL, SRNL and the American Society of Mechanical Engineers (ASME) have codified FRP spooled pipe up to 6" in diameter in ASME B31.12 ("Hydrogen Piping Code") for gaseous hydrogen transmission up to 2500 psi and a design life of 50 years. NOV, Future Pipe Industries, and others also manufacture larger diameter jointed composite pipe that can be used for hydrogen transmission if concerns about hydrogen permeation and potential connector leakage are adequately addressed. Depending on the manufacturer, such jointed composite pipe generally ranges in diameter from 12" to over 40"; is designed for pressures of between 3000 psi (207 bar) in the smaller diameters and 750 psi (52 bar) at the larger; comes in lengths of approximately 49'; and uses various connectors with gaskets and other specialized fittings that are designed to minimize the leakage of gas once in service. Like FRP spooled pipe, such larger diameter jointed composite pipe (collectively "jointed composite pipe") shares the advantage of being lighter in weight and faster to install than traditional steel pipe.

Researchers estimate that use of FRP pipeline will result in a savings of about 20% versus steel pipe because it can be installed in much narrower rights of way and can be obtained in section lengths that are much longer than steel, thereby minimizing welding requirements, and avoiding the need for coatings or x-rays because the FRP pipeline is non-corrosive. According to estimates by ORNL, the total capital investment (in 2007 $) for an FRP hydrogen pipeline would be just under $600,000 per mile, including approximately $350,000 per mile for FRP pipeline, materials, and installation; and $250,000 per mile for estimated right of way acquisition and permitting. The ORNL study notes this cost compares favorably to the capital investment estimate of $636,000 for a 16-inch steel pipeline.

The second alternative involving pipeline transport that researchers have viewed as a promising way to grow the hydrogen delivery infrastructure is to adapt the expansive natural gas transmission and distribution infrastructure to accommodate hydrogen.

Stimulated by the EU's "Hydrogen Strategy for a Climate-Neutral Europe" in July 2020, and indications of interest by the G20, Germany and Japan in developing hydrogen technology, German pipeline operators Nowega and Gascade, together with Siemens Energy, prepared and released in October 2020 a comprehensive white paper studying practical aspects of converting natural gas pipelines as pillars of a future hydrogen-based energy transition. Similar efforts are taking place elsewhere across the EU and in the UK, as well as in the US, Australia, New Zealand, South Korea, and Japan. This alternative contemplates converting existing natural gas pipelines and storage facilities to carry a blend of natural gas and up to about 20% hydrogen.

Thisvi, Greece-based Corinth Pipeworks recently announced that it is executing orders for 440 km of steel pipe with Italy-based SNAM, one of the world's largest energy infrastructure companies. This pipe will be among the first high-pressure, newly manufactured pipes certified to transport up to 100% hydrogen for a transmission pipeline in Europe. Produced with L415ME steel grade with an outside diameter of 26" (660 mm) and thicknesses of 11.1 mm and 15.9 mm, these pipes are being tested against the framework of ASME B31.12 Option B standard for hydrogen pipe. According to published reports, these new pipes include an external 3LPE anti-corrosion coating, an internal liquid epoxy lining, and are designed to carry 100% hydrogen at a maximum pressure up to 3000 psi (207 bar). These provide one example of so-called "steel pipe" which will be understood as referring to any sort of metal pipe or hybrid materials comprising layers of metallic and non-metallic materials. As used herein FRP spooled pipe, jointed composite pipe, steel pipe, and pipelines made from new materials meeting such established standards and their counterparts now and in the future, are collectively referred to herein as a "hydrogen delivery line".

Although almost all hydrogen is currently used at or near the location of production, McKinsey & Company forecasts that by 2030, roughly 30% of global hydrogen production will be transported as an export commodity, either using ships or through pipelines. Countries with low cost, abundant renewable resources already have (or are considering adopting) roadmaps for producing green hydrogen for export. Other countries with a significant existing investment in hydrocarbon fuel production are considering modifications and plant enhancements that will enable them to produce so-called "blue hydrogen" in conjunction with carbon capture and sequestration (CCS) technology. For transport by ship, many are exploring conversion of hydrogen to ammonia or other liquid organic hydrocarbon compounds (LOHCs) as a way to increase energy density and reduce transport challenges.

Blending hydrogen with natural gas and/or converting it to another LOHC requires that the hydrogen be separated out and purified. This raises an issue with respect to providing hydrogen without impurities to be used, for example, in fuel cells for mobile vehicles that require hydrogen of at least 99.7% purity. Impurities and contamination can result from the process used to produce the hydrogen, as well as from mixing hydrogen with natural gas in transmission pipelines, converting hydrogen to ammonia, or binding it to another LOHC for transport purposes. Even trace amounts of several impurities such as carbon monoxide or hydrogen sulfide can severely poison polymer electrolyte membrane (PEM) fuel cells which are commonly used for transport and mobility applications.

Gaseous hydrogen for fuel cell electric vehicles (FCEVs) must meet the international quality standard ISO14687-2019, which contains maximal control thresholds for a number of impurities that could damage the fuel cells or the hydrogen storage and distribution infrastructure. A European standard, EN17124, was approved in 2018 (CEN/TC 268, 2018), with the same maximal levels of impurities as in ISO14687-2019. The SAE Fuel Cell Standards Committee updated its standard for hydrogen for FCEVs, applicable in the U.S., and it has the same maximal levels of impurities as in ISO14687-2019. In addition, various policy makers are pursuing incentive programs for production and use of hydrogen that is made from renewable sources and that will not result in carbon ($CO_2$) or nitrous oxide ($NO_X$) emissions.

In their book chapter entitled "Hydrogen production and containment," George Rawls and Thad Adams of Savanah River National Labs, and Norman Newhouse of hydrogen tank manufacturer, Lincoln Composites, state that "a process or distribution system that contains hydrogen will always leak." (Emphasis added). They cite NASA Report NSS-1740.16, which provides a review of 145 industrial hydrogen accidents, 22% from undetected leaks, and 14% from piping and pressure vessel rupture. The article identifies two modes of hydrogen leakage—physical leaks and permeation leaks. Physical leaks are due to imperfections in joints, seals, welds or brazed connections, flaws in sealing surfaces, defects in the pressure boundary, or improper installation of mechanical joints. Permeation leaks take place through both metals and polymers by atomic or molecular diffusion through the pipe and vessel materials even if the component serving as a pressure containment boundary has absolutely no flaws. In this regard, hydrogen is unique by virtue of having a permeation rate through metals that is between 15 and 20 orders of magnitude greater than other common gases such as nitrogen and oxygen.

Because hydrogen, with a molecular weight of 2, has such a high propensity to leak, with potentially devastating results, it is imperative that a piping system be designed both to limit the opportunity for uncontrolled leaks as well as to provide a high degree of assurance that there will be rapid detection and remediation of leak points that cannot be avoided before they are sufficiently large to create a safety risk. Rapidly detecting and remediating hydrogen leaks that will inevitably occur from any to-be-created hydrogen pipeline network irrespective of the material used to construct the hydrogen delivery line represents an important consideration to establishing widespread confidence in the safety of hydrogen, and in turn to broadly transitioning society from fossil fuel to hydrogen use.

In this regard, perhaps the closest analogy for the future hydrogen transmission and distribution pipeline system is today's natural gas pipeline network, which itself consists of all different sizes of pipes fabricated from many different materials. Several collection studies authored by Zachary Weller and his colleagues at Colorado State University and the Environmental Defense Fund have revealed that considerably greater leakage takes place from pipeline mains in the natural gas distribution system (e.g., joints, the main tube body, valves, and the T-connection to service lines) than previously anticipated. In fact, a June 2022 report published by the Frontier Group based on U.S. Department of Transportation, Pipeline and Hazardous Materials Safety Administration (PHMSA) data estimates that a gas pipeline incident occurs somewhere in the U.S. approximately every 40 hours. From 2010 through nearly the end of 2021, almost 2,600 pipeline incidents related to the release of gas occurred in the United States that were serious enough to be reported to the federal government, 328 of which resulted in explosions. These explosions and fires killed 122 people and injured 603. Beyond the loss of life, waste, cost and safety implications, such natural gas pipeline leaks represent a significant environmental concern due to the high methane content in natural gas; and thus when leaked, the corresponding release of an even more potent greenhouse gas than CO2. These statistics are also important because, as Rawls, Adams and Newhouse point out, tests conducted by the Institute of Gas Technology (IGT) have shown that from the same size hole, hydrogen will leak at a rate that is approximately 3 times faster on a volumetric basis than natural gas.

Historically, the certainty that hydrogen will leak through any material and that such leaks will increase with the amount of pressure the hydrogen is under, have been addressed by experts and standards bodies by requiring thicker pipe wall surfaces, reinforcing the pressure boundary component, and adding various coatings designed to reduce permeation levels. Common materials used to create a so-called permeation barrier coating include gold, copper and aluminum, and where the thicker the coating the lower the permeation. Depending on manufacturer, epoxy coatings and thick layers of polymers are also used in addition to employing hybrid materials and layers of materials known to cut down on leakage, such as austenitic stainless steels, nickel allows, copper alloys, and various non-metallic materials. This has the result of increasing the cost of hydrogen pipelines and requiring frequent testing of the pipe and valve surfaces, welds and gaskets, also with adverse cost implications.

Unless such risks are much better mitigated, pipelines used for hydrogen delivery can reasonably be anticipated to present even greater leakage concerns than the natural gas network. There are a number of reasons for this assessment. Hydrogen is a smaller molecule and thereby is more susceptible to permeation and leakage, including through microscopic holes, fractures and defects in pipe, welds, fittings, gaskets, and valves. Hydrogen has a broader flammability range in air of 4-75 vol %, compared to 5.28-15 vol % for methane; a lower ignition energy than methane (i.e., 0.018 mJ versus 0.28 mJ); and the explosive character of hydrogen may lead to severe safety hazards in case of leakage or failure of a pipeline. Like natural gas, hydrogen is both colorless and odorless, but unlike natural gas which adds an odorant such as mercaptan (a fowl smelling gas additive) to enable human detection of leaks, odorization degrades the performance of hydrogen fuel cells and, according to published studies, appears to be problematic for most advanced hydrogen storage options. Moreover, given hydrogen's lower volumetric energy density, higher pressure levels are necessary to deliver the same BTU value as methane and other fossil fuels; but higher pressure adversely affects stress and fatigue factors, and in turn greatly increases the risk of leakage.

A July 2022 report by the Environmental Defense Fund (EDF) shows that without far better protection against leakage, hydrogen leaks and venting—considered by many to be environmentally benign—may in fact present environmental risks on account of indirect warming effects once the gas rises into the troposphere and stratosphere. Hydrogen is lighter than air, which (setting aside the potential of such environmental risk) tends to be helpful from a safety perspective if its release is unimpeded since it rapidly dissipates. However, should leaked hydrogen become trapped in a pocket such as in an underground vault or an enclosed utility corridor, and there become mixed with 4-6% of ambient air (approximately 40,000 ppm), this can create a dangerous explosion risk. This fact is directly related to the final factor.

Well-deserved or not, hydrogen carries with it a "stigma" among much of the general public. This stigma must be affirmatively overcome to ever envision the widespread adoption and distribution of hydrogen, particularly in highly populated areas such as in factories, along major public transport routes, and in densely populated areas where it is most needed as a clean energy alternative. As the foregoing statistics concerning deaths and injuries associated with natural gas leaks indicate, fossil fuels present safety hazards as well; and Toyota has made several compelling video demonstrations to show how much safer hydrogen is than gasoline. However, as exemplified by the 2019 explosion at a hydrogen fueling station in Norway that called into question the safety of hydrogen fuel cell vehicles and prompted both Toyota and Hyundai to freeze new sales of hydrogen fuel cell vehicles, should even a small fraction of the number of incidents that occur with respect to natural gas take place at or near the onset of building the hydrogen transport and distribution infrastructure, this will surely be internationally news worthy and result in lengthy delays to the burgeoning pipeline network required for the long-foreseen hydrogen economy to manifest. The EDF report concerning the climate concerns of hydrogen leaking into the atmosphere compounds the need for reducing the risk of leakage of all hydrogen delivery lines.

Hydrogen purity is another important issue for widespread use of hydrogen, particularly within the mobility sectors, such as for lightweight hydrogen fuel cell cars, medium- and heavy-duty hydrogen trucks, buses, trains, airplane and boats—all of which use PEM-stack fuel cell technology that in turn requires very high levels of hydrogen purity. To the extent multiple producers are anticipated to be contributing their product into a single pipeline, or distribution network, solutions must be found that will assure hydrogen purity across the network, provide for providence (as well as traceability) to help assure compliance and accountability, and in order to increase the ease with which income and costs can both be accounted for and revenue fairly distributed, including taking full advantage of existing and foreseen tax credit programs and financial incentives, as well as project financing.

What is needed, therefore, is a means for rapidly detecting and reducing the risk of leakage of hydrogen from hydrogen delivery lines and, in a preferred embodiment, for assuring the delivery of hydrogen at the purity level necessary for optimal operation at the end user location.

SUMMARY OF THE INVENTION

The subject technology overcomes these longstanding problems and limitations of the prior art, and provides a means involving less time, significantly lower capital cost, and far less complications associated with land use, right-of-way acquisition, permitting, construction and ongoing maintenance to transport hydrogen from the location where it is produced to the regions where it is most needed, its storage at scale, and its widespread distribution to end users across such market areas.

The subject technology provides a system, method and apparatus to cost-effectively transport, store and widely distribute hydrogen from locations where it is produced to where it is most needed. The subject technology overcomes many of the technological constraints involved in transporting, storing, and distributing hydrogen, and materially reduces prohibitively high installation costs, delays, land-use and permitting barriers. Irrespective of the pipeline composition, the subject technology reduces the safety and environmental risks associated with hydrogen permeation and leaks, effectively broadens the types of materials from which such hydrogen delivery lines can be made as well as the locations where new delivery lines can be installed for hydrogen transmission and distribution, and will contribute to reducing public concerns and anxiety regarding hydrogen proliferation, transmission and distribution.

Many regions have invested heavily in natural gas and oil pipelines that span great distances; and all cities, most towns, and many rural communities throughout the world have invested heavily in water, sewer and storm drain systems. Collectively herein, all of these pipelines and systems, including those presently in use, those that may have been decommissioned, and pipelines that have yet to be built, are referred to as "existing pipelines." Without limitation, as used herein, the term "existing pipelines" also includes underground utility lines, rail lines and tubes, including for future systems such as hyperloop. The land on which these existing pipelines are constructed has been acquired; rights-of-way and authorizing permits have been granted; and a huge investment has been made to excavate, install, and maintain these existing pipeline systems. Many of these existing pipelines and/or the right-of-way allocated for them have ample capacity that enable them to also be used as hydrogen distribution pipelines with the ability to transport and distribute hydrogen at any level of purity.

The subject technology includes preparing a hydrogen distribution pipeline by inserting a "hydrogen delivery line" into one or more of these existing pipelines or rights-of-way. Such hydrogen delivery line is made of a material such as (but not necessarily limited to) ASME codified FRP spooled pipe, jointed composite pipe, and steel pipe to carry pressurized hydrogen, which is in turn contained inside a larger diameter pipe that provides a means of collecting any hydrogen that permeates through or leaks from the hydrogen delivery line. A sweeper gas or liquid is flowed on the outside of the hydrogen delivery line to remove any hydrogen that has leaked from such line. Such sweeper gas or liquid will preferably be nitrogen, $CO_2$, natural gas, or water (although other gases or liquids are also possible); and depending on circumstances and individual operator preferences, in cases where a leak of hydrogen into the existing pipeline would not create a safety risk or an unacceptable level of contamination, the product flowing through such existing pipeline may itself be used in as such sweeper gas or liquid.

In other instances, including installations in existing or new right-of-way and where a potential leak of hydrogen into the contents of such existing pipeline would be unacceptable to the operator or could create a safety risk (such as when the existing pipeline contains ambient air), the hydrogen delivery line must be run inside an intermediate "safety pipe." This safety pipe is made from any material that is compatible with hydrogen and the contents of the existing pipeline (or where applicable, the soil composition, pH and moisture levels comprising such pipeline right-of-way); and the sweeper gas or liquid is in this case run inside the channel (e.g., in the annular space) located between the outside surface of the hydrogen delivery line and the inside surface of the safety pipe. According to the preferences of the system operator, the sweeper gas or liquid may be moved through the annular space at any speed. The sweeper gas or liquid can move either on a continuously flowing basis or on an intermittently flowing basis wherein it may be allowed to fill the channel—thereby effectively providing an inert gas or liquid "blanket" outside the hydrogen delivery line and inside the safety pipe—and only moved to the extent a sensor detects the presence of an unacceptable level of hydrogen, whereupon this hydrogen can then be swept out of the system before it constitutes a safety risk. Moreover, in an optional preferred embodiment, the system may include equipment enabling the operator to separate, remove and/or utilize the hydrogen from the sweeper gas or liquid, thereby providing value from that hydrogen content and returning the sweeper gas or liquid to a pure form.

In a preferred embodiment, the contents of the sweeper line are continuously tested for hydrogen levels, and the collected data therefrom are monitored to detect excessive permeation and/or leaks in the hydrogen delivery line. Should a leak be detected that exceeds a predetermined threshold level deemed acceptable, the flow of hydrogen into the hydrogen delivery line may be shut-off manually or programmed to be shut-off automatically, until the leak has been corrected. In another preferred embodiment, multiple hydrogen sensors are located at various intervals throughout the system, thus enabling the location of a hydrogen leak exceeding a predetermined threshold level to be more precisely identified, and the area of concern isolated and removed from service until the leak is corrected, with the balance of the system being able to be restored in the meantime.

In an optional preferred embodiment, a lighter-than-air airship can be used in conjunction with the foregoing system. The airship can carry bulk quantities of hydrogen from a geographic location where it is most-economically produced, to a terminus point at a strategic location relative to the existing pipeline distribution system. Once at this location, the tanks carrying hydrogen can be coupled to an inlet to the above-described hydrogen pipe, and the hydrogen discharged into said system. In another preferred embodiment, the transport of hydrogen using the airship can be in a liquid (cryogenic) state and, upon delivery at the destination point, a vaporizer is used to convert the hydrogen from liquid to gaseous form.

In at least one aspect, the subject technology relates to a hydrogen distribution system for transporting hydrogen from a hydrogen supply source to at least one end-user location. The system includes an existing pipeline and a hydrogen delivery line configured to carry pressurized hydrogen. The hydrogen delivery line is located inside the existing pipeline such that a sweeper gas or liquid within the existing pipeline flows around an exterior of the hydrogen delivery line and purges any hydrogen that leaks from the hydrogen delivery line. At least one inlet into the hydrogen delivery line is configured to allow hydrogen to be injected into the hydrogen delivery line. At least one outlet from the hydrogen delivery line is configured to allow hydrogen to be withdrawn from the hydrogen delivery line.

In some embodiments, the existing pipeline is a gas transmission pipeline, and the sweeper gas or liquid is one of the following: natural gas; liquid natural gas; or synthetic natural gas. In some cases, the system includes a safety pipe located inside of the existing pipeline and around the hydrogen delivery line such that a channel is formed between the exterior of the hydrogen delivery line and an interior of said safety pipe. The channel is sized to allow the sweeper gas or liquid to flow through the existing pipeline and along the exterior of the hydrogen delivery line. In some cases, the safety pipe is a plastic, metal or a composite. In some cases, the existing pipeline is a water pipeline, a sewer pipeline, or a storm drain pipeline. In some embodiments, the existing pipeline includes a gas transmission line coupled with at least one of the following: a water pipe; a sewer pipe; or a storm drain. The at least one inlet into the hydrogen delivery line can then occur in a gas transmission pipeline and the hydrogen withdrawn from the hydrogen delivery line occurs after the hydrogen has been transmitted through a water pipe, sewer pipe, or storm drain.

In some embodiments, the existing pipeline is a pipeline right-of-way, and the sweeper gas or liquid is one of the following: nitrogen, CO2, argon, helium, another inert gas, natural gas, air, water, or synthetic natural gas. In some cases, the system includes a safety pipe that is buried in or located on, under or adjacent to the existing pipeline right-of-way, or in a newly authorized right-of-way; and around the hydrogen delivery line such that a channel or annular space is formed between the exterior of the hydrogen delivery line and an interior of said safety pipe. The channel or annular space is sized to allow the sweeper gas or liquid to flow through such channel or annular space and along the exterior of the hydrogen delivery line. In some cases, the safety pipe is a plastic, a composite, or a metal. In some embodiments, the system includes at least one hydrogen sensor located at an exit of the safety pipe, the at least one hydrogen sensor configured to monitor for a presence and amount of hydrogen that has leaked from the hydrogen delivery line into the sweeper gas or liquid. In some cases, the system includes at least two in-line hydrogen sensors located at different locations within the existing pipeline. In some embodiments, the hydrogen delivery line is one of FRP spooled pipe, jointed composite pipe, or metal pipe. In some cases, at least one sensor monitors for pressure levels in the safety pipe or in the hydrogen delivery line.

In some embodiments, the system includes at least one hydrogen sensor located at an exit of the existing pipeline, the at least one hydrogen sensor configured to monitor for a presence and amount of hydrogen that has leaked from the hydrogen delivery line into the sweeper gas or liquid. In some cases, the system includes at least two in-line hydrogen sensors located at different locations within the existing pipeline. The system can include a data system configured to monitor the at least two in-line hydrogen sensors to determine a level of hydrogen for each in-line hydrogen sensor. The system can further include a recording system configured to separately record the hydrogen levels detected by each in-line hydrogen sensor. Additionally, the system can include a programmable alerting system configured to trigger an alert based on the hydrogen levels. In some embodiments, the system includes at least one shutoff valve configured to selectively isolate and close off sections of the hydrogen delivery line upon being triggered by the alert of the programmable alerting system. In some embodiments, the hydrogen delivery line is one of FRP spooled pipe, jointed composite pipe, or metal pipe codified for use with hydrogen.

In some embodiments, the system includes at least one coupling device, each coupling device connecting a first section of the hydrogen delivery line inside the existing pipeline with a second section of the hydrogen delivery line outside of said existing pipeline. In some cases, the hydrogen delivery line is made of FRP spooled pipe, jointed composite pipe, or metal pipe codified for use with hydrogen, and the second section of the hydrogen delivery line is a storage area.

In some embodiments, the hydrogen delivery line includes at least one hydrogen sensor. Each hydrogen sensor can be configured to separately produce data related to a detected hydrogen level. The system can further include a means for monitoring the hydrogen levels detected by each of the hydrogen sensors. The system can also include an alerting means (e.g., processor with a display, or other audio or visual output device) configured to generate an alert when the detected hydrogen level indicates that hydrogen is leaking from the hydrogen delivery line.

In some embodiments, the system includes at least one shutoff valve. Each shutoff valve is connected to a coupling. The shutoff valves are located at each interval of a pre-determined length of the hydrogen delivery line, each shutoff valve and coupling configured to selectively close. The system can include a processor configured to identify a location of a hydrogen leak based on the hydrogen levels detected by the hydrogen sensors. Each shutoff valve and coupling can be configured to close to isolate the hydrogen delivery line around the pre-determined length of the hydrogen delivery line in which the hydrogen leak is identified.

In some embodiments, the system includes a valve connected to the existing pipeline to control flow therethrough. The system can then include a first riser connected to the existing pipeline on a first side of the valve. Further, the system can include a second riser connected to the existing pipeline on a second side of the valve. The hydrogen delivery line can then be configured to direct hydrogen through the risers and coupling to bypass the valve.

In at least one aspect, the subject technology relates to a method of transporting hydrogen from a producing location to at least one end user location. Hydrogen is produced from an energy source at the producing location. The hydrogen is then stored in at least one hydrogen storage container. A hydrogen delivery line is located, or placed, inside an existing pipeline, the hydrogen delivery line configured to carry pressurized hydrogen. A sweeper gas or liquid is injected around the exterior of the hydrogen delivery line to purge any hydrogen leaking from the hydrogen delivery line. Hydrogen is injected into the hydrogen delivery line from the at least one hydrogen storage container. Hydrogen is withdrawn from the hydrogen delivery line at the end user location.

In some embodiments, the energy source is fixed at the producing location. In some cases, transporting hydrogen includes using at least one of the following: a truck; a train; or a ship. In some cases, transporting hydrogen further includes transporting the hydrogen using a lighter-than-air airship. In some embodiments, transporting the hydrogen using a lighter-than-air airship includes pumping the hydrogen into at least two vessels. In some cases, after pumping the hydrogen into the at least two vessels, the vessels are loaded onto the lighter-than-air airship, and in other cases the at least two vessels are permanently affixed inside the lighter-than-air airship. The lighter-than-air airship is flown to a terminus location. Hydrogen is unloaded from the lighter-than-air airship at the terminus location, in some cases by unloading the vessels in which case at least one empty vessel is loaded onto the lighter-than-air airship; and in other cases by draining hydrogen from the vessels and loading one or more cargo containers or loading a ballast such as water onto the lighter-than-air airship. At least one empty vessel is returned to the producing location; and in some embodiments such empty vessels include a minimum amount of liquid hydrogen, or ullage, to assure that such vessels are maintained at a cryogenic temperature. In some embodiments, the fixed energy source is a renewable energy source being at least one of the following: wind, solar, hydro, biomass, or geothermal power. In some cases, the hydrogen storage containers are made of FRP spooled pipe codified for use with hydrogen.

In some embodiments, the existing pipeline is a gas transmission pipeline, and the sweeper gas or liquid is one of the following: natural gas; or synthetic natural gas. In some cases, the terminus location includes a cradle having at least two anchor points configured to secure the lighter-than-air airship with tie-down cables. The cradle can be configured to rotate to point in a direction of oncoming wind.

In some embodiments, the method includes placing a safety pipe inside of the existing pipeline and around the exterior of the hydrogen delivery line. In some embodiments, the existing pipeline is one of the following: a water pipeline; a sewer pipeline; a storm drain pipeline; an underground utility corridor; a rail line; a tube; or a right-of-way therefor. In some cases, the existing pipeline includes a gas transmission line coupled with at least one of the following: a water pipe, a sewer pipe, or a storm drain. Injecting the hydrogen into the at least one inlet then occurs in a gas transmission pipeline. In such a case, withdrawing the hydrogen from the hydrogen delivery line occurs after the hydrogen has been transmitted through the storm drain.

In some embodiments, the at least one end user location is an electric utility substation. In some cases, the at least one end user location is a commercial or industrial facility. In some embodiments, the method includes utilizing the hydrogen in an industrial process feedstock. In some cases, the at least one end user location is a filling station for dispensing hydrogen to fuel cell vehicles. The filling station can, in some cases, compress the hydrogen to a pressure suitable for dispensing to hydrogen fuel cell cars. The filling station can, in some cases, compress the hydrogen to a pressure suitable for dispensing to hydrogen fuel cell trucks. In some embodiments, the at least one end user location is a residence.

In at least one aspect, the subject technology relates to a method of storing energy and utilizing stored energy. The method includes storing hydrogen in at least one spool of FRP spooled pipe codified for use with hydrogen. An energy producing system is fueled with the hydrogen. Electrical power is then produced with the energy producing system.

In some embodiments, the method further includes positioning at least one hydrogen sensor in the at least one spool of FRP spooled pipe. The at least one hydrogen sensor detects hydrogen leaks from the at least one spool of FRP spooled pipe. Electronic data is produced evidencing hydrogen leakage when hydrogen leaks are detected. The electronic data is monitored and at least one safety action is taken in response to detecting a hydrogen leak. The method can further include installing a shutoff valve and coupling at each interval of a pre-determined length along the FRP spooled pipe. In some cases, the method includes pinpointing a location of hydrogen leakage based on the electronic data and isolating the pre-determined length of FRP spooled pipe containing the location of hydrogen leakage using the shutoff valves. In some cases, the method further includes, after isolating the FRP spooled pipe containing the location of hydrogen leakage, removing and replacing the pre-determined length of FRP spooled pipe containing the location of the hydrogen leakage using the couplings. In some cases, the pre-determined length is one spool of FRP spooled pipe.

In some embodiments, the hydrogen is produced from renewable energy sources being at least one of the following: wind, solar, hydro, biomass, or geothermal power. In some cases, the energy producing system is a gas turbine. In some cases, the energy producing system is a fuel cell.

These and other elements of the subject technology are described through the use of the following drawings and written description.

BRIEF DESCRIPTION OF THE DRAWINGS

Various aspects of the present disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity; and/or several physical components may be included in one functional block or element. Further, where considered appropriate, reference numerals may be repeated among the drawings to indicate corresponding or analogous elements. For purposes of clarity, however, not every component may be labeled in every drawing. The figures are provided for the purposes of illustration and explanation and are not intended as a definition of the limits of the disclosure. In the figures:

FIG. 1(b) is a schematic diagram depicting removal of hydrogen from the transport structures, its storage in tanks, and distribution to various end users.

FIG. 2 is a block flow diagram illustrating the principles of this technology disclosure.

FIG. 3(b) is a side view of a hydrogen pipeline in accordance with the principles of this technology disclosure.

FIG. 3(c) is a section view of FIG. 3(b) showing use of a safety pipe in addition to the hydrogen delivery line.

FIG. 3(d) is a detailed cutaway view of the hydrogen distribution pipeline of FIG. 3(b) and associated elements for transporting and distributing hydrogen.

FIGS. 6(a)-6(e) depict, in accordance with an aspect of the present disclosure, an illustrative example involving: the production, testing, and injection of hydrogen into the hydrogen network; the testing of hydrogen flowing through the hydrogen network; and the removal of hydrogen from the hydrogen network, along with the data recorded at each of these points in the hydrogen network.

DETAILED DESCRIPTION

Figure 1A:
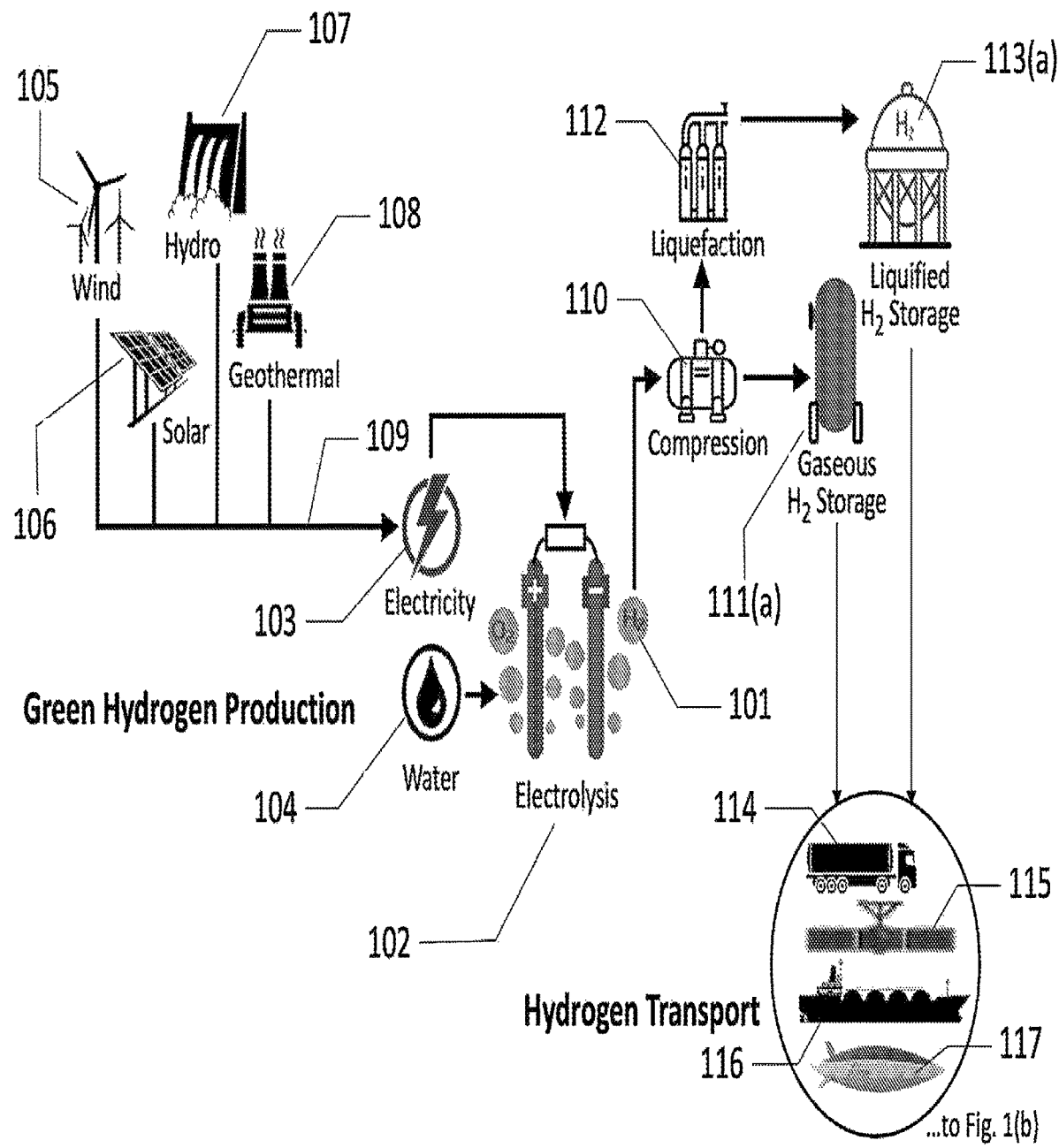
FIG. 1(a) is a schematic diagram depicting the production of "green" hydrogen, its storage and optional transport structures.

Each of U.S. patent application Ser. No. 17/093,771, filed on Nov. 10, 2020, and U.S. Provisional Patent Application No. 63/106,148, filed on Oct. 27, 2020, is incorporated herein, by reference, in its entirety.

In the following detailed description, numerous specific details are set forth in order to provide a thorough understanding of the aspects and implementations of the present disclosure. It will be understood by those of ordinary skill in the art that these may be practiced without some of the specific details that are set forth. In some instances, well known methods, procedures, components and structures may not have been described in detail so as not to obscure the details of the implementations of the present disclosure.

It is to be understood that the details of construction in the arrangement of the components set forth in the following description or illustrated in the drawings are not limiting. There are other ways of being practiced or carried out. Also, it is to be understood that the phraseology and terminology employed herein are for the purposes of description only and also should not be regarded as limiting.

Further, certain features, which are described in the context of separate implementations, may also be provided in combination in a single implementation. Conversely, various features, which are, for brevity, described in the context of a single implementation may also be provided separately or in any suitable sub-combination.

In one aspect of the present disclosure, the subject technology provides improvements over the prior art, including a new and unique system, method and apparatus for transporting hydrogen from where it is most advantageously produced, storing it at scale, and then distributing it to one or multiple points of end use in a manner that is more cost effective and that overcomes a number of long-standing technical challenges to enable the transition from fossil fuels to a hydrogen economy. In addition, features to reduce the risk of hydrogen leakage from the hydrogen delivery line; detect and provide for early remediation of hydrogen leaks; as well as to measure and record a purity level of the hydrogen as it flows thorough the hydrogen transport and distribution network are also provided. Still further, one aspect of the present disclosure is directed to provide provenance information for the hydrogen that is transported from the location where it was initially injected into the transportation and distribution network to the point of its end use.

As is known, cities, most towns, and many rural communities throughout the world are served by expansive natural gas, oil and other types of pipelines. In addition, all cities, towns and many rural communities have invested heavily in streets, highways and other transportation corridors; water, sewer and storm drain systems; and various utility corridors as essential public infrastructure; and a number of major cities have invested in underground transport systems such as tunnels, rail and subway lines, and are contemplating new transport and distribution systems such as the hyperloop and others. The land for these existing and proposed improvements has been acquired; rights-of-way and regulatory approvals have already been granted; and in many cases, substantial investments may have been made to survey, design, excavate, install and maintain them. These improvements and the rights-of-way on which they are constructed and/or are contemplated to be constructed are collectively referred to herein as "existing pipelines". A method and apparatus that will enable hydrogen to be safely transported and distributed within such existing pipelines, as herein disclosed, enables a much more cost-effective hydrogen delivery network than any other known or currently proposed alternative.

In another embodiment, adapting such existing pipelines to transport and distribute hydrogen entails inserting a hydrogen delivery line contained within a larger diameter safety pipe into the existing pipeline, although under certain conditions use of the safety pipe may be optional. As hereinafter described in detail, the hydrogen delivery line may be made of FRP spooled pipe, jointed composite pipe, steel pipe, new pipeline materials, or any combination thereof that meets currently established and newly codified standards for use with pressurized hydrogen. The safety pipe (and in one or more optional cases, the existing pipeline itself) surrounding it serves to collect any hydrogen that may leak from the hydrogen delivery line (which for purposes of this disclosure will be readily understood to include the connectors (and/or welds or the like) joining individual segments of such hydrogen delivery line). A sweeper gas or liquid flowing outside of the hydrogen delivery line removes any hydrogen that has leaked from the hydrogen delivery line. At least one hydrogen sensor is used to test the sweeper gas or liquid for hydrogen content and the flow of hydrogen may be shut-off in the event the level of hydrogen leaking into the sweeper gas or liquid exceeds a predetermined threshold level. In another embodiment, a fiber-optic line can be installed to carry signals from hydrogen sensors located throughout the system, thus allowing hydrogen leaks that exceed a predetermined threshold level to be located, the area requiring repair isolated, and expeditiously corrected.

These and other aspects of the subject technology are disclosed through use of the following illustrative figures.

FIG. 1 is comprised of FIGS. 1(a) and 1(b). FIG. 1(a) depicts the production of "green" hydrogen 101, its storage and alternative approaches for transporting it. As shown therein, hydrogen gas 101 is produced through electrolysis using one or a plurality of electrolyzers 102, which may employ any of several well-known technologies such as alkaline and proton exchange membrane (PEM) electrolysis, and in the future may utilize solid oxide electrolysis or another new technology. As shown, electrolyzer 102 produces hydrogen 101 by passing an electrical current 103 through an anode (+) and cathode (−) suspended in water 104 to release H2 and O2 molecules.

Electricity 103 can be produced from renewable sources such as kinetic energy from windmills 105, solar radiation collected from photovoltaic cells 106, turbine power from hydro sources 107, or geothermal energy 108. Other sources of energy can also be used such as off-peak or curtailed power, as well as new forms of renewable energy such as biofuels generated from landfills and wastewater treatment plants, and gasification of biomass, municipal solid waste, and agriculture residues and green waste. It is well understood that a significant power loss occurs for renewable energy projects from voltage stepping and transmission 109, generally making it most efficient to power the electrolyzer as close to the renewable electricity source 103 as reasonably possible. It is also well understood that fossil fuels can also be used to generate hydrogen and that, in fact, over 99% of hydrogen produced today is made using fossil fuels. Although not depicted in FIG. 1(a), in an optional embodiment, nuclear power as well as sources employing fossil fuels (including but not limited to grid power based on coal or natural gas-fired plants as the source of electrical power 103, steam methane reforming and coal gasification) may be used to produce hydrogen 101 without departing from the principles otherwise associated with the hydrogen transport, storage at scale and distribution systems that are hereinafter described.

Hydrogen 101 that is produced may be compressed to the desired pressure using compressor 110 and then stored as gaseous hydrogen in storage container 111(a) or liquefied with liquefaction system 112 and stored as cryogenic hydrogen in storage container 113(a). Unless such hydrogen is being consumed at the same location as it was produced, it is generally transported in one of four ways. As is known, the two most commonly used approaches of hydrogen transport are with a hydrogen transport trailer 114 that is specially designed to transport either gaseous or liquefied (cryogenic) hydrogen, and pipelines 115, including both lines that are specially built to transport hydrogen, as well as pipelines carrying a blend of hydrogen and natural gas.

It is estimated that between 450 and 800 miles of dedicated hydrogen pipelines 115 currently exist in the United States, most located along the Gulf Coast and connecting hydrogen producers (refineries) with well-established, long-term customers. In Europe, there is estimated to be between 700 to 1,100 miles of hydrogen pipelines, the longest extending 250 miles from Northern France to Belgium. In addition, a blend of hydrogen in natural gas has been proposed as a way to make use of the more than 180,000 miles of natural gas transmission lines (also represented by pipeline 115 in FIG. 1).

Two other modes of hydrogen transport are also depicted in FIG. 1(a). The first of these involves the use of trains and large cargo ships, collectively illustrated as ship 116. These include Kawasaki Heavy Industries' construction of the Suiso Frontier (Kawasaki hull no. 1740), the world's first liquefied hydrogen carrier, whose maiden voyage took place in early 2022; and Kawasaki's announced goal to construct much larger seaborne hydrogen vessels by the 2030's. Further, distribution of hydrogen with a lighter-than-air airship 117 has been described, such as disclosed in Applicant's earlier patent application Ser. No. 12/290,453, filed Oct. 29, 2008, now U.S. Pat. No. 8,336,810 (the '810 patent).

Turning next to FIG. 1(b), depicting removal of hydrogen 101 from these transport systems 114 to 117, hydrogen 101 is stored in gaseous 111(b) or cryogenic 113(b) form for regasification using vaporizer 118, and distribution to the various end uses for such hydrogen. Persons of ordinary skill in the art will understand that local distribution of hydrogen 101, as depicted by lines 119(a)-119(e), is currently performed solely through use of hydrogen transport trailers 114 or in very limited cases, a dedicated hydrogen pipeline 115. FIG. 1(b) depicts five end uses for such hydrogen that already exist or have been proposed. Line 119(a) illustrates the distribution of hydrogen 101 for use as fuel in one or a plurality of turbine generators 120 and/or fuel cells 121 to produce power that can be added onto the electric transmission grid 122. Line 119(b) illustrates the distribution of hydrogen 101 for use directly or through fuel cells 123 in residential applications 124 including for heating and cooking 125 and for electrical power 126.

Lines 119(c) and 119(d) depict distribution of hydrogen 101 for use in commercial and industrial applications 127. Line 119(c) illustrates its distribution for use in one or multiple fuel cells 128 to produce electric power 129; and line 119(d) depicts the distribution of hydrogen 101 to provide a fuel or process feedstock for various uses as a carbon-free replacement for fossil fuel. Distribution line 119(e) illustrates the distribution of hydrogen 101 to filling stations 130 for dispensing hydrogen 101 to fuel cell vehicles including industrial equipment such as forklifts 131, consumer and fleet passenger vehicles 132, hydrogen buses 133, heavy-duty trucks 134, as well as other equipment, drones and planes. In turn, such fuel cell vehicles have been proposed to provide supplemental power, as illustrated by line 135, depicting a fuel cell passenger vehicle 132 providing power for residential applications 124-126. As is well known, larger fuel cell vehicles such as buses 133 and heavy-duty trucks 134 may provide power during emergencies and grid outages through vehicle-to-grid (VTG) services and by being connected to individual critical loads such as hospitals and communications equipment to support civil defense, humanitarian and disaster relief operations.

Referring now to FIG. 2, a block flow diagram illustrating a method in accordance with the subject technology is shown. Oval 201 represents selection of a geographic location that is near a source of low-cost renewable energy such as wind 105, solar 106, hydro 107 or geothermal 108, that can be used to produce green hydrogen 101, as designated by rectangular box 202. Although it is considered to be "greener" that hydrogen 101 is produced from renewable energy sources and water 104 through electrolysis 102, this does not foreclose other energy sources and production methods, both known and those that may be developed in the future. In the event that transportation of hydrogen 101 is not logistically or economically feasible via hydrogen transport trailer or pipeline, optional steps 203 through 209 may be undertaken to transport hydrogen 101 to a location where it can be introduced into the main distribution line (depicted by rectangular box 214, as more particularly described below).

Rectangular box 203 depicts the optional step of collecting hydrogen produced from multiple sources. A non-limiting example of when this may result in the lowest cost alternative is when an electrolyzer is located directly adjacent to physically separated wind devices, solar collection, or in gas wells where hydrogen is being produced in-situ within a general area. In such case, rather than being required to invest in batteries and lossy electrical transmission cable to distribute the power collected, each source of production could power its own electrolyzer unit, with the hydrogen produced therefrom being collected locally for transport to a single loading location. Where needed, such optional hydrogen storage would, in one embodiment, be stored at up to 2500 psi or higher pressures in the future using FRP spooled pipe. This or other storage means at scale is depicted in rectangular box 204.

Where used in place of traditional gaseous storage tanks 111(a), such FRP spooled pipe can remain in large spools 313, as more particularly described with respect to illustration 313 on FIG. 3(b) below.

Rectangular box 205 depicts that such hydrogen gas 101 may be compressed or liquefied, as desired and/or deemed most optimal by the operator, for storage and/or transport. At the appropriate time, as depicted in rectangular box 206, one or a plurality of empty containment vessels are filled with liquid hydrogen or gaseous hydrogen. By way of non-limiting example, such containment vessels may be insulated cryogenic tanks such as those made by Chart Industries and other vendors in the case of liquid hydrogen and Titan® high pressure tanks made by Hexagon in the case of gaseous hydrogen. Rectangular box 206 also incorporates the option of filling hydrogen containment vessels that are built into the transport vehicle. Such containment vessels may employ double-walled vacuum tanks and incorporate elaborate means to reduce the boiloff of hydrogen during transit, as is the case for the aforementioned Kawasaki ship design, or may employ methods of thermal management, including but not limited to those disclosed in Applicant's co-pending patent application, Ser. No. 63/388,686 (the '686 application), enabling such cryogenic containment vessels to be lighter-weight, single walled tanks that are permanently or quasi-permanently plumbed into hydrogen storage for an airship.

Once these vessels have been filled, where such tanks are not permanently installed in ship 116 or airship 117, in one embodiment they can be loaded onto lighter-than-air airship 117 using a standard tractor cab, forklift or other materials handling equipment. This step, which is represented by rectangular box 207, can be done shortly after arrival of such transport vehicle in order to minimize the turn-around time. In an efficiently designed system, such transport vehicle would return empty vessels (or tanks with a minimum ullage to maintain them in a cryogenic state) from a completed prior delivery, exchange these for pre-filled vessels, and then immediately depart for the destination delivery point for such hydrogen 101.

Although a lighter-than-air airship may be deemed a better option in specific circumstances, as suggested by use of the generic term "vehicle" in the caption on rectangular box 207, any number of alternative land, air or sea transport vehicles may be used without departing from the principles of the subject technology. Rectangular box 208 then depicts transport of the hydrogen-filled vessels to the intended destination using the selected transport systems.

Upon arrival at the destination, rectangular box 209 depicts that the filled vessels (or the hydrogen they contain) are unloaded from the transport vehicle and empty vessels are optionally loaded in their place in those cases in which removable tanks are used. In the event airship 117 is used, this exchange of vessels will help to stabilize the craft by minimizing the weight differential that must otherwise be addressed through the release or recompression of lifting gas, or through use of mechanical tie-downs or ballast, including but not limited to water or loading conventional freight and cargo. Once the exchange of vessels (or the removal of hydrogen from permanently or quasi-permanently installed tanks and its replacement with cargo and/or ballast) has been completed, the transport vehicle is able to depart on a return trip 225 to the production location, where the foregoing described process designated by boxes 202 through 209 is repeated. Where tanks have been exchanged, during the period that the transport vehicle is making this return trip, the ground crew at the production site can refill the empty vessels with more hydrogen 101 (i.e., step 206) and the crew at the destination can discharge hydrogen 101 from the filled vessels.

If the vessels are filled with liquid (cryogenic) hydrogen, they are connected to one or more vaporizers 118 to convert the liquid back to gaseous hydrogen form. This step is depicted by rectangular box 210. Rectangular box 211 depicts an optional step in the event the operator wishes to temporarily store the gaseous hydrogen product in storage vessel 111(*b*) before introducing it into the distribution main line in step 214.

Such optional hydrogen storage would, in another embodiment, use FRP spooled pipe, as depicted by rectangular box 212, and more particularly described with respect to illustration 313 on FIG. 3(*b*) below.

Alternatively, in addition to the aforementioned options of using traditional storage vessels 111(*b*) and FRP spooled pipe 313, gaseous hydrogen vessels used in transport step 208 or the vaporizer unit(s) depicted in step 210 may be directly coupled with the distribution main line depending on operator preference. As noted above, use of a hydrogen transport trailer is optional; and in the case that the hydrogen production facility is co-located with the terminal location, then the main distribution line may be filled directly after step 202, 203 or 204, as applicable.

In order to ensure proper operation of the hydrogen pipeline, prior to introducing gaseous hydrogen 101 into the main distribution line, the operator will monitor the inlet line pressure and adjust it to the optimal pressure level, as depicted by rectangular box 213. Once such inlet line pressure has been adjusted, gaseous hydrogen is released into the main distribution line through an inlet, as depicted by rectangular box 214. To ensure a proper flow, as depicted by rectangular box 215, the operator will monitor the line's pressure and make adjustments to ensure that optimal pressure levels are maintained.

If intended end uses of such hydrogen 101 are widely disbursed, rectangular box 216 depicts that gaseous hydrogen 101 is next transported to one or more distribution points from which, depending on operator preferences and local market conditions, such hydrogen 101 may be used or can be fed into a broader distribution network. Thus, in one embodiment, such main distribution lines may tend to use existing pipelines to interconnect the hydrogen delivery line between these points. In order to provide a "shock absorber" for this distribution network, the operator may optionally store gaseous hydrogen 101 at scale using spools of FRP spooled pipe 313 and/or conventional tank storage 111(*b*), as depicted by rectangular box 217.

To ensure proper operation of the distribution network, prior to introducing gaseous hydrogen 101 into the local hydrogen distribution lines, the operator will monitor the inlet line pressure and adjust it to the optimal pressure level, as depicted by rectangular box 218. Once such inlet line pressure has been properly adjusted, gaseous hydrogen 101 is introduced into the distribution network lines through one or more feed valves, as depicted by rectangular box 219.

In another embodiment, such network distribution line employs existing pipelines including but not limited to water, sewer and storm drains for the hydrogen delivery line between the local distribution points and end user locations. Employing this system and method will result in the lowest cost, most widespread distribution of hydrogen 101 to end users, including but not limited to (1) fulfilling grid service needs 122, as depicted by rectangular box 220; (2) extending the reach to individual homes to provide heating, cooking fuel and fuel for hydrogen vehicles 125 and to meet residential power demands 126, as depicted by rectangular box 221; (3) fulfilling commercial and industrial applications 127 and power needs 129, as depicted by rectangular box 222; and delivering gaseous hydrogen to the locations where hydrogen filling stations 130 are located. Once at such filling station 130 locations, a compressor can be used by the operator to bump-up the hydrogen 101 pressure to 10,000 psi for passenger cars; 5,000 psi for heavy duty tractors; or such other desired dispensing pressure, as depicted by rectangular box 223, whereupon hydrogen 101 may be dispensed for fuel cell vehicle use as depicted by rectangular box 224.

Each of the foregoing steps ends at oval 226, thereby completing the sequence. As will be evident to one skilled in the art, all of the steps depicted in FIG. 2 are not required in order to practice the principles of the technology disclosure and thus some of them are optional, it being deemed apparent that each of the steps depicted are attractive and add to the usefulness of the system. Similarly, it should be understood that the order in which these steps are depicted in FIG. 2 is illustrative only and under various circumstances that will be apparent to one skilled in the art, such steps may be taken in a different sequence (and certain steps may be omitted or others added) without departing from the principles of the technology disclosure.

Turning next to FIGS. 3(a)-3(e), a number of alternative approaches to transporting and distributing hydrogen 101 in accordance with the principles of the disclosed technology are shown. It will be obvious to persons of ordinary skill that all of these approaches are not required and thus an operator may wish to employ some but not all of such principles depicted in FIGS. 3(a)-3(e) depending on particular circumstances.

As is known, any number of locations exist globally where otherwise very attractive, low-cost renewable energy sources occur in nature, but from which it is not logistically or economically feasible to transmit power and/or hydrogen 101 by pipeline to where active markets exist for such green energy. In some cases, a lighter-than-air airship can be used to address such needs. Exoskeleton 301 in FIG. 3(a) corresponds to the section view of an illustrative airship exoskeleton, as disclosed in Applicant's earlier patent application Ser. No. 17/005,628, filed Aug. 28, 2020, now U.S. Pat. No. 11,066,145 (the '145 patent). The upper approximately 85% of said exoskeleton area can be used for lifting gas, leaving the lower approximately 15% principally for cargo storage. As hereinafter described, this area may be used as an attractive location for transporting hydrogen 101 in such situations.

In one embodiment, rated hydrogen cylinders module 302 are pre-filled with gaseous hydrogen 101 as described in step 206 at or nearby an airship landing site that is proximate to where such hydrogen 101 was most advantageously produced, as described with respect to step 202 of FIG. 2. By way of a non-limiting example, assuming 40' long Titan® tanks manufactured by Hexagon, the company's standard Titan®4 module of Type 4 composite carbon fiber hydrogen cylinders 302 measures 40 ft. L×8 ft. W×8 ft. H (12.19 m×2.44 m×2.44 m) and can transport 610 kg of hydrogen at 250 bar (approximately 3,625 psi). The module is approved by the U. S. Department of Transportation and has an empty weight of 34,500 pounds (15,649 kg) and a filled weight of 35,850 pounds (16,259 kg). The number of such hydrogen cylinder modules 302 and total volume of hydrogen 101 that can be transported per day will depend on the hours of operation, travel distance, desired number of trips without requiring refueling, and the average cruising speed of the lighter-than-air airship.

As previously discussed, filling permanently-affixed tanks and/or loading such pre-filled cylinders 302 onto said airship may be accomplished by any number of methods. In one embodiment, cylinder module 302 may be loaded onto the airship using a rapid loading and unloading system comprising parallel rails located in rows in the airship hull that receive and hold the cylinder modules 302 by suspension from a rail wheel in a gondola fashion, as are known in the art. In another embodiment, pre-filled cylinders 302 may remain on transport trailer 303 during said airship's transit. Although selection of the best method will be based on various factors including minimizing loading and unloading time, for the purposes of this illustration, leaving cylinders 302 on the trailer is assumed. Thus, as described with respect to rectangular box 207 in FIG. 2, once the airship arrives and is secured at the desired location, in one embodiment, tractor cab 304 is attached to transport trailer 303, enabling the full rig to be driven directly into the airship's cargo bay.

For reasons that persons of ordinary skill in the art will readily appreciate, it is advantageous that the gross weight of the lighter-than-air airship be kept relatively constant during the loading process. In order to minimize any abrupt weight changes, in one embodiment as the filled cylinders 302 are driven onto the airship, a second tractor cab 304 will unload from the airship an empty cylinder module 302 using its transport trailer 303, resulting in a modest weight change of about 1,350 pounds for the 610 kg of hydrogen.

After this exchange is made, tractor cab 304 transports the empty cylinders module 302 to the location where it will be refilled and the module's transport trailer 303 is unhitched so that tractor cab 304 can be used to transport another cylinder module 302. The empty cylinders are left at the refilling site to be filled with hydrogen 101 at an appropriate time, which filling process may take place from onsite storage 111(a) or another storage or upstream production source as depicted in rectangular box 206 of FIG. 2. In an efficient operation, while the tractor unloading empty cylinders 302 is transporting these to the appropriate location, hydrogen transport trailer 303 carrying pre-filled cylinders 302 onto the airship is unhitched from its corresponding tractor cab 304 to enable its driver to use it for the next task. In one optional embodiment, said hydrogen transport trailer 303 and its pre-filled cylinders module 302 are secured to the airship's cargo bay floor 305 using cables 306.

Once the weight of the airship reaches its maximum payload limit after taking into account the weight of fuel required, the cargo hold doors are closed and the lighter-than-air airship ascends to the desired altitude and flies to the destination for the gaseous hydrogen 101 it is carrying in filled hydrogen cylinders 302. Upon arriving at its intended destination, as depicted in rectangular box 209, the foregoing-described process is carried out in reverse, with filled cylinder modules 302 being unloaded from the airship, and other already-emptied cylinder modules 302 being loaded onto it in their place. During the duration of such airship flight, hydrogen 101 can be released from the filled cylinder modules 302 that were left at the destination site, while the empty cylinders 302 that were left at the point of origin are pre-filled at or near the hydrogen 101 production site. Although this process has been described with regard to transporting gaseous hydrogen 101, the foregoing procedure may also be used to transport cryogenic (liquid) hydrogen 101 to the extent this will further minimize the total cost per kilogram of hydrogen 101 at the point received by the end user. One embodiment of such transport of liquid hydrogen in airship 117 is illustrated in FIG. 3(e).

Once at the intended destination, depending on local conditions and other factors that will be readily understood by persons of ordinary skill in the art, cylinder modules 302, hydrogen transport trailers 303 and tractor cabs 304 may be used to transport and/or distribute the hydrogen 101. Alternatively, it may be advantageous to use one or multiple hydrogen transport trailers 114 and/or pipelines 115.

In another embodiment, referring now to FIG. 3(b), transport and distribution of hydrogen 101 employs pipe 307 which represents an existing pipeline such as a gas or oil pipeline, water or sewer pipe, storm drain or other pipeline whose route may be useful for the transport and/or distribution of hydrogen 101. Although shown in the shape of a conventional round pipe, persons of ordinary skill in the art will readily appreciate this illustration is non-limiting given that existing pipelines, as defined, may have any number of shapes, or no particular shape whatsoever when referring to the pipeline right-of-way itself. Existing pipeline 307, as used herein, encompasses all such alternatives. Hydrogen delivery line 308, which in one embodiment, as illustrated in FIG. 3(b), runs inside of safety pipe 309, is inserted into existing pipeline 307 for the purpose of transporting and/or distributing gaseous hydrogen 101 using the rights of way and capital investment needed to acquire land and/or requisite land rights, secure regulatory approvals, install and maintain such existing pipeline 307. Fast-release couplings and fittings 310 can be used to insert hydrogen delivery line 308 into safety pipe 309, and for other safety, utility and maintenance purposes as hereinafter described.

Persons of ordinary skill in the art are aware that in the United States, various regulated public utilities and master limited partnerships (MLPs) own and control transmission and distribution lines and storage facilities that connect supply areas to high-demand markets for natural gas and crude oil. In Europe, such existing pipeline ownership is largely controlled by transmission system operators (TSOs) that are run like private companies despite being publicly controlled. In other countries there is a mix of private ownership under some sort of public regulation, public or indigenous population ownership, or a combination of these. In some cases, water, sewer and storm drain pipelines may be owned by similar interests or by local government entities. As such, the financial return on these existing pipelines 307 may be enhanced based on any number of possible contractual arrangements permitting the installation of such safety pipe 309 in return for compensation to the existing pipeline owner on the basis of the volume per mile of hydrogen 101 passing through such existing pipelines 307.

In the case of gas and oil pipelines, this new revenue opportunity may help to offset the risk of lower income as the volume of fossil fuel transmission declines and hydrogen usage increases in the future. Moreover, such an arrangement will materially reduce both the time and initial capital investment required to establish the hydrogen infrastructure and negotiated tariffs that can be passed through to the end user in the cost per kilogram of hydrogen 101 consumed while simultaneously helping to extend and transition the lifetime economic value of these already "sunk" oil and gas investments. It will be apparent to persons of ordinary skill that the use of rights-of-way adjacent to, above, below, or inside a myriad of existing pipelines, as defined, will result in saving time and money associated with right-of-way acquisition for hydrogen transport—even to the extent that a new trench must be excavated to accommodate such hydrogen delivery line installation. Without limiting the foregoing, one of the places where the disclosed invention results in the highest value is within municipal districts and along long stretches of public highways and rail lines where it would be otherwise virtually impossible to acquire new right-of-way for distributed service to end-user locations, and where the only alternative is tanker truck delivery, which is inordinately expensive and effectively renders hydrogen non-competitive.

Where required to accommodate physical obstructions such as shutoff valve 311 in such existing pipeline 307, risers 312 (or their equivalent that are located below ground) may be installed to enable the continuous flow of hydrogen 101 through hydrogen delivery line 308 without adversely affecting the proper functioning of such elements and control features of existing pipeline 307. Risers 312 or their equivalent may also be used to make fast-release couplings and fittings 310 more readily accessible to support isolating and repair of one or more sections of hydrogen delivery line 308 and for enabling use of two or more otherwise unrelated existing pipeline 307 systems to route hydrogen delivery line 308 to the desired locations without comingling the contents of any such existing pipelines 307. Accordingly, in one non-limiting illustration, to provide for long stretches of hydrogen filling stations as will be needed to enable fuel cell electric cars, buses, long-haul trucking and other mobility uses, a utility corridor running in public highway right-of-way may be interconnected with municipal sewer lines, storm drains and communications cabling running beneath city streets (or the city street right-of-way itself) adjacent to such highways. Persons of ordinary skill in the art will readily appreciate that use of fully automated electronic metering equipment may be used to monitor the volume of hydrogen 101 flowing through such hydrogen delivery line 308 to assure a proper and fair allocation of transmission fees between multiple existing pipeline 307 owners and, in one embodiment, the investors in upgrades and improvements required for enhancing such systems for hydrogen 101.

In another embodiment, large spools 313 of FRP spooled pipeline may be used for gaseous hydrogen 101 storage in lieu of traditional hydrogen tanks 111. Such alternative storage based on spools of FRP spooled pipe 313 affords a number of non-obvious advantages over the current state of the art in hydrogen storage at scale and/or to provide a "shock absorber" for the distribution network. Among other things, as is known, FRP spooled pipe has an existing ASME code with a 50-year useful life and requires minimal maintenance, whereas traditional gaseous hydrogen storage tanks 111 have a much shorter life and require costly maintenance and recertification approximately every 5 years. In addition, large diameter FRP spooled pipe can be extruded on site, thereby avoiding difficult transportation logistics associated with large volume hydrogen storage tanks 111 (or the cost and technical issues associated with using underground caverns for such storage) and enhance the ability of operations to scale up quickly at new locations.

On site extrusion of FRP spooled pipe or jointed composite pipe has an additional advantage of making it possible to ship bulk materials such as resin and avoid "shipping air" when shipping finished pipe. Moreover, optical sensors, hydrogen sensors, electric signal wires, power cables and capillary tubes can be integrated within the layered construction of FRP spooled pipe or jointed composite pipe to assure that any leaks of hydrogen 101 are quickly pinpointed. Shutoff valves in combination with fast-release couplings and fittings 310 at the end of one or multiple spools of FRP spooled pipe, or lengths of jointed composite pipe, enable an operator to rapidly isolate and replace damaged sections, or to adjust total storage capacity.

Utilizing spools of FRP spooled pipe 313 for H2@scale will result in a substantially lower total lifetime cost than traditional hydrogen 101 storage solutions when estimated over a 50-year useful life, and taking into account savings in installation expense, site approval delays, avoided recertification requirements, and reduced replacement costs. Moreover, when used in conjunction with a fuel cell for the purposes of reconverting hydrogen 101 back to electricity, utilizing spools of FRP spooled pipe 313 is estimated to be less than one-tenth (10%) as costly as battery storage of energy storage at scale, with a number of other advantages including much longer energy retention time, longer useful life and, depending on battery type, significantly less natural resource constraints and/or waste disposal issues.

The foregoing cost savings are highly material, and counter-intuitive given the significantly higher surface area to total volume ratio that spools of FRP spooled pipe 313 represent compared to traditional hydrogen storage tanks 111, and the common preferences for battery storage held by persons of ordinary skill in the art.

Turning next to FIG. 3(c), a detail view of section A-A from FIG. 3(b) is presented to illustrate the contents of existing pipeline 307. Depending on specific circumstances, the contents 314 of existing pipeline 307 may be natural or synthetic gas, crude oil or other liquid petroleum products, biofuels, various other industrial gases, potable and non-potable water, sewage, slurry, storm runoff and other liquids. Provided there is adequate volumetric capacity, safety pipe 309 (in turn containing hydrogen delivery line 308) may be run inside existing pipeline 307 for the purpose of transporting gaseous hydrogen 101 as previously described. This arrangement avoids contamination and enables transport of pure, higher value hydrogen 101, if necessary or desirable. In one embodiment, a channel or sweeper line 315 between the outer surface of hydrogen delivery line 308 and the inner surface of safety pipe 309, is used as a sweep line for an appropriate sweeper gas or liquid to be introduced, and to dilute and collect any gaseous hydrogen 101 that may leak from hydrogen delivery line 308.

In an alternative embodiment, subject to regulatory approval, safety pipe 309 may be omitted when the contents 314 of existing pipeline 307 consist of a gas or liquid that can serve as an appropriate sweeper gas or liquid for collecting any hydrogen 101 that may leak from hydrogen delivery line 308, provided that the operator of existing pipeline 307 is not concerned about such a hydrogen leak contaminating contents 314 of such existing pipeline 307. Non-limiting examples of contents 314 of existing pipelines 307 that may enable use of this optional alternative embodiment are synthetic natural gas (SNG), liquid natural gas (LNG), nitrogen, carbon dioxide or helium. In another embodiment of the present disclosure, hydrogen delivery line 308 can be one that is not located inside an existing pipeline 307 and not within a safety pipe 309.

FIG. 3(d) presents in the area between the two vertical dashed lines 331 drawn thereon, an enlarged view of section B-B from FIG. 3(c). In particular, this portion of FIG. 3(d) illustrates existing pipeline 307 and its contents 314, as well as safety pipe 309 and its contents. As discussed above, in one embodiment, the contents of safety pipe 309 include hydrogen delivery line 308, its content of gaseous hydrogen 101, and sweeper line 315 which functions as a channel which sweeps any hydrogen leaks 323. In one non-limiting example, safety pipe 309 is a 6" diameter flexible pipe made of any material including, but not limited to, metals, plastics and composites, that is compatible both with hydrogen and the selected sweeper gas or liquid running through said sweeper line 315. In one non-limiting example, hydrogen delivery line 308 is a 3" FRP spooled pipe suitable to carrying gaseous hydrogen 101 at any pressure from atmospheric to the maximum allowable working pressure of said hydrogen delivery line 308. In another non-limiting example, hydrogen delivery line 308 is a 40" jointed composite pipe; and in yet a third non-limiting example, hydrogen delivery line 308 is a 72" steel pipe. Persons of ordinary skill in the art will readily understand that other pipe diameters of FRP spooled pipe, jointed composite pipe, and steel pipe may be used in carrying out the intentions of the disclosure.

In accordance with steps 214 and 219 from FIG. 2, gaseous hydrogen 101 is injected into hydrogen delivery line 308 through inlet valve 316 from hydrogen storage tank 111 or another storage system (including without limitation, in another embodiment, from spooled FRP pipe storage system 313), an upstream hydrogen pipeline, hydrogen production or vaporizer system, compressor or other source, including a depot facility as described in Applicant's co-pending '686 application. As applicable, in accordance with steps 213, 215, 217, or 219 from FIG. 2, such injection is monitored using pressure gauge 317 to assure hydrogen 101 is at the appropriate pressure before and after injection into hydrogen delivery line 308. As more particularly described with respect to FIGS. 5 and 6, critical information regarding the injection of hydrogen 101 including volume released, purity and pressure can be captured at this and other appropriate points for control and billing purposes, including but not limited to at the outlet points that hydrogen 101 is delivered to end users and withdrawn from the system (represented in FIG. 3(d) by arrow 324). This data is conveyed by transceiver 318(a) to transceiver 319, which is in turn connected to active monitoring system 320 to record, analyze against other data, plot, and initiate the appropriate preventative, responsive, and/or billing and remuneration actions.

Sweeper line 315 is filled with a sweeper gas or liquid from storage tanks 321. Hydrogen sensor 322(a) is used to establish the baseline levels of hydrogen contained in such sweeper gas or liquid; and this data can be conveyed by transceiver 318(b) to transceiver 319, and in turn uploaded into active monitoring system 320. An non-limiting example of such a hydrogen sensor that can be used to provide real-time, hydrogen specific measurements in such sweeper line 315 is the Hy-Optima™ 5000 Series of inline hydrogen process analyzer manufactured by H2Scan, or its equivalent. The H2Scan sensor is able to detect 300 PPM (parts per million) of hydrogen against a background sweeper gas, and to monitor the quantity of hydrogen that is present in the annular space in real time, thereby enabling the operator to know when the hydrogen should be swept from the channel (e.g., from sweeper line 315), and at what point the flow of hydrogen through hydrogen delivery line 308 should be stopped for maintenance and/or safety reasons given the speed at which a leak is enabling hydrogen to escape from hydrogen delivery line 308 into sweeper line 315. Other sensors for real time monitoring hydrogen levels and other characteristics for use with gas or liquid substrates are well known and available from numerous other vendors, and even more precise sensors are known to be under development by the U.S. National Energy Technology Lab (NETL) and industrial companies. All such sensors and the data they produce are incorporated by this reference.

Additional hydrogen sensors such as sensor 322(b) may be strategically located along said sweeper line 315 to separately monitor the levels of hydrogen, if any, that is contained in the sweeper gas or liquid as it passes each sensor's location; and this data may be similarly communicated through wireless (or direct) connection 318(c) to said monitoring system 320 and combined with other data already in system 320 to create a real time map of the system and to monitor for operating anomalies. Persons of ordinary skill in the art will understand that the foregoing use of well-placed hydrogen sensors 322(a), 322(b), active monitoring, real time computing and intuitive displays, and/or processors, enables such system to detect and locate the source of any hydrogen leaks 323 from said hydrogen delivery line 308. Similarly, persons of ordinary skill in the art will understand that at the appropriate points, after the sweeper gas or liquid within sweeper line 315 has been used in the indicated manner, it may be sold as a by-product of the system, reused one or more times in the sweeper line 315, or at the discretion of the operator, discarded in a responsible manner as a waste product. Non-limiting examples of sweeper gases that may be useful within the system include nitrogen, CO2, helium, argon, natural gas, and air; and non-limiting examples of sweeper liquids that may be useful within the system include potable water, irrigation quality water, distilled water, salt water, liquid natural gas, any of which could be run in the same direction as the flow of hydrogen 101, or in the opposing direction thereto, as illustrated by arrows 325.

In an optional embodiment, any hydrogen contained in the sweeper gas or liquid may be removed therefrom or otherwise consumed by an appropriate device 326, including by way of non-limiting examples, catalytic recombiners and various forms of hydrogen getters, with the goal of returning the sweeper gas or liquid to a pure form, as indicated by arrow 327. Catalytic hydrogen recombiner devices are well known as a means of fire explosion safety in various branches of industrial production in which explosive concentrations of hydrogen and combustible gases are formed. Sandia National Laboratories published an overview of reversible and irreversible hydrogen scavengers, or getters, that also could be potentially used to reduce the buildup of hydrogen gas in containers. This report, entitled "An issue paper on the use of hydrogen getters in transportation packaging," authored by P. J. Nigrey (February 2000) is incorporated in its entirety, along with various patents, including European Patent number EP 0089183 A2 to C. Leppard and A. Holt, entitled "Process for the removal of hydrogen from gases," which described catalytic removal of hydrogen from air and gas mixtures including nitrogen gas. Other technologies may be useful as well; and in a preferred embodiment, hydrogen removal device 326 would achieve the simultaneous goals of reducing the concentration level of hydrogen from the sweeper gas or liquid to inherently safe levels even if combined with air; returning the sweeper gas or liquid to a pure form 327 for further use; avoiding the need to vent gases to the atmosphere that would create any environmental risk; and potentially providing a market or use for the hydrogen thereby removed, in addition to the sweeper gas or liquid itself.

In addition, persons of ordinary skill in the art will understand that multiple hydrogen delivery lines 308 may be used to separately distribute hydrogen with the same or different levels of purity and/or other hydrogen carriers such as ammonia, each such hydrogen delivery line having its respective safety pipe or, in yet another alternative embodiment, two or more hydrogen delivery lines sharing a single safety pipe.

In the optional alternative embodiment wherein existing pipeline 307 is used for transmission of synthetic natural gas or another product 314 that can be used as the sweeper gas or liquid in the foregoing system, such hydrogen sensors 322(a), 322(b) can be used to monitor hydrogen levels in contents 314 to detect hydrogen leaks 323 and ensure operation of the system without adversely affecting its safety or efficiency. Persons of ordinary skill in the art will appreciate that in this optional alternative embodiment, the contents 314 of existing pipeline 307 are themselves able to sweep/purge any hydrogen 101 that may leak from hydrogen delivery line 308, and such contents 314 should be actively monitored utilizing hydrogen sensors 322(a), 322(b) for changes in hydrogen level to ensure the proper steps are taken in the event of a failure of said hydrogen delivery line 308 or excessive leaks 323 of hydrogen 101 therefrom.

In the embodiment described herein, should operating personnel and/or automated software monitoring system 320 observe hydrogen 101 levels in sweeper line 315 to be in excess of a predetermined level, an instruction can manually, or using automated programming, be dispatched using transceiver 319 in communication with transceiver 318(b) to open valve 328, thereby causing a sweeper gas or liquid to flow from storage tanks 321 into sweeper line 315, or in an alternative embodiment increasing the flow rate of such sweeper gas or liquid entering through valve 328. Valve 329 is correspondingly opened (or, as applicable, the rate of the sweeper gas or liquid flowing through valve 329 is increased) to permit the sweeper gas or liquid along with the hydrogen it carries to be swept out of the system. Once the hydrogen levels in sweeper line 315 drop below a predetermined level set by the operator, valves 328 and 329 may be closed to the extent the operator wishes to leave a sweeper gas or liquid "blanket" around hydrogen delivery line 308, or the flow rate of such sweeper gas or liquid through valves 328 and 329 may be reduced to the desired level for normalized operations.

In a non-limiting example, a concentration level of 20,000 PPM may be predetermined by the operator to assure that the level of hydrogen content in sweeper line 315 never reaches any higher than 50% of the concentration level at which hydrogen mixed with air would be a safety risk. In another embodiment, a hydrogen concentration level representing approximately 10% of the lower explosive limite, or approximately 4000 PPM, may be used as a triggering point for one or more of the foregoing actions. This level is consistent with the National Academies of Sciences' 2008 recommendations that would eliminate the explosive threat posed by hydrogen in submarine air and this safety factor agrees with the approaches used both by NASA to derive the maximum allowable concentration level in spacecraft and by the U.S. Environmental Protection Agency (EPA) to set exposure standards for explosive gases. Other principled levels could be established by the system operator or regulators.

As indicated previously, hydrogen sensors are known to have a sensitivity level at least as low as 300 PPM and are able to provide real-time data on the level of hydrogen present in the background gas, and thus the operator is provided with a considerable margin for establishing the predetermined level as well as programming heuristics into the control system that will take into account other considerations such as the rate of change over time of such hydrogen levels within sweeper line 315 and any changes that may have occurred in the pressure of such sweeper line 315.

Persons of ordinary skill in the art will readily appreciate how in the normal course, the disclosed system will avoid hydrogen permeation and other leaks from reaching unacceptably high levels before any excess quantities of hydrogen are proactively removed from the system. In addition to assuring that the concentration of hydrogen in sweeper line 315 never reaches the level at which it could constitute a safety risk or an environmental concern and enabling remediation to be planned as dictated by the severity of any detected leaks, this system may allow a broader range of pipeline materials and fittings to be used to construct hydrogen delivery line 308, may reduce the need for pipeline inspections since cracks would be revealed through monitoring the change in leakage rates, and/or may permit higher pressure levels for such hydrogen delivery line 308. The opportunity to use larger diameter jointed composite pipe, lighter weight and less costly steel pipe or less thick permeation coatings, and the opportunity to increase rated pressure levels and extend pipeline life through continuous pipeline health monitoring, are likely to result in material savings both in the initial cost for pipe materials and installation, as well as lower operating and maintenance expenses.

Although safety pipe 309 may in an optional embodiment be rated to withstand essentially the same pressure as hydrogen delivery line 308, in a preferred embodiment safety pipe 309 can be rated for a much lower pressure that is based on the pressure of sweeper line 315 and the environment into which such safety pipe will be installed. This is made possible because of the likelihood that pipeline leakage rates in hydrogen delivery line 308 will increase over time; and thus with real time monitoring, the operator will be able to undertake proactive repairs well before a catastrophic break takes place in such hydrogen delivery line 308. In addition, in a preferred embodiment, sweeper line 315 will also be monitored for abrupt pressure changes using one or more pressure sensors 330. In a preferred embodiment, such sensors will also be in communication with monitoring system 320 through transceiver 319 such that a break in safety pipe 309 will be readily detected, for example due to physical damage to the safety pipe caused by a construction accident, natural ground movement, or other disturbance; or in a worst case situation, resulting from a catastrophic break in hydrogen delivery line 308.

Moreover, depending on the severity of a detected hydrogen leak from hydrogen delivery line 308, an instruction can manually, or using automated programming, be dispatched using transceiver 319 in communication with transceiver 318(a) to close valve 316 until the problem has been located and corrected. Persons of ordinary skill in the art will understand such emergency protocols, as well as the purpose for fast-release couplings and fittings 310 and additional optional components typically used with pipeline transmission of industrial gases, including but not limited to emergency relief valves and shut-off valves that can be used to isolate sections of hydrogen delivery line 308 in a well-ordered system.

FIG. 3(e) depicts an alternative embodiment, as referenced above, wherein permanent, or quasi-permanent cryogenic hydrogen tanks are used to transport liquid hydrogen in airship 117. Exoskeleton 301 corresponds to the section view of an illustrative airship exoskeleton shown in FIG. 3(a) and as disclosed in Applicant's earlier '145 patent. In one embodiment, cryogenic hydrogen cylinders 341 are either filled directly with liquid hydrogen 101 from liquified hydrogen storage 113(a) of FIG. 1(a) or are pre-filled as described in step 206 of FIG. 2. The number of such liquid hydrogen tanks 341 and total volume of cryogenic hydrogen 101 that can be transported per day will depend on the hours of operation, travel distance, desired number of trips without requiring refueling, and the average cruising speed of the lighter-than-air airship.

Figure 3A:
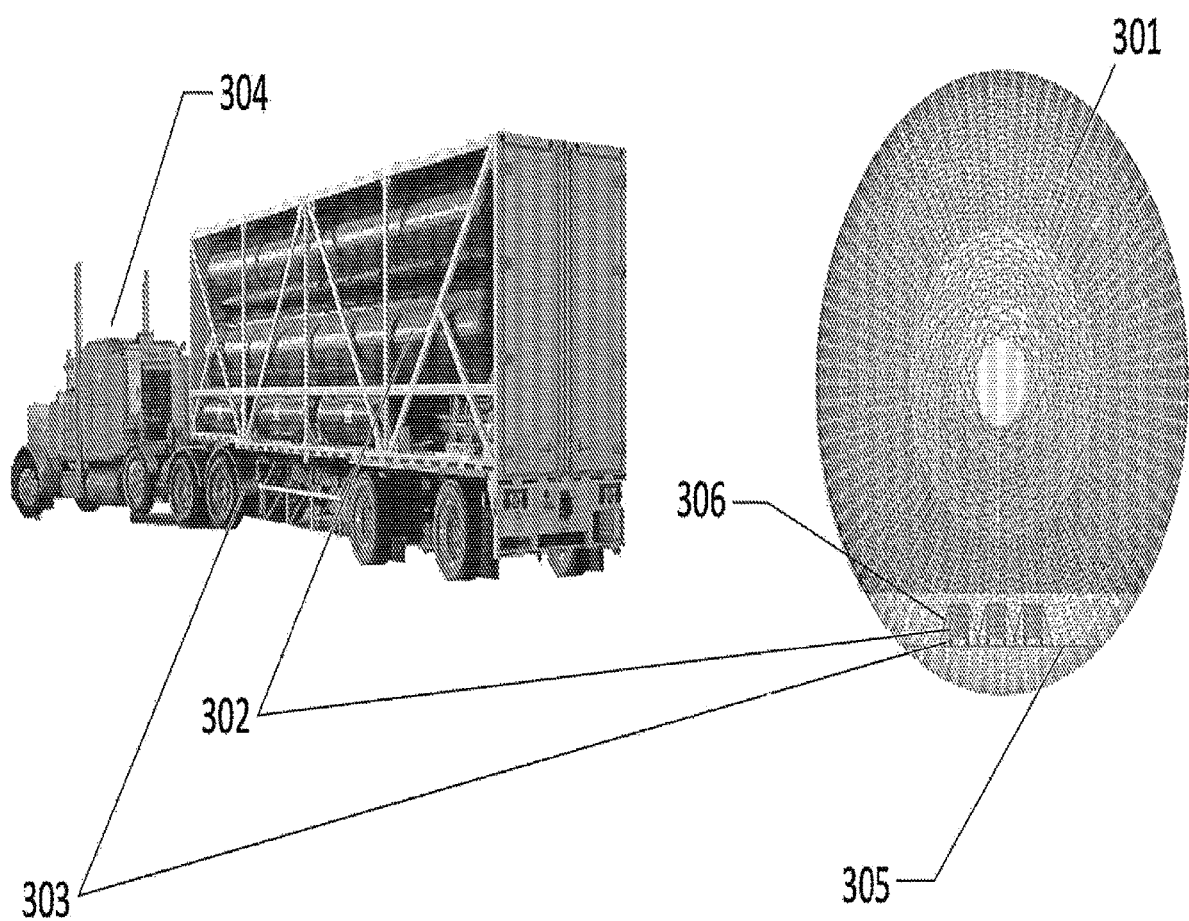
FIG. 3(a) shows the components of a system for transporting hydrogen using a lighter-than-air airship which is particularly advantageous in certain situations where other alternatives are not practical or economic.
Figure 3E:
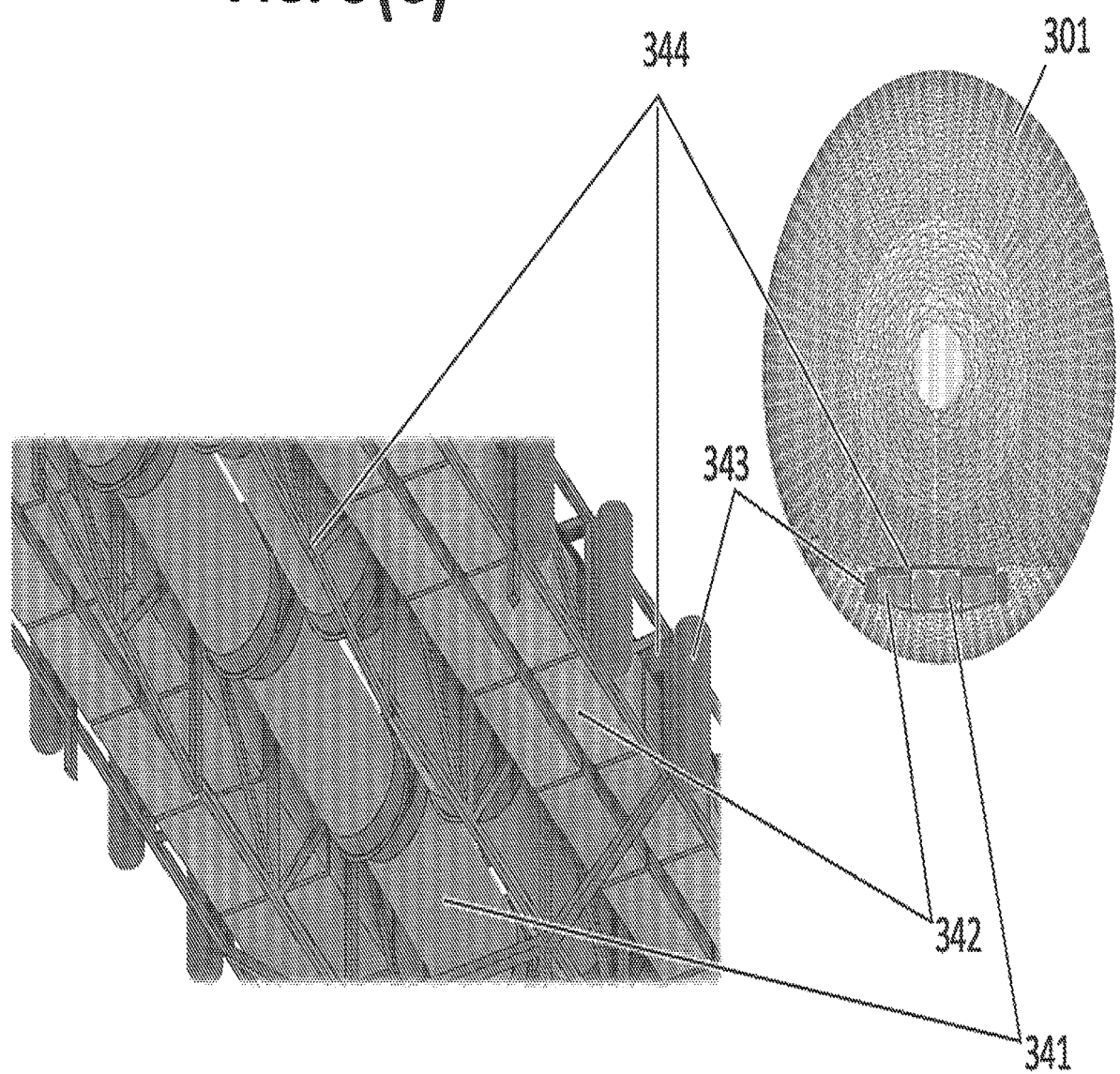
FIG. 3(e) shows the components of a system for transporting liquid hydrogen using permanently affixed vessels in a lighter-than-air airship that is particularly advantageous in certain situations.

FIG. 3(e) also shows shipping containers 342 and water storage tanks 343 integrated into frame 344, which is suspended in the non-limiting illustration, but in yet another alternative embodiment, one or more of such elements may utilize cargo bay floor 305 shown in FIG. 3(a) rather than being hung from such frame 344, as illustrated in FIG. 3(e). As previously described, the gross weight of the lighter-than-air airship will be kept relatively constant during the loading process by controlling the rate of loading/unloading of such hydrogen, cargo, and water ballast, as described in Applicant's earlier '145 patent.

Turning next to FIG. 4, FIGS. 4(a)-4(d) depict a non-limiting illustrative case involving the production, transport, storage at scale and distribution of green hydrogen 101. The case assumes production of green hydrogen 101 at uniquely advantageous sites on the Big Island of Hawaii and its transport to, and widespread distribution on, the island of Oahu although the principles of the disclosed technology have applicability globally as part of establishing a safe, low cost and rapidly extensible infrastructure for transport, hydrogen@scale, and distribution of hydrogen 101 as an alternative to fossil fuels for transportation and power.

Figure 4A:
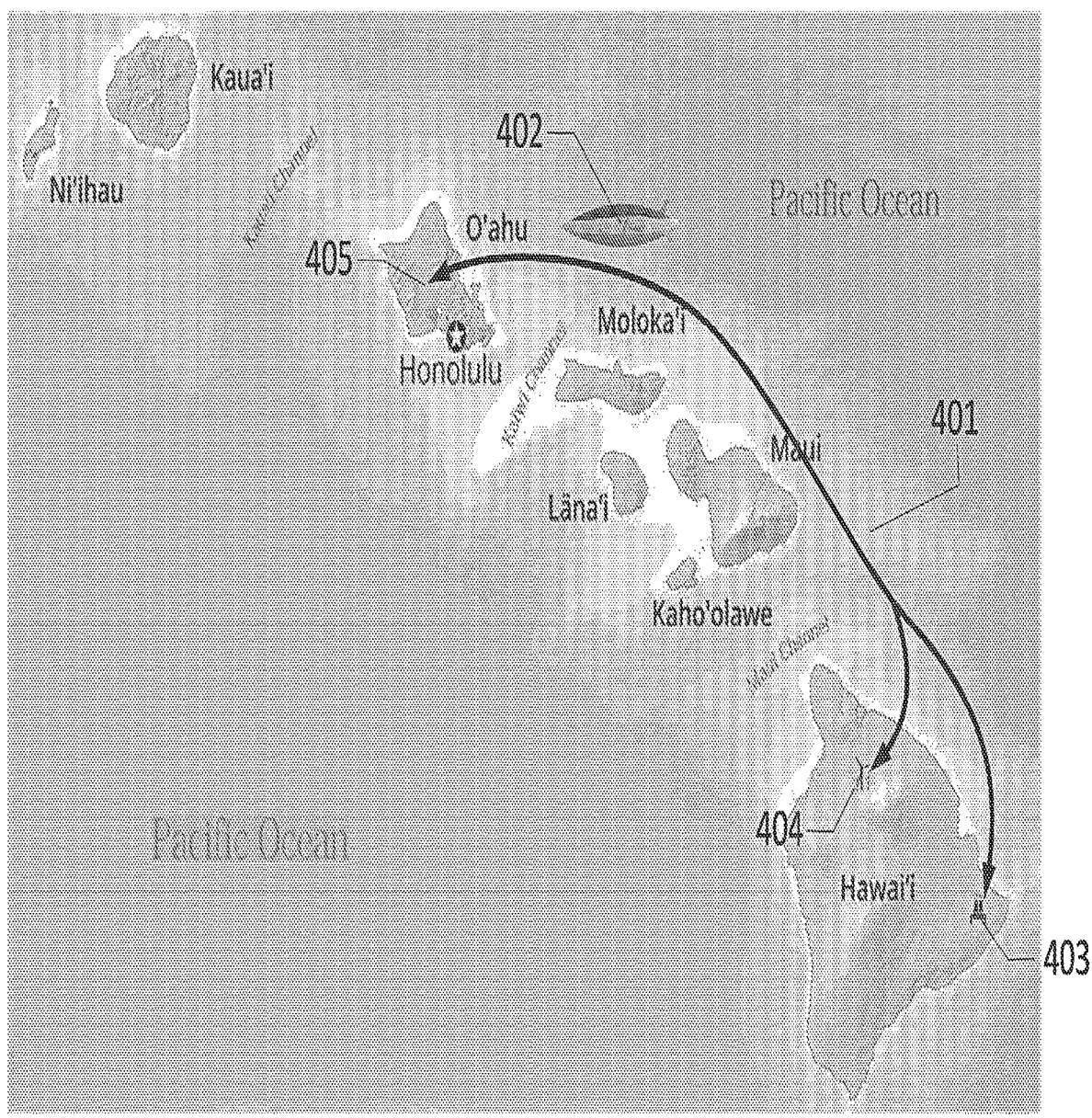
FIGS. 4(a)-4(d) depict maps of an illustrative case involving production of green hydrogen from wind and/or geothermal energy on the Big Island of Hawaii and its transport and distribution on the island of Oahu.

FIG. 4(a) illustrates the approximately 275-mile flight path 401 for a lighter-than-air airship 402 connecting the Puna geothermal production site 403 at the south end of the island of Hawaii and/or the areas 404 that are ideally suited to large wind farms at elevation on the Island, to a potential terminal location 405 on approximately 25 acres of property in Oahu. Assuming an average cruising speed of between 150 and 200 miles per hour, airship 402 may have a net payload potential of between 200 and 300 tons, thereby enabling each round-trip flight of 4 hours or less to transport approximately 10,000 kg of gaseous hydrogen 101 at 3,625 psi from a landing site near production sites 403 and/or 404 on the Island of Hawaii, to terminal 405, where shown on the Island of Oahu. Assuming five round-trip flights per day and 360 days operation per year, one airship is capable of transporting 18 million kilograms per year of gaseous hydrogen 101 to Oahu that will be useful towards achieving the State's "Clean Energy Initiative" goals.

Figure 4B:
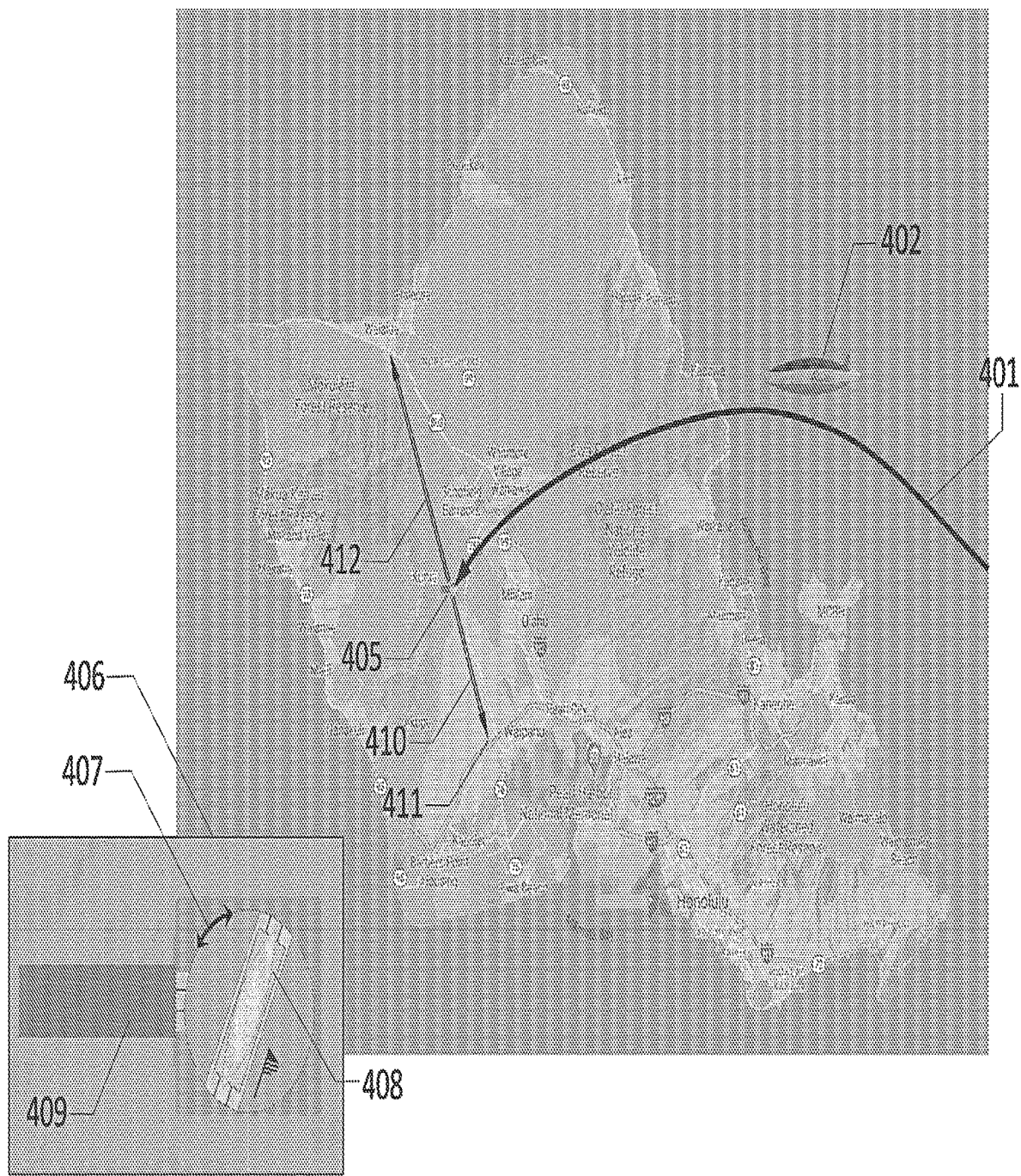

FIG. 4(b) shows a map of Oahu and the final portion of one air route 401 for airship 402 to terminal 405, near Kunia Village. Close-up detail 406 of this area illustrates that in one embodiment, terminal 405 incorporates an optional turntable 407. The turntable 407 includes a cradle 408 that includes at least two anchor points on opposing sides of the cradle 408, which are configured to connect to tie-down cables that may in turn be connected to the lighter-than-air airship 402. Such tie-down cables can then be used to secure the airship 402 to the cradle 408. The turntable 407 enables the cradle 408 to rotate so that lighter-than-air airship 402 may always point directly into the wind when landing and taking off from terminal 405, and optionally to enable a tug to pull said airship 402 into hanger 409 once airship 402 has been securely tethered in cradle 408.

FIG. 4(b) also indicates the installation of two new transmission pipelines. Pipeline route 410 is approximately 6 miles in length, connecting from central Oahu and optional airship terminal 405, to one of HawaiiGas' eight letdown regulator sites 411, where the company's existing 16-inch main transmission line currently interconnects with its synthetic natural gas (SNG) distribution systems on the island of Oahu. Although this embodiment contemplates a new pipeline segment, the proposed route would enable Hawaii-Gas to build a new distribution system to serve Wheeler and Schofield military bases in central Oahu and with a second, approximately 10-mile extension 412 from central Oahu to Waialua, to transport and distribute SNG and hydrogen 101 to the North Shore of the island, which currently does not have gas service. While these pipeline extensions are considered to be most optimal, in an alternative embodiment, transmission line extensions 410 and 411 could be deferred, and the areas at least temporarily serviced by using tractor cabs 304 to drive hydrogen transport trailers 303 and their cylinder modules 302 to one or both of these interconnection points.

Figure 4C:
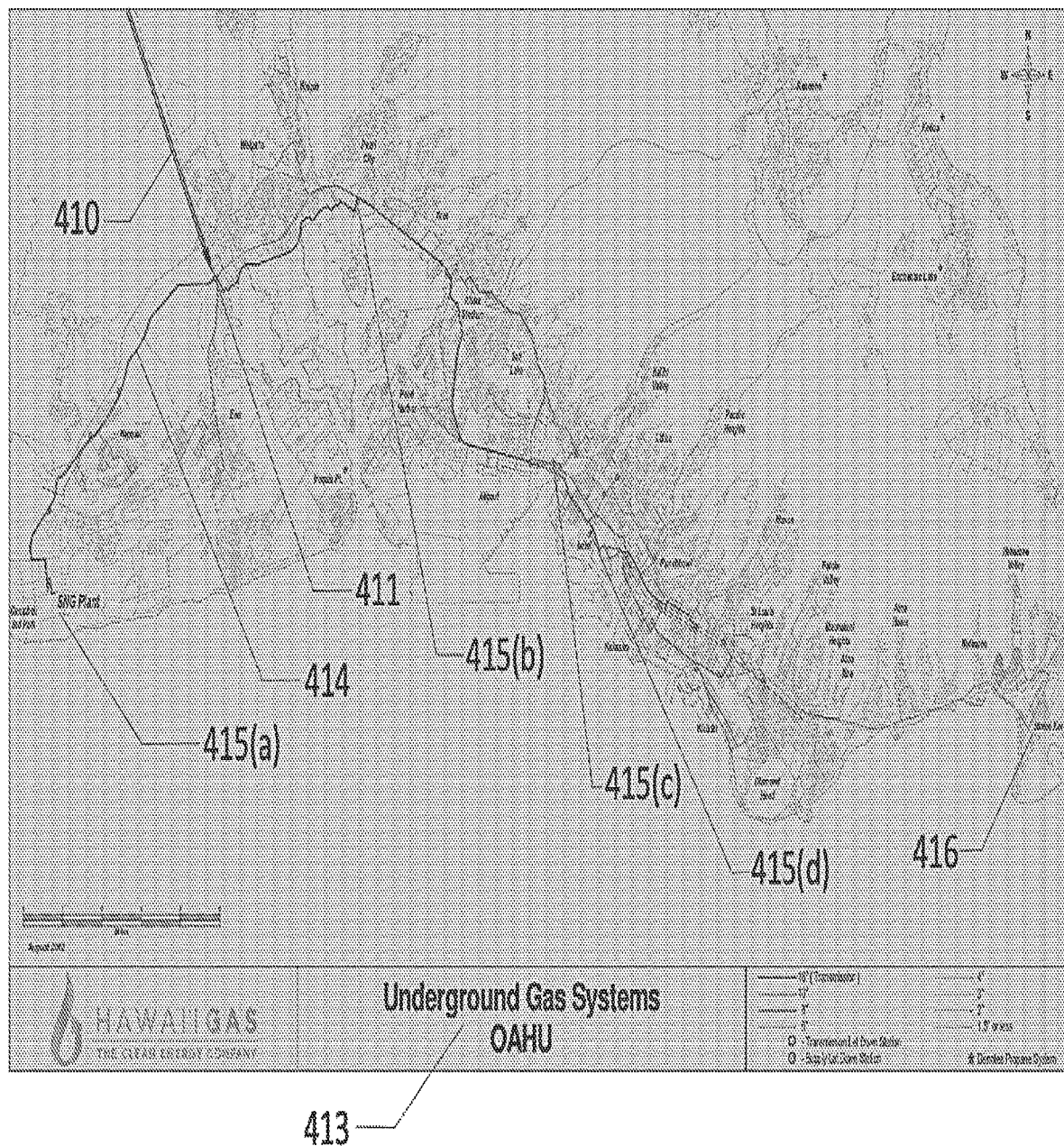

FIG. 4(c) shows a map 413 of the major synthetic natural gas lines owned by HawaiiGas on the south side of the Island of Oahu. Among these existing assets, the company owns and operates a 22 mile-long, 16-inch diameter steel transmission pipeline 414 that in one embodiment would serve as existing pipeline 301 for transport of hydrogen 101 to multiple strategically located distribution points in addition to interconnection point 411. Transmission pipeline 414 starts at HawaiiGas' synthetic natural gas (SNG) plant 415(a), located at Campbell Industrial Park near the southwest tip of the island, and runs eastward along the southern part of Oahu, delivering SNG to interconnection point 411 and seven interconnected SNG distribution systems via letdown regulators.

HawaiiGas' SNG plant 415(a) currently produces SNG from naphtha, a liquid petroleum feedstock. Accordingly, in one embodiment, the company's total daily demand for naphtha will be replaced with less than 20% of the green hydrogen 101 produced and transported daily from Oahu and transported from terminal 405 either by tractor cabs 304 and transport trailers 303, or by using new pipeline 410 and existing pipeline 414 as pipe 301 in the disclosed technology. The technology can also be used to transport the remaining portion of green hydrogen 101 from interconnection point 411 to letdown regulator sites 415(b), near Pearl City; 415(c), near Honolulu's International Airport; and 415(d), at the eastern end of transmission line 414 and serving the company's largest SNG distribution system at Pier 38 in Honolulu Harbor, near downtown Honolulu. In addition, using selectively smaller diameter hydrogen delivery line 308 and safety pipe 309 in one embodiment, HawaiiGas' 10, 8, 6 and 4-inch lines can be used to transport hydrogen 101 to other distribution points between downtown Honolulu and Hawaii Kai 416.

Figure 4D:
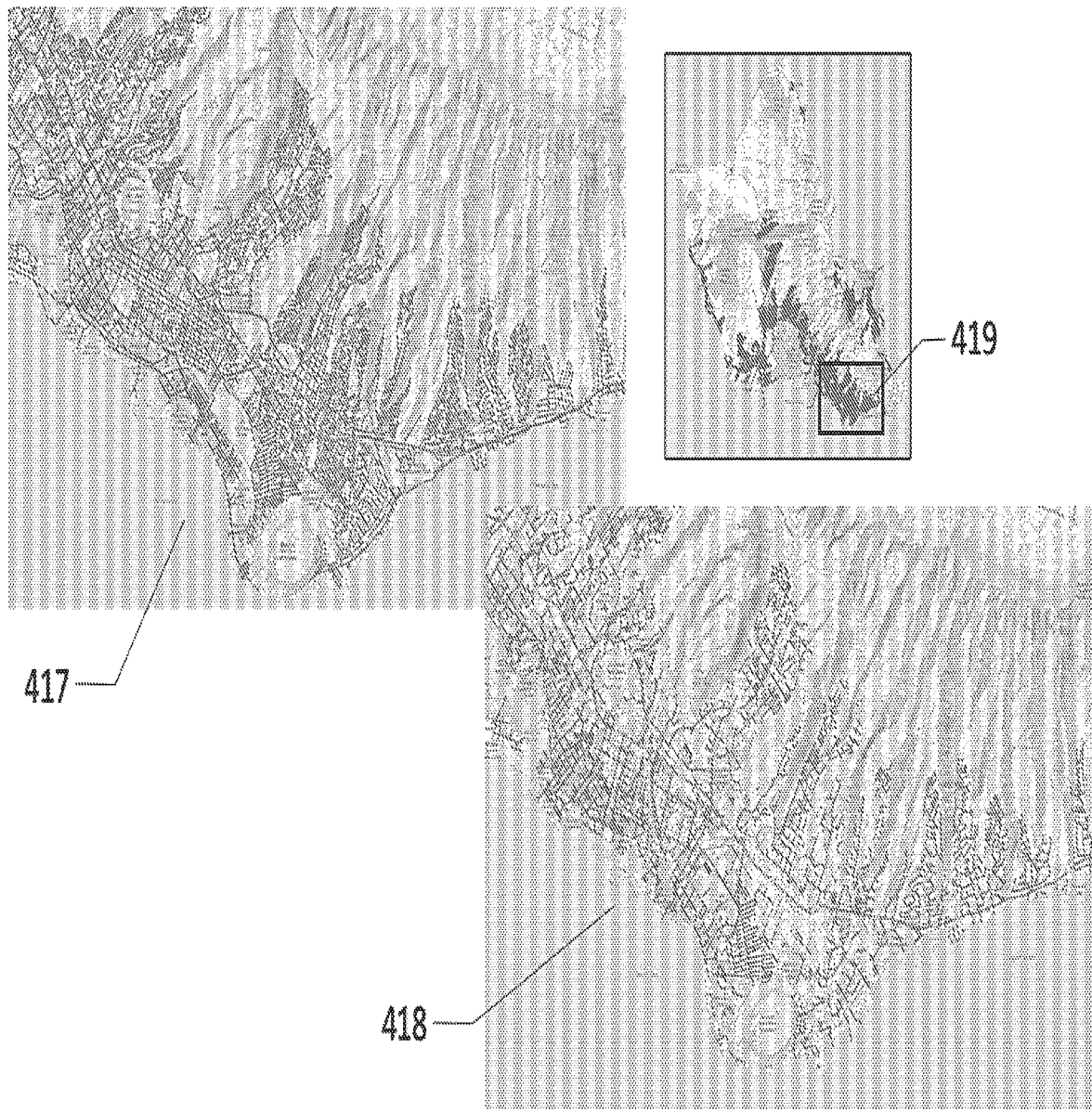

FIG. 4(d) shows Honolulu area maps of water and sewer lines 417 and the storm drain lines 418 for the island's most densely populated areas on the southeast tip of Oahu shown in highlighted section 419. The density of such existing pipelines in the area exemplify the breadth of potential distribution reach that is possible through using the disclosed technology. Persons of ordinary skill in the art will understand this is likely to be true for communities all around the globe where hydrogen distribution is needed.

The system described above maintains the purity of the hydrogen product provided from the supplier and delivered to the end user. Historically, however, most hydrogen has been produced from fossil fuel and has been combusted or used in industrial processes, e.g., in making ammonia. Accordingly, the hydrogen provenance (e.g., place of origin and history) and purity level have not been considered critical and, therefore, the extent of its non-renewable content and any impurities that might be introduced based on where it originated and how it was handled are not considered consequential.

The manner in which hydrogen is produced and the level of hydrogen purity, however, are now becoming increasingly important as greater attention is being paid to addressing climate change and a predetermined level of hydrogen purity is critical to the long-term health and/or efficiency of, for example, PEM stack fuel cells used in mobility vehicles. Further, as is known, even very small levels of impurity may require an entire system to be shut down for an extended period of time in order to identify the source and remove the problem.

Impurities can be acquired from commingling pure hydrogen with a "dirty" gas such as methane, natural gas, or any sort of fossil fuel products, or when the hydrogen has been converted into another product such as ammonia or an LOHC.

Known systems capable of ascertaining such trace levels, however, are both extremely costly and require analysis of large quantities of gas. Systems that make hydrogen from fossil fuels or blend natural gas and hydrogen in a single pipeline cannot provide this purity assurance. Even known systems that propose to distribute pure hydrogen in a former natural gas pipeline and/or propose to store hydrogen in abandoned wells or salt caverns that will be converted to exclusively hydrogen service may compromise hydrogen purity. This is because these facilities can retain harmful impurities on the inside surface of the pipe or valves; and the hydrogen flowing through them can liberate these contaminants and degrade the purity of the entire system.

As will be described below, in accordance with an aspect of the present disclosure, a system, method and apparatus for transporting and distributing hydrogen assures the purity of the hydrogen that is injected and maintains and measures the purity and/or contamination levels as the hydrogen is being transported through it. As greater quantities of hydrogen that are produced from different sources with varying levels of carbon capture enter the market, the ability of the disclosed system and method to demonstrate a "chain of custody" to assure contamination-free hydrogen of a desired purity from the point of origin to the final location where it is consumed is deemed to be of significant value. Accordingly, aspects of the present disclosure provide for recording the provenance of the transported hydrogen including purity levels, as will be described below.

Figure 5:
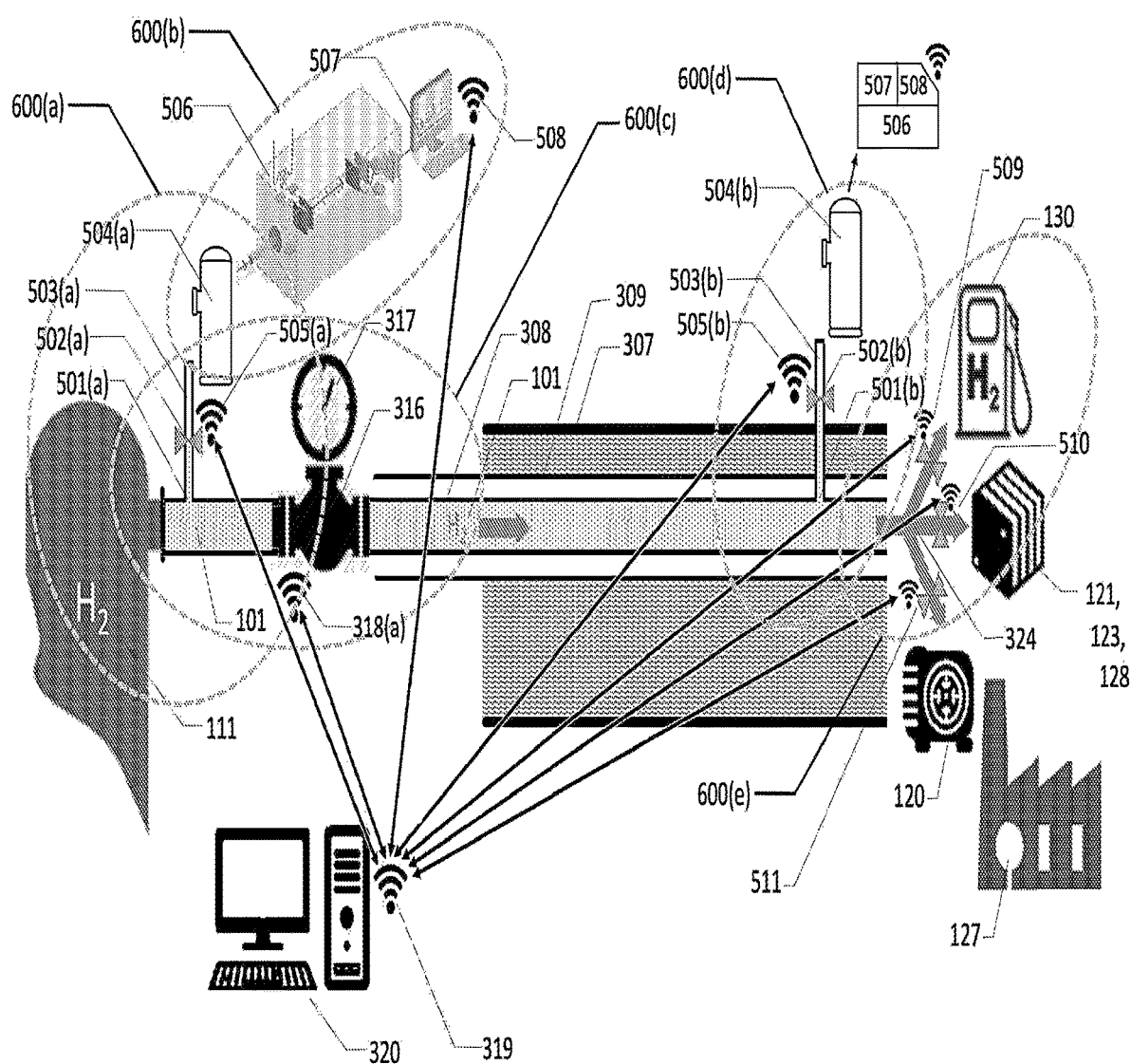
FIG. 5 is a cutaway view of hydrogen distribution pipeline for measuring hydrogen purity levels in accordance with an aspect of the present disclosure and illustrating areas in the hydrogen transport and distribution network where hydrogen purity is assured in accordance with the present disclosure.

Referring now to FIG. 5, an embodiment of a system and method is presented for monitoring the hydrogen purity level prior to any new source of hydrogen being permitted to inject hydrogen into the system in accordance with steps 214 and 219 of FIG. 2, and periodically thereafter to assure continuing purity levels are maintained.

By way of example, but not one of limitation, prior to inlet valve 316, i.e., "upstream," sample tap point 501(a) provides access to hydrogen that is intended for transmission through the system. The pipeline owner, operator, an independent certification or regulatory agency, or other party, can then sample the purity level of gaseous hydrogen 101 before inlet valve 316 is opened and the hydrogen is sent downstream. Such sampling may be conducted on a continuous, periodic, or surprise audit basis, as determined by, for example, the system operator or applicable regulating body, to assure that the purity level of the hydrogen in storage vessel 111 meets or exceeds the minimum levels required for introduction of that hydrogen into hydrogen delivery line 308. Further, knowledge of the purity level of the input hydrogen can be used as the basis for comparisons at measuring locations that are downstream.

In one embodiment, when such a test is to be conducted, control valve 502(a) is opened, enabling a sample of hydrogen gas 101 to flow through sampling pipe 503(a) and into sample container 504(a). The flow detector and transceiver 505(a) monitors the collection of this sample; and captures data such as the date and time, location, quantity, ownership, production method, test requisition, and any other information that is desired. This data is conveyed from transceiver 505(a) to transceiver 319, which is in turn connected to active monitoring system 320 for recordation and monitoring purposes with respect to the gas sample in container 504(a), and the source thereof. In an optional embodiment, active monitoring system 320 may remotely initiate the testing process by communicating a command to open valve 502(a) and fill sample container 504(a) in accordance with manual or pre-programmed commands.

The hydrogen sample is then tested using testing equipment 506, such as a gas chromatograph/mass spectrometer and/or other acceptable test technology. The results of such testing are then analyzed and included in a report 507. In one embodiment, transceiver 508 conveys this report to transceiver 319, along with the relevant data such as the origin of the sample, the hydrogen purity level, a list of any contaminants found and their respective concentration levels, and any other information considered to be germane to assuring the proper operation of the system. Once received, report 507 is correlated with the original sample, and this information is permanently recorded in accordance with terms and conditions established from time to time by the pipeline owner, operator, an independent certification or regulatory agency, or other party.

While a gas chromatograph/mass spectrometer is shown for the testing equipment 506, other testing technologies are available or may become available in the future, which may be used without departing from the principles of this disclosure. In this regard, a paper entitled "Review and Survey of Methods for Analysis of Impurities in Hydrogen for Fuel Cell Vehicles According to ISO 14687:2019" Front. Energy Res., 24 Feb. 2021, describes technologies for analyzing hydrogen impurities and is incorporated herein by reference.

In one aspect of the present disclosure, active monitoring system 320 compares test results 507 to one or more predetermined values or ranges to determine whether the tested hydrogen is compliant with the target levels or ranges. Should a test result be detected that is not compliant with the applicable value or range, this will permit regulatory authorities or the system operator to trace back the container 504(a) used to the source. Using the data from report 507, a determination may be reached whether the hydrogen from storage 111 may be injected into hydrogen delivery line 308.

Once confirmation that the purity level is within an operating specification, for example, meets or exceeds a minimum acceptable level, or is within a predetermined range, and that an amount of contaminants is within a predetermined range, valve 316 may be opened. In one embodiment, valve 316 is manually operated or, in another embodiment, valve 316 is controlled in an automated manner by active monitoring system 320 sending a message from transceiver 319 to transceiver 318(a) to open valve 316 until the permissible volume of hydrogen has been injected in hydrogen delivery line 308. Such hydrogen, and all relevant information regarding its provenance can in this manner be maintained in a record that may be used for a multitude of purposes including, but not limited to, financial accounting, quality audits, supply chain verification, regulatory reporting, and the like.

At one or more points in the hydrogen distribution system, a similar process may be employed to verify the purity level of hydrogen 101. Sample tap point 501(b) illustrates such an intermediate testing location, i.e., "downstream" from the source 111, where sample control valve 502(b) may opened manually or in an automated manner as previously described, to enable a representative sample of hydrogen 101 to flow through sampling pipe 503(b) into sample container 504(b). Flow detector and transceiver 505(b) will monitor the taking of this sample and capture relevant data such as, for example, the date and time, location, sample volume, test requisition, etc. This data is conveyed to transceiver 319, which is in turn connected to active monitoring system 320 for recordation and monitoring purposes. The hydrogen sample in sample container 504(b) may then be tested as described above using corresponding analytical equipment 506, report 507, and transceiver 508 to record characteristics of the hydrogen at that point and to assure the quality of the hydrogen 101 in the system.

In a closed system, a calculated percentage level of impurities, if any, discovered at sample point 504(b) should represent the aggregate levels from the upstream injection points 316 divided by the aggregate quantity of hydrogen injected by such points. If a level of impurities is identified as not being acceptable, in one embodiment, active monitoring system 320 will analyze the quantity of hydrogen introduced at each upstream injection point 316, and the results of reports 507 for each such injection point, to ascertain a likely origin of the impurities that led to the unacceptable impurity level. This identification of the likely origin of such impurity better facilitates further investigations and remedial steps to be taken, as well as possible penalties or sanctions to be assessed against the responsible party for having failed to comply with the minimum operating specification.

Advantageously, by maintaining an entirely closed system and measuring the hydrogen purity and level of contaminants where hydrogen is introduced into the system, and at downstream locations, hydrogen 101 off-takers at withdrawal points 324 can be assured of receiving the same quality as at sample tap point 501(b) and other intermediate testing locations. The confirmation of hydrogen purity is necessary, for example, for hydrogen refueling stations 130 serving FCEV passenger cars, heavy-duty trucks, buses, warehouse equipment and aircraft, and fuel cells 121, 123 and 128, to the extent these employ proton exchange membrane (PEM) technology.

Although impurities may be considered by some to be less critical to the performance and lifetime of alkaline technology-based fuel cells (AFC) and solid oxide fuel cells (SOFC), gas turbines 120, and industrial furnaces 127, the provenance of hydrogen running through the system is nevertheless relevant to validating overall $CO_2$ impacts, as well as for control and accounting purposes. Accordingly, the end users are shown with a respective cut-off valve, flow detector and transceiver assembly 509, 510 and 511 for monitoring and reporting the quantity of hydrogen they respectively take from the system.

As shown, these devices 509, 510, 511 transmit this information to transceiver 319, which is in turn connected to active monitoring system 320 for recordation and monitoring purposes. Information regarding the withdrawal of hydrogen 101 including, but not limited to, the date, time and volume of hydrogen consumed, and in a preferred embodiment, also its purity and pressure, can be captured from each of these points for control and billing purposes.

End users 324 have the option to confirm for themselves that the purity level of the hydrogen that they are going to take from the system meets their standards or fulfills applicable regulatory requirements for their use. Accordingly, as one component of this analysis, the hydrogen quality reports from one or more of transceivers 505(a), 505(b), 509, 510 or 511 may be provided to the end user. Of course, if a report indicates that the hydrogen does not meet the required standard, the hydrogen will not be accepted. Additionally, if the tests run by a user do not meet the standard and/or differ from the report from transceiver 509, 510 or 511, an analysis of why they differ can be initiated with at least an initial understanding that impurities may have been introduced at the delivery end of the system.

It should be noted that transceivers 318, 319, 505(a), 505(b), and 508-511 described herein may be any direct, wired, wireless or any other mode of communication. Further, the storage of information encompasses both local and cloud-based systems.

In another embodiment, blockchain technology may be used by active monitoring system 320 to record data for each of the points in the hydrogen supply chain described herein. It should be noted that blockchain technology can be used either instead of, or in addition to, a centralized database. Utilizing a blockchain to record these transactions provides an immutable public or quasi-public ledger regarding sampling, laboratory test results, hydrogen provenance, injection transactions, and off-take transactions, as well as the associated payments therefor. By creating hard to alter records of the source for each kilogram of hydrogen, how it was produced and transported, and by verifying hydrogen purity levels in near real-time, contamination can be isolated and assurances of systemwide purity levels and compliance with decarbonization policy objectives can be much more effectively provided.

Hydrogen presents a number of unique challenges in providing end users with assurances as to many concerns including, but not limited to, its traceability, origin, chronology of ownership, and chain of custody. These and other related considerations are critical to certify hydrogen quality; the qualification of entities involved in its production, transport and use for receiving financial support; and to satisfy the requirements for existing or future tax credits and incentives. These issues are collectively referred to herein as the "provenance" of the hydrogen and are important to hydrogen being traded in the market.

In one aspect of the present disclosure, a "hydrogen ledger," i.e., a record or database (and in a preferred embodiment, a blockchain based decentralized record or database) of all transactions and information related to the system is maintained. These transactions include, but are not limited to, hydrogen provided into the system, hydrogen samples taken from the system, hydrogen transported in the system, or hydrogen withdrawn from the system. The entries are submitted to the hydrogen ledger to become part of providing the provenance for the hydrogen in the system, as described herein.

In one aspect of the present disclosure, a producer can record data regarding the hydrogen they are proposing to supply into the system through valve 316. Referring to FIG. 6(*a*), which is related to an area 600(*a*) from FIG. 5, data submission 601 includes information regarding the hydrogen sampled at sample tap point 501(*a*) and to be provided through transceiver 505(*a*) to the hydrogen ledger. Submission 601 includes a plurality of data fields although persons of ordinary skill in the art will understand that the data fields shown in FIGS. 6(*a*)-6(*e*) represent a non-limiting example that is provided for explanatory purposes only and other fields can be included, and various fields shown may be omitted, without departing from the principles of the technology disclosure. Further, it should be noted that such data entries shown in these illustrations may be considered both a screen interface through which data can be entered as well as an explanatory representation of said fields.

As shown in FIG. 6(*a*), sample data submission 601 includes:

A contributor digital signature field 602 to designate the individual operator who is providing the data submission from a location participating in the network.

A participant identifier field 603 to designate the hydrogen producer location which, as shown, would preferably be assigned a globally unique value. In a preferred embodiment of the network, such participant would have already gone through a registration process, in which an independent regulatory agency or certified reviewer confirms the ownership, geographic location, and verifies other germane details associated with such network participant and their qualification to participate in the system; and such review would be periodically updated on a regular basis and any time the participant makes significant changes thereto, such as by adding new production equipment.

A participant type field 604, which in this illustrative case is a "producer."

A production method (PM) field 605(*a*) used by the corresponding network participant in participant identifier field 603 to produce the hydrogen 101, such method shown in the example as being by "electrolysis."

A production method percentage (PM %) field 606(*a*), which indicates a percentage of the hydrogen 101 in hydrogen storage 111 that was produced using the method identified in PM field 605(*a*). If more than one production method (e.g., steam reformation) was used to produce the hydrogen 101 contained in storage 111, then additional production method fields 605(*b*) through 605(*n*) (not shown in the illustration) and corresponding PM % fields 606(*b*) through 606(*n*) (also not shown) would be recorded, such that the total percentage of the PM % fields 606(*a*) through 606(*n*) adds up to 100%.

The corresponding type of power source (PS) or sources used for such production method(s) shown in PM fields 605(*a*) through 605(*n*) is recorded in PS1 field 607(*a*), shown in the example as being "solar".

A power source percentage (PS %) field 608(*a*) indicates the percentage of the power used that originates from the source in PS1 field 607(*a*), which for purposes of illustration is shown as being 45%. Each additional power source and its corresponding PS % is recorded in PS fields 607(*b*) through 607(*n*), and its respective percentage of total power used is recorded in PS % fields 608(*b*) through 608(*n*), respectively, with the total of all such power sources adding up to 100%.

Accordingly, in the non-limiting example shown in FIG. 6(*a*), a second power source field, PS2 field 607(*b*), indicates that "wind" provides a second source of power used by participant 603; and the corresponding PS2% field 608(*b*) indicates that wind power provides 55% of the total power. Of course, any energy source such as, for example, hydro, geothermal, nuclear power, grid power, specific fossil fuel, or other energy source, as well as its corresponding percentage contribution, would be indicated in a similar manner; and in a preferred embodiment, such options would be selected from a menu of available options in order to normalize the data reflected within the system.

To the extent that any hydrogen production source or power source resulted in carbon emissions, an additional field would in a preferred embodiment solicit information from the participant about whether carbon capture and sequestration (CCS) technology was employed, and in each case the percentage of carbon thereby removed for that production source or power source would be submitted. In one embodiment, that input would be shown in a carbon capture and sequestration (CCS) field 609 (and subparts thereof as useful); and a corresponding field (or fields), designated in the illustration as CCS % 610, would designate the percentage of total carbon production sequestered through such technology. Given the assumptions shown, CCS field 609 and CCS % field 610 each indicate "n/a" since neither the indicated production method in PM field 606(*a*), nor the power sources shown in PS1 field 607(*a*) or PS2 field 607(*b*), result in carbon emissions. The information in fields 605, 606, 607 and 608, as well as the details regarding CCS indicated in fields 609 and 610 (as applicable), may be based on testing undertaken by the participant as part of the production process; an audit of the facility conducted by an independent party, such as a certifying agent or the like; or some combination of these methods. The audit may be necessary as a threshold condition in order for the production location to be granted a right to inject hydrogen into the system. Further, the information may be renewed whenever changes are made to such production equipment, and periodically (such as annually) thereafter. In such situations, one of ordinary skill in the art will understand how additional fields may be added for entry of the date and identifier of the latest certificate of inspection that corresponds to the participant ID 603 when the participant type 604 is a "producer".

A submission purpose field 611 indicates the purpose of entry 601 to the hydrogen record. As shown, "sample" being the entry in purpose field 611 indicates that submission 601 is submitted to the hydrogen ledger for recording a sample taken of hydrogen 101.

In one embodiment of the present disclosure, sample container 504(a) that was used to test the hydrogen has a unique identifier that is recorded in sample container ID field 612, and a corresponding cylinder size field 612(a).

A sample identifier field 613 indicates an identifier assigned to a specific sample taken. In one embodiment, the sample identifier 613 is a globally unique identifier value assigned by the system.

A pressure field 613(a) and a temperature field 613(b) respectively contain data related to the sample.

A hydrogen gas quantity field 613(c) is included and its value can be calculated based on the pressure and temperature fields 613(a) and 613(b). Alternatively, some regulatory standards may require that the gas quantity be calculated as the difference between the tare weight of the empty container and the container weight measured after collecting the sample. Of course, one of ordinary skill in the art understands that procedures for assuring accurate measurements can be established by the system operator and/or applicable regulations.

A testing lab identifier field 614 contains a unique identifier for the testing lab where the sample corresponding to submission 601 will be analyzed. The sample may be sent "off-site" or remain "on-site" for analysis. In either situation, the identifier will identify the lab used. In a preferred embodiment, such lab would have already undergone a thorough registration process, in which an independent regulatory agency or certified reviewer confirms the ownership, geographic location, and verifies other germane details such as the type of testing equipment used, personnel qualifications, and use of recognized standards for participating in the system; and such review would be periodically updated on a regular basis and any time the lab makes significant changes, such as upon its purchase of new equipment or adoption of new test procedures.

When the fields in submission entry 601 are complete, through either manual entry, automated entry, or in quasi-automated fashion, including information required in accordance with applicable regulatory standards and the terms and conditions established by the system operator or regulatory body for injecting hydrogen into the system, entry 601 is submitted to the hydrogen record.

In one embodiment of the present disclosure, a button 615 indicates that such submission is made to the Ethereum ledger, which will create and associate a timestamp and geolocation for the submission. It should be noted that the Ethereum blockchain is referenced for illustrative purposes only, as there are other public, quasi-public and private blockchains that may be used for the hydrogen ledger. Alternatively, the hydrogen ledger may be maintained on a centralized repository controlled by the system operator, an agency, or another party, as previously described. A public blockchain may be preferred, however, to provide an added level of transparency, to establish the basis for hydrogen as a tradeable commodity, and the prospect for alternative funding methods through coin offerings and other approaches that may help to accelerate the transition from fossil fuel to clean hydrogen use and will be readily known to persons of ordinary skill in the art.

In one aspect of the present disclosure, testing results of hydrogen taken from any point in the system can be stored in the hydrogen ledger. As shown in FIG. 6(b), which is related to area 600(b) from FIG. 5, submission entry 616 is entered into the hydrogen ledger via transceiver 508 for the contents of sample container 504(a), described above.

As shown in FIG. 6(b), test report data submission 616 includes:

A contributor digital signature field 617 to designate the individual operator who is providing the data submission from a location participating in the network.

Figure 6A:
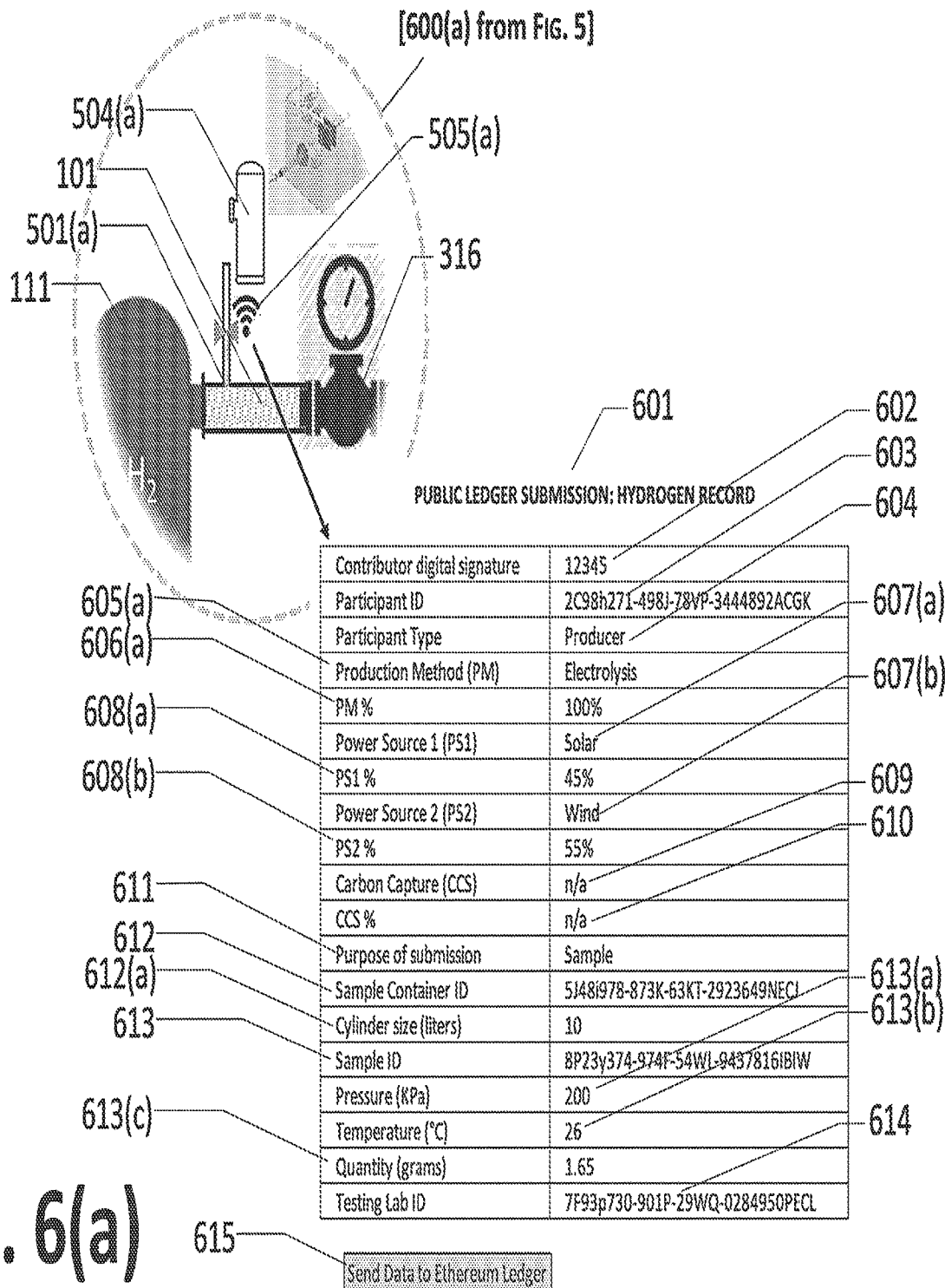
Figure 6B:
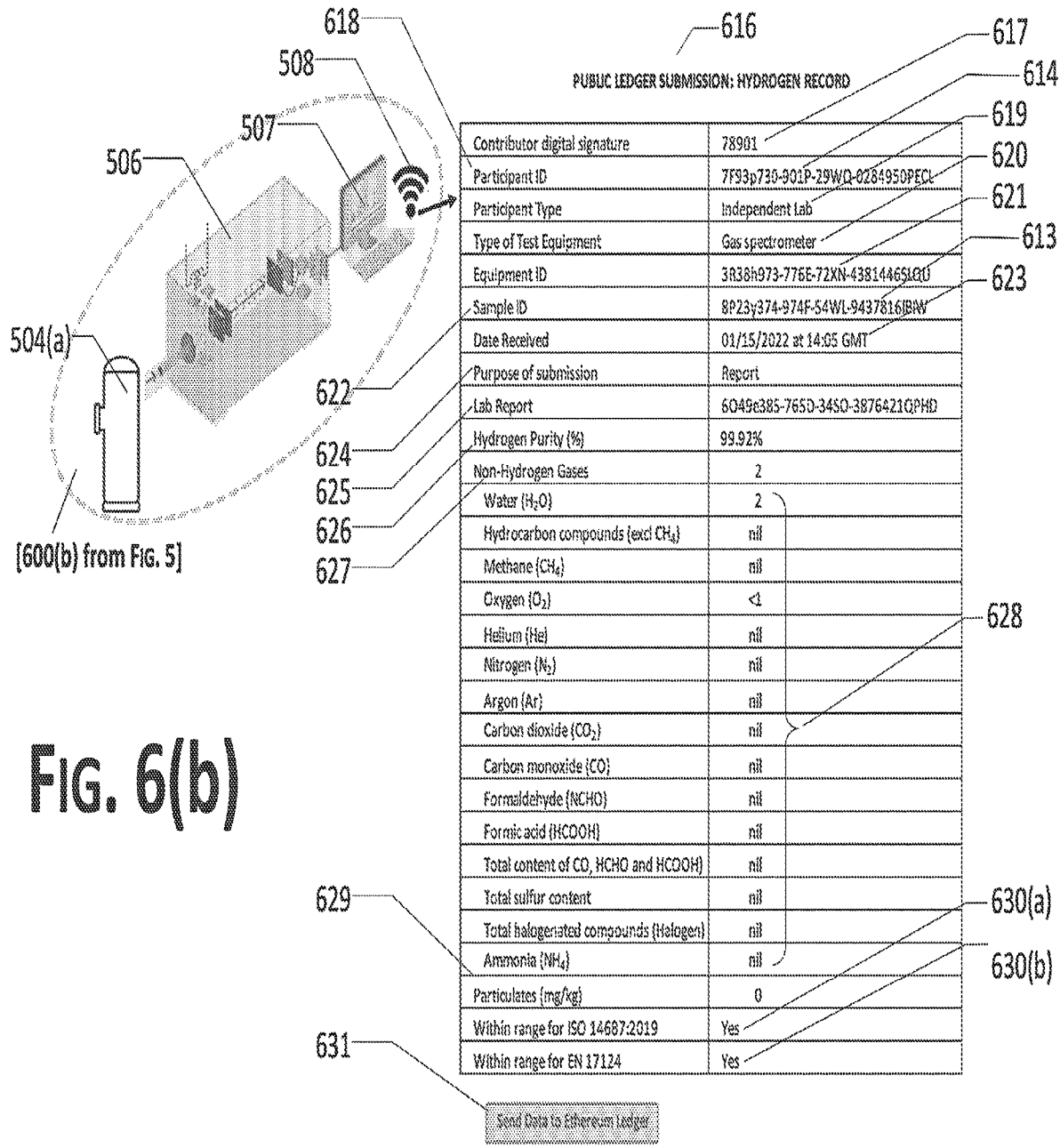
Figure 6C:
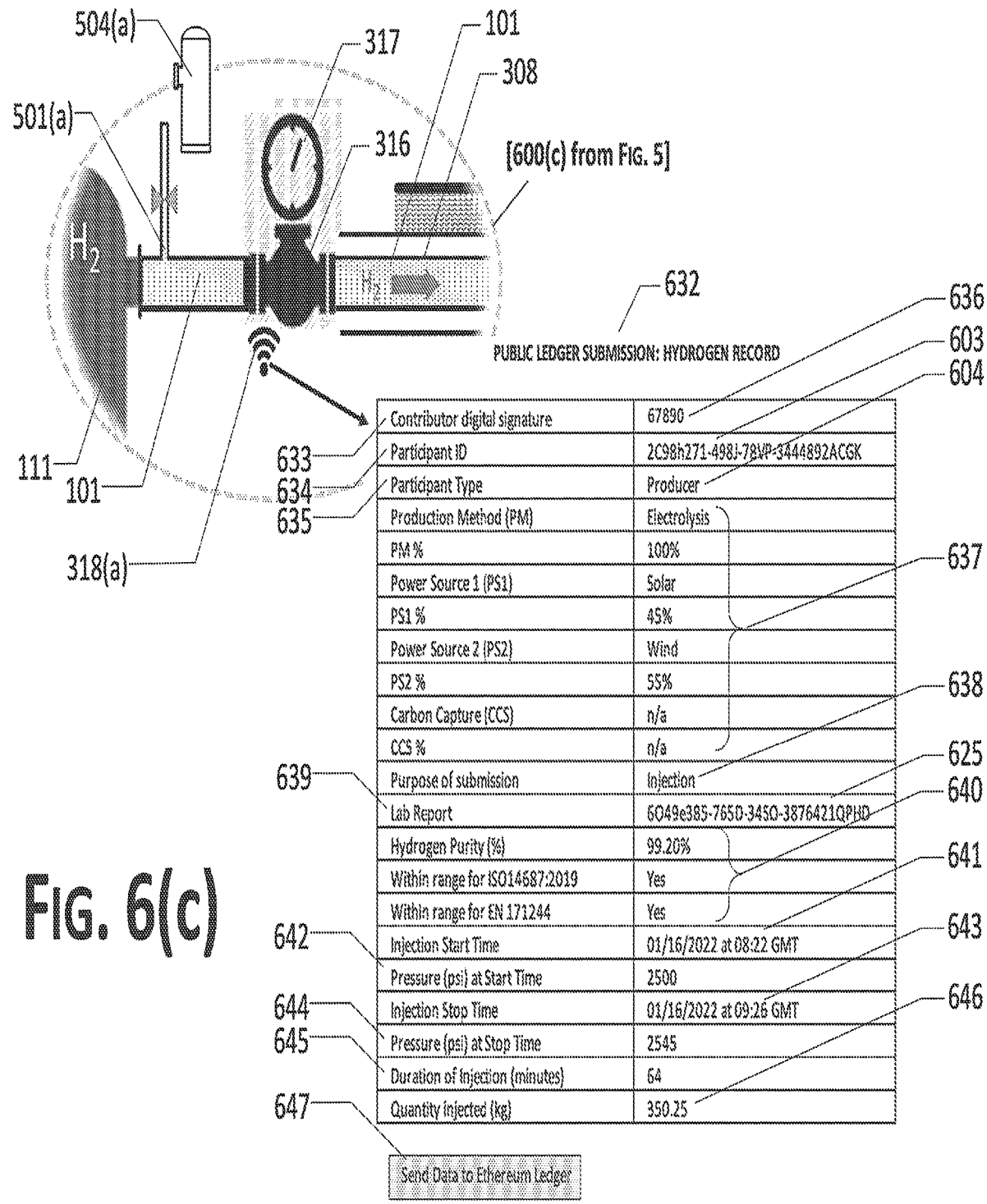
Figure 6D:
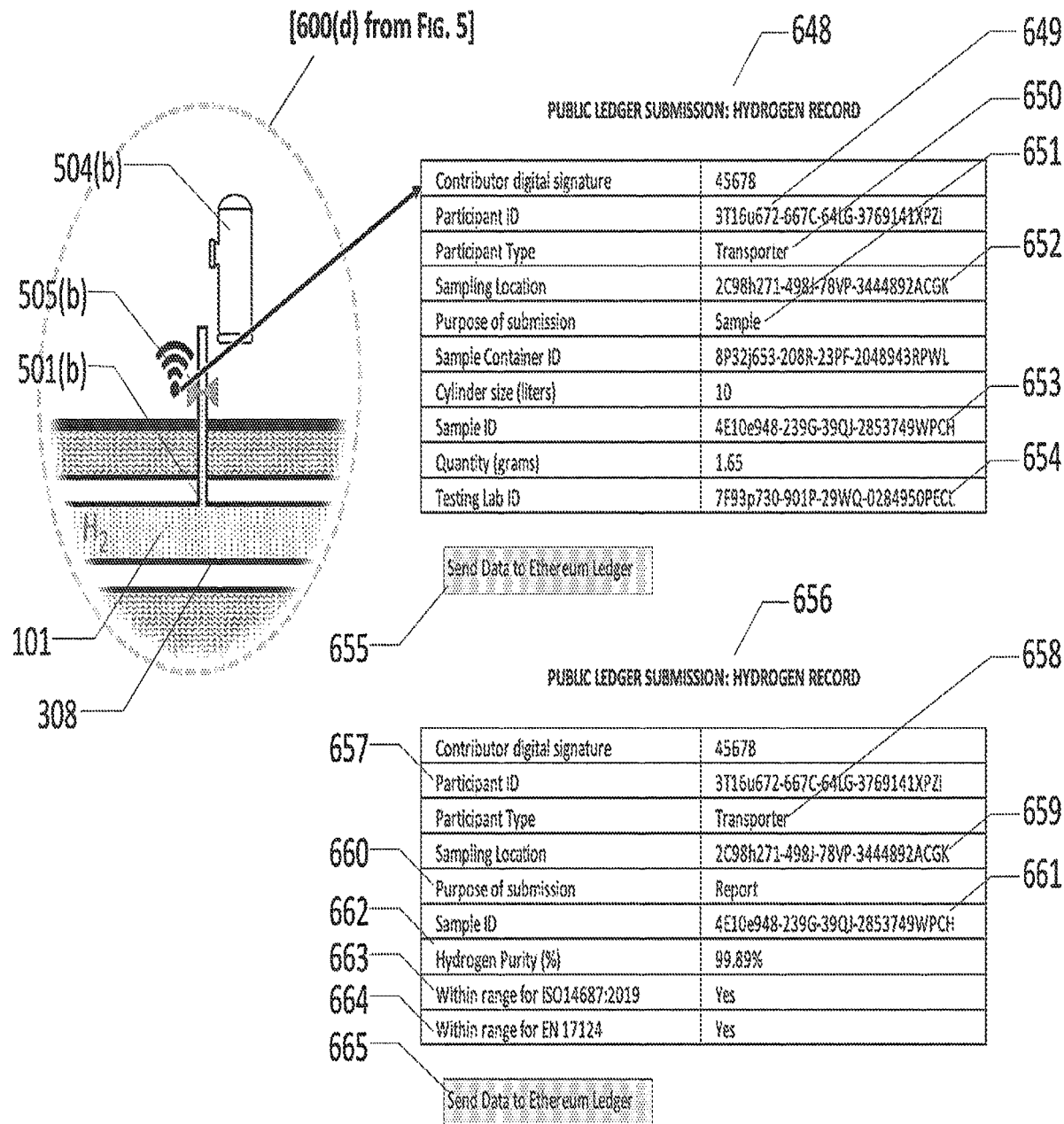
Figure 7:
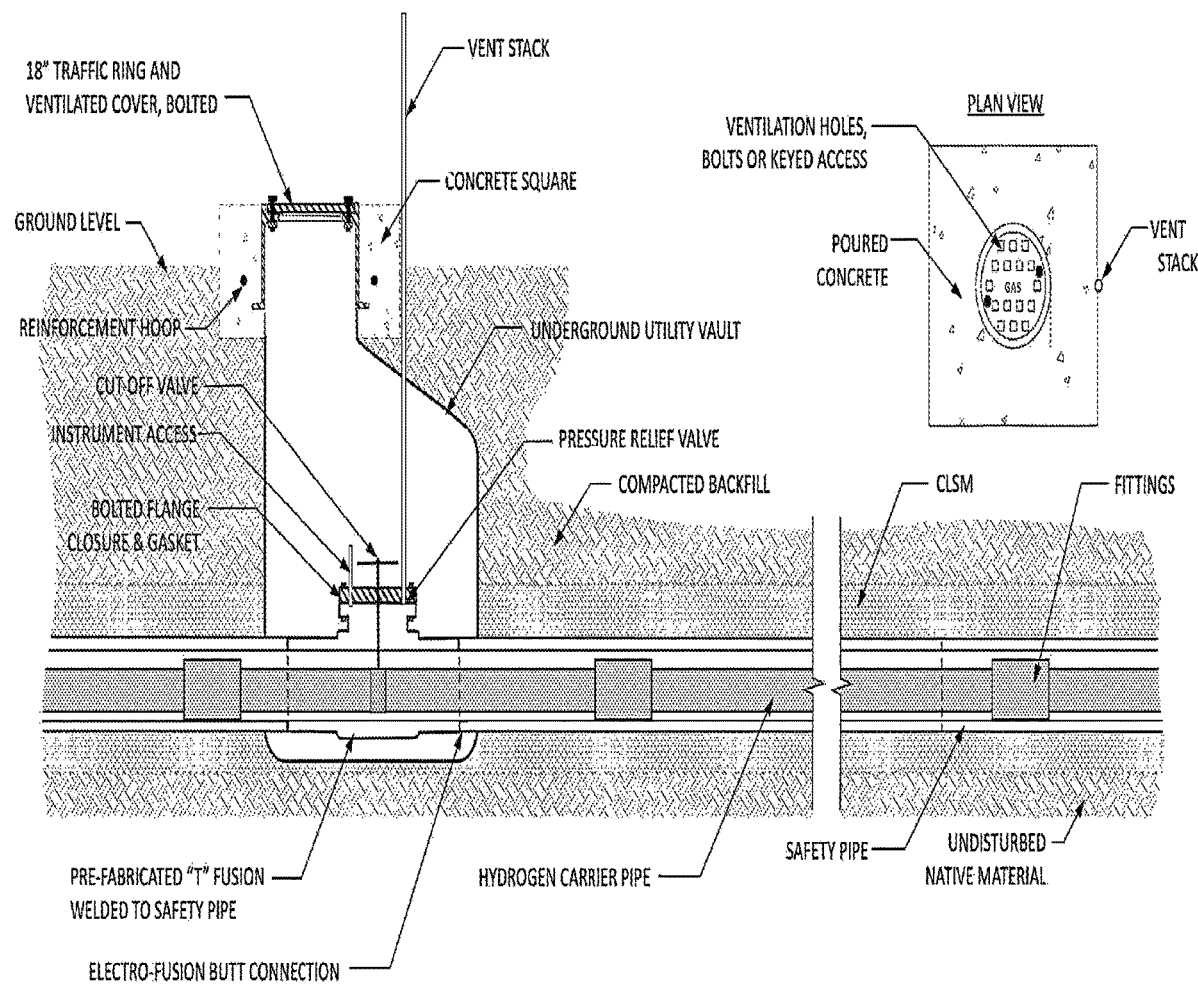
FIG. 7 is an illustration showing one embodiment of an underground installation of a hydrogen delivery line surrounding by a safety pipe for transporting and distributing hydrogen in accordance with the principles of this technology disclosure.
Figure 8:
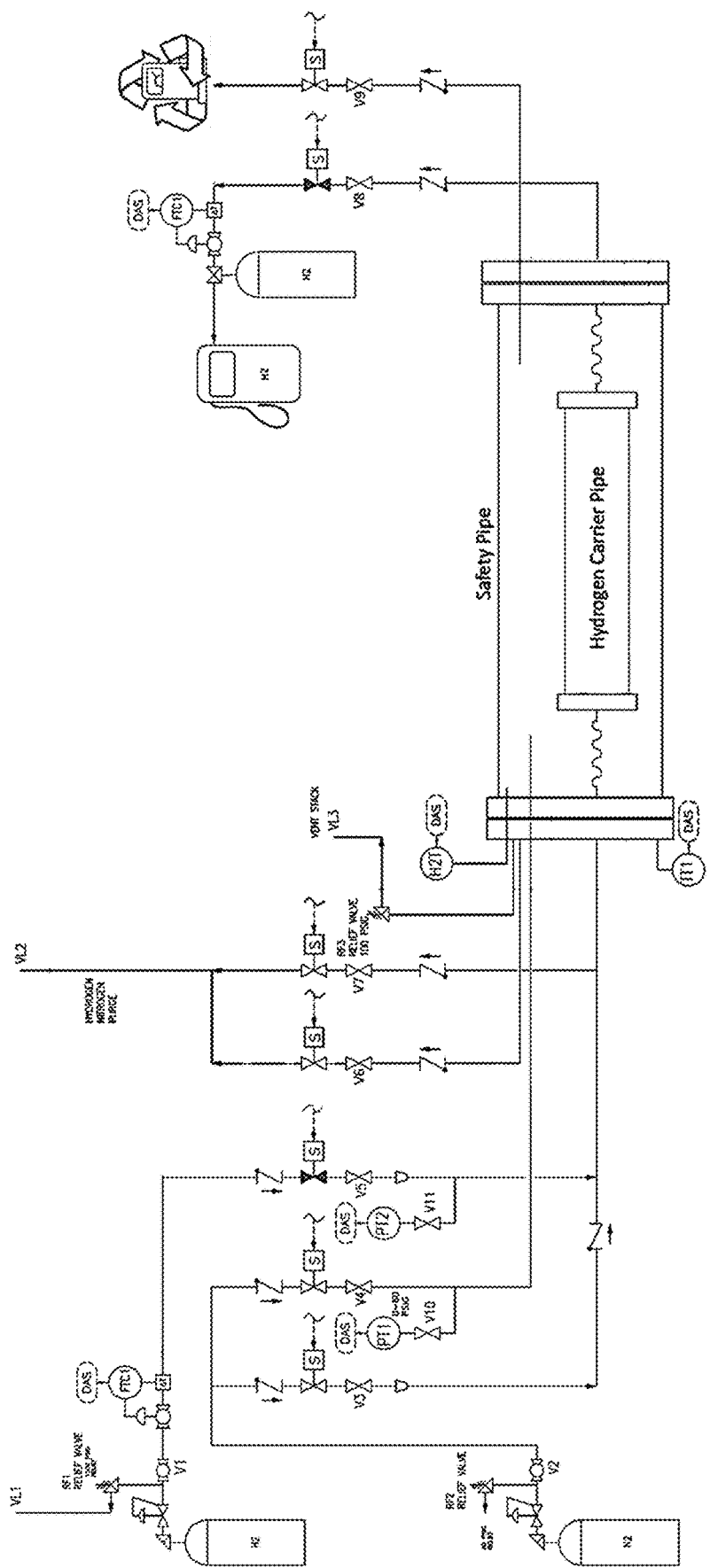
FIG. 8 is a piping and instrumentation diagram (P&ID) in one embodiment of the system for transporting and distributing hydrogen from a hydrogen source to an end user application in accordance with the principles of this technology disclosure.

A participant identifier field 618 for the testing lab, which, as shown, has the same globally unique value in a preferred embodiment of the system as testing lab ID 614 in FIG. 6(a), thereby effectively tying the chain of custody.

A participant type field 619, which in this illustrative case for the participant identified by participant ID field 618 is an "independent lab."

In a preferred embodiment, the designation of a testing lab as the record submitter in participant ID field 618 would preferably solicit information from the participant (e.g., in this case the lab) about the equipment and sample tested, including a test equipment type field 620 identifying the equipment used to perform the test or tests for submission 616; and which in the non-limiting illustration is, here, the "gas spectrometer" 506 shown in FIG. 5.

A testing equipment ID field 621 contains an assigned globally unique identifier of such equipment. The unique identifier allows for identifying the make and model of the equipment and for tracing back to the associated purchase, certification, calibration, and records of use to confirm that the equipment is appropriate for the required task and periodically verified to be operating correctly or updated, repaired, etc.

A sample identifier field 622 provides an opportunity to enter the identifier of the sample corresponding to submission 616. In the example shown in FIG. 6(b), the value shown in sample identifier field 622 is identical to sample ID 613 recorded in submission 601 to indicate that these test results are for the hydrogen sample taken from sample tap 501(a), and effectively tying the chain of custody to producer 603 and storage 111.

A date/time stamp field 623 is an automatic timestamp that indicates the date when the sample was received by the lab. Advantageously, the difference can be calculated between the data in date/time stamp field 623 and the timestamps associated with the corresponding entries for data submissions 601 and 616 as this will indicate the time between producer 603 collecting sample 613, laboratory 618 receiving the sample, and data submission 616 containing the test results 507 being entered into the hydrogen record.

A submission purpose field 624 indicates the purpose of submission 616 to the hydrogen record. In the example, the purpose is a "report" of test results.

In a preferred embodiment, the designation of a report in submission purpose field 624 will generate a globally unique identifier, shown in lab report field 625, that is assigned by the system to the specific report for testing sample 613 and aid in tracing functions.

A hydrogen purity field 626 indicates the hydrogen purity level ascertained for sample 613 as contained in report 507.

A non-hydrogen gases field 627 indicates the total amount of measured quantities of non-hydrogen gases in the sample referenced in sample ID field 622 (e.g., sample 613 in the illustration).

One or more subfields 628 indicate the amounts of specific non-hydrogen gases found in the sample. These specific non-hydrogen gases may include those that are required to be reported by various regulations, to comply with hydrogen network requirements, or simply for informational purposes.

A particulates field 629 indicates the amounts of particulates that the tests conducted at lab 614 found in the sample referenced in sample ID field 622.

One or more compliance fields 630(*a*) through 630(*n*) preferably indicate whether the reported levels for such sample fall within the accepted limits, including, for example, "ISO14687-2019 compliance" field 630(*a*) and "EN 17124 compliance" field 630(*b*), and in turn control whether the reported measurement levels comply with the relevant standards of hydrogen purity for the intended use (e.g., in this case, for mobile vehicles). Persons of ordinary skill in the art will realize that fields for other standards can be used or added to these depending on the objectives of the system operator and/or applicable regulatory requirements.

Similar to submission 601, when all of the necessary fields in entry 616 have been completed through manual entry, automated entry, or in a quasi-automated fashion, button 631 indicates its submission to the hydrogen record.

In one aspect of the present disclosure, a hydrogen producer can record data regarding the hydrogen 101 they are injecting into the system. Referring to FIG. 6(*c*), a non-limiting example is provided in which producer 603 submits injection entry 632 to the hydrogen ledger in conjunction with its introduction of hydrogen 101 from storage 111 into hydrogen delivery line 308 through valve 316, as illustrated in area 600(*c*) from FIG. 5.

The injection submission 632 includes many of the same types of data fields as found in the submissions 601 and 616. Accordingly, in some cases, the values recorded in the fields may be the same as these earlier submissions; and in other cases, the data field may be the same, but the value entered into that field will be different based on the specific circumstances. For example, contributor field 633, participant ID field 634, and participant type field 635 are the same as the corresponding fields in FIG. 6(*a*), but in this illustrative case, while participant ID 603 and participant type 604 are the same, the individual contributor 636—designating the individual at network participant 603 who completed injection submission 632—is a different person than contributor 602, who completed sample data submission 601.

Like sample data submission entry 601, the selection of "producer" as the participant type in participant type field 635 requires entry of the fields collectively referred to in FIG. 6(*c*) by the label 637 corresponding to fields 605 through 610 of FIG. 6(*a*). Because these fields describe the source of hydrogen 101 in storage 111, the values in these fields are the same as previously indicated for sample 504(*a*) taken from sample tap 501(*a*). In the case of the example provided, this data includes production method 605(*a*); PM % 606(*a*); the sources of power 607(*a*) and 607(*b*); PS % 608(*a*) and 608(*b*); and information 609 and 610 regarding CCS and CCS %, respectively, each as described with respect to FIG. 6(*a*), above. Alternatively, persons of ordinary skill will readily understand that given the manner in which a ledger of this nature functions in a preferred embodiment, this data regarding hydrogen production facility 603 could be ascertained from a previous submission such as sample entry 601 or from the results of a periodic audit conducted of facility 603 by a certifier that are separately submitted to the hydrogen record, and merely validated by contributor 633 as being unchanged.

Given the circumstances, the purpose of submission field 638 indicates "injection", which in turn requires the manual, automated, or semi-automatic entry of different data than the case illustrated in FIG. 6(*a*), where the purpose 611 was indicated as being "sample". In one embodiment, these fields correspond to key findings from the results of the lab tests performed on that sample 613, including lab report field 639, which indicates the globally unique identifier 625 assigned to the report 507 in test report data submission 616, as illustrated in FIG. 6(*b*). Label 640 designates some of the key conclusions from that report, including hydrogen purity level 626, and confirmation of standards compliance 630(*a*) and 630(*b*).

The injection entry 632 also includes an injection start time field 641 and an injection starting pressure field 642 to indicate the starting time and pressure as recorded on gauge 317, respectively, when hydrogen injection began. An injection stop time field 643 and an injection ending pressure field 644 are also provided to indicate the ending time and pressure, respectively, when the hydrogen injection ended. An injection duration field 645 is the difference between the two fields 641 and 643, which is the total injection duration. A hydrogen quantity injection field 646 records the total quantity of hydrogen that has been injected into the system. In one aspect of the system, as has been described herein, this injection entry 632 is submitted to the hydrogen record via transceiver 318(*a*), as indicated by button 647.

In another aspect of the present disclosure, a transporting entity or transporter, for example, the entity operating or regulating the system, may conduct testing of the hydrogen at various points in the pipeline. Referring now to FIG. 6(*d*), which is related to area 600(*d*) in FIG. 5, a transporter sample entry 648 and a corresponding transporter sample report entry 656, each regarding the hydrogen at a location in the system, may be submitted to the hydrogen ledger.

The designation in submission 648 that participant 649 is a "transporter" 650, and the further indication of "sample" 651 as being the purpose of such submission 648 indicates the nature of the submission made from sampling location 652, who submitted this data, as well as their purpose in so doing; and preferably prompts entry of the appropriate additional information for the hydrogen record. In a preferred embodiment, such transporter would be required as a threshold condition to participating in the hydrogen ledger to have their pipeline certified by an independent agent or regulatory body, including the materials used to construct the hydrogen delivery line 308 and its diameter, permissible pressure levels and each point of input and withdrawal. The designation of a "sample" in the purpose of submission field was previously described with regard to FIG. 6(a); and from that earlier description, it will be apparent how entries in the remaining fields of submission 648 identify the globally unique sampling location identifier 652 for the particular sample tap location 501(b) from which a sample of hydrogen 101 was drawn from hydrogen delivery pipe 308; the container 504(b) that was used to collect sample 653, and the testing lab 654 where sample 653 was analyzed. Upon these fields being competed through a manual, automated or semi-automated process, the data in submission 648 is timestamped and submitted through transceiver 505(b) as designated by send data button 655.

Submission 656 indicates participant ID 657, participant type 658, and sampling location 659, thus linking the entries in submission 656 with those made in submission 648. Unlike the prior submission, however, submission 656 indicates "report" as being the purpose of submission 660, which in a preferred embodiment prompts entry of the appropriate additional information into the hydrogen record for a report submission from a participant who is a transporter. The designation of a "report" in the purpose of submission field was previously described with regard to FIG. 6(b), where the participant was an independent testing lab. Depending on the rules or regulations applicable to the network, in FIG. 6(d), where the participant is a "transporter," an independent lab report may not be required except infrequently (for example, as part of a periodic system calibration process) and the information that must be submitted with greater frequency (such as hourly, daily, weekly or at another pre-determined frequency) may be abridged to just containing the globally unique sample ID 661, and the key results attained with respect to that hydrogen sample, such as its purity level 662 and an indication of whether such sample 661 is within range for one or more corresponding standards such as 663 and 664. This lends itself to being automatically sampled and the data uploaded as designated by send button 665, but such testing and submission may also be done through manual or semi-automatic acts.

In a preferred embodiment, when an end user receives, or takes, hydrogen 101 from the system as illustrated by the end user withdrawal points 324 in FIG. 3, an end user entry is provided to the hydrogen ledger. Referring now to FIG. 6(e), with respect to area 600(e) in FIG. 5, in the non-limiting example shown, submission 666 includes the digital signature of the individual contributor 667 and the globally unique identifier for the system participant 668 on whose behalf such contributor 667 is acting. Persons of ordinary skill will readily appreciate that individual contributor 667 does not necessarily imply a live person, but in one non-limiting example contributor 667 could be the automated entry provided by a specific storage tank, and system participant 668 could be a particular refueling station where such tank is one of several tanks filled from hydrogen delivery line 308. Submission 666 also includes the participant type 669 as being an "end user," a description of the particular use 670 corresponding to use 130, which in a preferred embodiment is one of a normalized list of end use options, and the quantity of hydrogen 671 withdrawn from hydrogen pipe 308. As with all of the foregoing submissions to the hydrogen record, upon submitting entry 666 through transceiver 509 as designated by button 672, a timestamp and geolocation is recorded in the ledger along with the data.

Persons of ordinary skill will readily understand how the information submitted in each of the foregoing steps and the corresponding time and location stamps associated therewith will enable sharing tax credits, carbon off-sets, and other incentives (that exist or that may arise in the future) when accounting for final hydrogen prices and investor returns. Although not required in order to practice the disclosed system and method, persons of ordinary skill will understand the benefit associated with use of a public or semi-public blockchain to maintain a ledger without a trusted intermediary and that is not easily faked and/or duplicated. Moreover, the use of blockchain technology, tokenized payments for hydrogen and hydrogen transport services, and the use of smart contracts (e.g., code that is placed into the blockchain that executes automatically when certain pre-agreed conditions are later fulfilled) will help make these incentives practical in the transitioning and scaling up of a clean hydrogen industry.

Said in another way, the use of blockchain technology in a preferred embodiment can provide immutable assurances years in advance of adequate and reliable hydrogen supplies to meet consumption requirements, at the same time as hydrogen production sources come on-line and require off-takers for their hydrogen. Thus, the use of a blockchain ledger in a preferred embodiment can provide a reliable method of assurance to both sides of the market, in addition to those parties needed to build a transport and distribution infrastructure interconnecting them, that other components of the industry will develop in a timely manner. In addition, in a well-designed system, financing may be available to these participants through opening the prospect for discounted token sales years in advance of such facilities and infrastructure beginning to operate. Further, through the well-known benefits of traceability and the ability to coordinate action between unrelated parties worldwide, the use of decentralized finance, asset and/or service-backed tokenization, and smart contract rewards may help motivate early adopters while simultaneously providing a source of funding for these massive and vital capital-intensive improvements.

As used throughout this application, the word "may" is used in a permissive sense (i.e., meaning having the potential to) rather than the mandatory sense (i.e., meaning must). Similarly, the words "include," "including," and "includes" mean including, but not limited to. Additionally, as used herein, the terms "interconnected", "connected," "coupled" or "attached" may refer to two or more components connected together, whether that connection is permanent (e.g., welded or glued) or temporary (e.g., bolted, held by a physical object, or held in place by friction or tension), direct or indirect (i.e., through an intermediary), mechanical, chemical, optical or electrical.

From the foregoing disclosure, it will be appreciated that, although specific implementations have been described herein for purposes of illustration, the implementations are not limited to the examples or drawings described. Various modifications may be made without deviating from the spirit and scope of the appending claims and the elements recited therein. In addition, while certain aspects have been presented as optional or alternate embodiments, all such embodiments are not required and thus may be incorporated as dictated by the circumstances to achieve the desired result. Moreover, while certain aspects are presented below in certain claim forms, the inventors contemplate the various aspects in any available claim form. Various modifications and changes may be made as would be obvious to a person skilled in the art having the benefit of this disclosure. It is intended to embrace all such modifications and changes, and accordingly, the above description should be regarded in an illustrative rather than restrictive sense.

What is claimed is:

1. A hydrogen distribution system for transporting hydrogen from a hydrogen source to at least one end user location, comprising:
    a hydrogen source in fluid communication with at least one shutoff valve;
    a hydrogen delivery line configured to carry pressurized hydrogen;
    at least one inlet in fluid communication with the hydrogen delivery line, said inlet configured to receive hydrogen from the hydrogen source, and at least one outlet allowing withdrawal of some portion or all of said hydrogen at the at least one end user location;
    a sensor fluidly connected to a sample tap point of said hydrogen source configured to measure the value of the at least one fluid characteristic within a hydrogen sample from said hydrogen source;
    at least one shutoff valve fluidly coupled to said hydrogen delivery line configured to selectively close and isolate selected sections of said hydrogen delivery line;
    a monitoring system, in electronic communication with at least one shutoff valve, said monitoring system configured to measure at least one characteristic of said hydrogen within said hydrogen source or said hydrogen delivery line to determine if said hydrogen comports with a predetermined range of values;
    wherein at least one shutoff valve is configured to selectively open only when the first fluid characteristic of the hydrogen comports with said predetermined range of values.

2. The hydrogen distribution system of claim 1, further comprising:
    at least one flow meter in fluid communication with an inlet, said at least one flow meter configured to measure hydrogen flowing through at least one shutoff value; and
    a monitoring system, in communication with said at least one flow meter configured to record the quantity of hydrogen flowing through said at least one shutoff valve.

3. The hydrogen distribution system of claim 2, wherein at least one shutoff valve is configured to selectively close once a predetermined quantity of hydrogen has flowed through said at least one shutoff valve.

4. The hydrogen distribution system of claim 3, further comprising:
    at least one additional flow meter in fluid communication with said hydrogen delivery line, said flow meter configured to measure the quantity of hydrogen flowing through said hydrogen delivery line outlet; and
    a monitoring system, in communication with said at least one additional flow meter configured to record the quantity of hydrogen flowing through said hydrogen delivery line outlet.

5. The hydrogen distribution system of claim 4 further comprising a database for recording one or more data elements, optionally accompanied by a date, time and location stamp of such data element entry into said database, said entry identifying information about the person or autonomous collection equipment entering such one or more data elements and/or the basis for such data element.

6. The hydrogen distribution system of claim 5, wherein the one or more data elements are selected from the group consisting of: a predetermined range of values for at least one fluid characteristic; the value of at least one fluid characteristic and the identity of the sample to which said value pertains; the identifier of a hydrogen sample and the identity of the sample tap point from which such sample was taken; the identifier of the shutoff valve and the identity of the inlet to the hydrogen delivery line to which such shutoff valve pertains; the identifier of the hydrogen source and the identity of the owner of such hydrogen source; the identifier of a hydrogen source and the identity of the inlet to the hydrogen delivery line through which hydrogen in such hydrogen source flows into said hydrogen delivery line; the identifier of the at least one flow meter and the identity of the inlet to the hydrogen delivery line to which said at least one flow meter pertains; the quantity of hydrogen flowing through the at least one flow meter and the identity of the at least one flow meter to which said inlet pertains; the identifier of the at least one additional flow meter and the identity of the hydrogen delivery line outlet to which said at least one additional flow meter pertains; the quantity of hydrogen flowing through the at least one additional flow meter and the identity of the additional flow meter to which such hydrogen delivery line outlet pertains; and the identifier of the hydrogen delivery line outlet and the identity of the owner of the end use application receiving hydrogen through such outlet.

7. The distribution system of claim 5 further comprising:
    a data entry system, in communication with the database, for recording the production method for the hydrogen contained in a hydrogen source.

8. The distribution system of claim 7, wherein the hydrogen production method is the electrolysis of water, steam methane reforming, biomass gasification, coal gasification, and/or microbial biomass conversion.

9. The distribution system of claim 7, further comprising:
    a data entry system, in communication with the database, for recording the power source for the hydrogen production method.

10. The distribution system of claim 9, wherein the power source is solar, wind, hydro, geothermal, nuclear, fossil fuel, and/or grid power.

11. The distribution system of claim 9, further comprising:
    a data entry system, in communication with the database, for recording the percentage of carbon capture of emissions resulting from the power source used by such production method.

12. The distribution system of claim 7, further comprising:
    a data entry system, in communication with the database, for recording the percentage of carbon capture of emissions resulting from the production method used for such hydrogen.

13. The distribution system of claim 5, wherein said data elements are selected from the group consisting of: the production method for the hydrogen contained in a hydrogen source; the percentage for which each such production method is responsible if multiple methods were used in such hydrogen production; the power source for the method used to produce hydrogen contained in a hydrogen source; the percentage for which each such source is responsible if multiple power sources were used in such hydrogen production method; the percentage of carbon capture of emissions occurring from the production method used to produce hydrogen contained in a hydrogen source; and the percentage of carbon capture of emissions occurring from the power source used by the method of producing hydrogen contained in a hydrogen source.

14. The distribution system of claim 5, wherein said data elements are selected from the group consisting of: a payment amount to be credited for each unit of hydrogen flowing through an inlet to the hydrogen delivery line; a payment amount to be charged for each unit of hydrogen flowing through an outlet from the hydrogen delivery line; a tax credit amount and the criteria for earning such tax credit; a renewable energy credit amount and the criteria for earning such renewable energy credit; and a subsidy amount and the criteria for earning such subsidy.

15. The distribution system of claim 14, wherein two or more data elements in the database are used to calculate a payment made to at least one hydrogen producer.

16. The distribution system of claim 5, wherein the database is a public, private, or semi-private blockchain ledger; and the data entry is an update to such blockchain ledger.

17. The distribution system of claim 14, wherein two or more data elements in the database are used to calculate a payment charged to at least one end user.

18. The hydrogen distribution system of claim 14, wherein two or more data elements in the database are used to calculate a tax credit granted, renewable energy credit earned, or subsidy payment made by a public agency or jurisdictional body.

19. The distribution system of claim 1, wherein at least one fluid characteristic is selected from the group consisting of the purity of said hydrogen; the pressure of said hydrogen; the flow rate of said hydrogen, and the temperature of said hydrogen.

20. The distribution system of claim 1, wherein the hydrogen delivery line is located inside an existing pipeline or pipeline right of way.

21. The distribution system of claim 1, further comprising:
a safety pipe surrounding the hydrogen delivery line such that a channel is formed between an exterior of the hydrogen delivery line and an interior of said safety pipe;
a source that is fluidly coupled with the channel, the source providing a sweeper gas or liquid for use in the system.

22. The hydrogen distribution system of claim 21, wherein at least one shutoff valve is configured to selectively close and isolate the hydrogen delivery line around a pre-determined length of said hydrogen delivery line.

23. The distribution system of claim 22, further comprising:
at least one sensor in fluid communication with the channel, said sensor configured to detect the presence of hydrogen;
a controller operable to generate a signal based on input from the at least one sensor; the at least one shutoff valve operable by the controller; and
the distribution system configured to close and isolate the hydrogen delivery line around a pre-determined length of said hydrogen delivery line when the concentration of hydrogen in the channel reaches a predetermined level relative to the sweeper gas or liquid.

24. The hydrogen distribution system of claim 21, wherein said fluid coupling of the source with the channel enables the sweeper gas or liquid to surround the hydrogen delivery line.

25. The distribution system of claim 24, further comprising:
at least one sensor in fluid communication with the channel, said sensor configured to detect the presence of hydrogen;
a controller operable to generate a signal based on input from the at least one sensor; a first valve in fluid communication with the source and channel, the first valve operable by the controller to enable the channel to receive the sweeper gas or liquid from said source; and
the distribution system configured to purge the channel before the concentration of hydrogen reaches a predetermined level relative to the sweeper gas or liquid.

26. The distribution system of claim 21, wherein the hydrogen delivery line is selected from the group consisting of: FRP spooled pipe, jointed composite pipe, non-metallic pipe, steel pipe and combinations thereof.

27. The distribution system of claim 21, wherein the hydrogen delivery line and the safety pipe are positioned within one or more of the following existing pipelines: a water pipeline; a sewer line; a storm drain; an oil or gas pipeline; a utility corridor; or a tube.

28. The distribution system of claim 21, wherein the hydrogen delivery line and the safety pipe are buried in or located on, under, or adjacent to a right-of-way for one or more of the following: a water pipeline; a sewer line; a storm drain; an oil or gas pipeline; a utility corridor or easement; a public street or highway, a rail line, or a tube.

29. A method of transporting hydrogen from a hydrogen source to at least one end user location, comprising the steps of:
providing a pressurized hydrogen delivery line;
configuring at least one inlet valve in fluid communication with the hydrogen delivery line, wherein said inlet receives hydrogen from a hydrogen source;
configuring at least one outlet in fluid communication with the hydrogen delivery line allowing withdrawal of said hydrogen at the at least one end user location;
configuring the hydrogen source to be in fluid communication with at least one shutoff valve;
fluidly connecting a sensor to a sample tap point of said hydrogen source, wherein said sensor is configured to measure the value of the at least one fluid characteristic within a hydrogen sample from said hydrogen source;
configuring the at least one shutoff valve in fluid communication with said hydrogen delivery line, wherein said shutoff value is configured to selectively close and isolate selected sections of said hydrogen delivery line;
monitoring at least one shutoff valve to measure at least one characteristic of said hydrogen within said hydrogen source or said hydrogen delivery line to determine if said hydrogen comports with a predetermined range of values;
selectively opening at least one shutoff valve when said first fluid characteristic comports with a selected pre-determined range of values for said at least one fluid characteristic.

30. The method of transporting hydrogen according to claim 29, further comprising the additional steps of:
configuring at least one flow meter in fluid communication with said at least one shutoff valve;
measuring hydrogen flowing through said at least one shutoff value; monitoring at least one flow meter; and
recording quantity of hydrogen flowing through said at least one shutoff valve.

31. The method of transporting hydrogen according to claim 30, wherein at least one shutoff valve is configured to selectively close once a predetermined quantity of hydrogen has flowed through said at least one shutoff valve.

32. The method of transporting hydrogen according to claim 31, further comprising the additional steps of:
providing at least one additional flow meter in fluid communication with said hydrogen delivery line, said additional flow meter configured to measure the quantity of hydrogen flowing through said hydrogen delivery line outlet; and monitoring at least one additional flow meter configured to record the quantity of hydrogen flowing through said hydrogen delivery line outlet.

33. The method of transporting hydrogen according to claim 32 further comprising the additional steps of:

creating a database for recording one or more data elements, wherein said data elements are optionally accompanied by a date, time and location stamp of such data element entry into said database, said entry identifying information about the person or autonomous collection equipment entering such one or more data elements and/or the basis for such data element.

34. The method of transporting hydrogen according to claim 33, wherein the one or more data elements are selected from the group consisting of:

a predetermined range of values for at least one fluid characteristic;

the value of at least one fluid characteristic and the identity of the sample to which said value pertains; the identifier of a hydrogen sample and the identity of the sample tap point from which such sample was taken;

the identifier of the shutoff valve and the identity of the inlet to the hydrogen delivery line to which such shutoff valve pertains;

the identifier of the hydrogen source and the identity of the owner of such hydrogen source;

the identifier of a hydrogen source and the identity of the inlet to the hydrogen delivery line through which hydrogen in such hydrogen source flows into said hydrogen delivery line;

the identifier of the at least one flow meter and the identity of the inlet to the hydrogen delivery line to which said at least one flow meter pertains;

the quantity of hydrogen flowing through the at least one flow meter and the identity of the at least one flow meter to which said inlet pertains; the identifier of the at least one additional flow meter and the identity of the hydrogen delivery line outlet to which said at least one additional flow meter pertains;

the quantity of hydrogen flowing through the at least one additional flow meter and the identity of the additional flow meter to which such hydrogen delivery line outlet pertains; and the identifier of the hydrogen delivery line outlet and the identity of the owner of the end use application receiving hydrogen through such outlet.

35. The method of transporting hydrogen according to claim 33 further comprising the additional step of:

providing a data entry system, in communication with the database, for recording the production method for the hydrogen contained in a hydrogen source.

36. The method of transporting hydrogen according to claim 35, wherein the hydrogen production method is the electrolysis of water, steam methane reforming, biomass gasification, coal gasification, and/or microbial biomass conversion.

37. The method of transporting hydrogen according to claim 35, further comprising the step of:

providing a data entry system, in communication with the database, for recording the power source for the hydrogen production method.

38. The method of transporting hydrogen according to 37, wherein the power source is solar, wind, hydro, geothermal, nuclear, fossil fuel, and/or grid power.

39. The method of transporting hydrogen according to claim 37, further comprising the step of:

providing a data entry system, in communication with the database, for recording the percentage of carbon capture of emissions resulting from the power source used by such production method.

40. The method of transporting hydrogen according to claim 35, further comprising the step of:

providing a data entry system, in communication with the database, for recording the percentage of carbon capture of emissions resulting from the production method used for such hydrogen.

41. The method of transporting hydrogen according to 33, wherein said data elements are selected from the group consisting of: the production method for the hydrogen contained in a hydrogen source; the percentage for which each such production method is responsible if multiple methods were used in such hydrogen production; the power source for the method used to produce hydrogen contained in a hydrogen source; the percentage for which each such source is responsible if multiple power sources were used in such hydrogen production method; the percentage of carbon capture of emissions occurring from the production method used to produce hydrogen contained in a hydrogen source; and the percentage of carbon capture of emissions occurring from the power source used by the method of producing hydrogen contained in a hydrogen source.

42. The method of transporting hydrogen according to claim 29, wherein at least one fluid characteristic is selected from the group consisting of the purity of said hydrogen; the pressure of said hydrogen; the flow rate of said hydrogen, and the temperature of said hydrogen.

43. The method of transporting hydrogen according to 29, further comprising the additional steps of:

providing a safety pipe surrounding the hydrogen delivery line such that a channel is formed between an exterior of the hydrogen delivery line and an interior of said safety pipe;

providing a source that is fluidly coupled with the channel, the source providing a sweeper gas or liquid for use in the system.

44. The method of transporting hydrogen according to claim 43, wherein said fluid coupling of the source with the channel enables the sweeper gas or liquid to surround the hydrogen delivery line.

45. The method of transporting hydrogen according to 44, further comprising the additional steps of:

providing at least one sensor in fluid communication with the channel, said sensor configured to detect the presence of hydrogen;

configuring a controller operable to generate a signal based on input from the at least one sensor;

providing a first valve in fluid communication with the source and channel, the first valve operable by the controller to enable the channel to receive the sweeper gas or liquid from said source to purge the channel before a concentration of hydrogen reaches a predetermined level relative to the sweeper gas or liquid.

* * * * *